(12) United States Patent
Baptist et al.

(10) Patent No.: US 9,811,533 B2
(45) Date of Patent: Nov. 7, 2017

(54) ACCESSING DISTRIBUTED COMPUTING FUNCTIONS IN A DISTRIBUTED COMPUTING SYSTEM

(71) Applicant: CLEVERSAFE, INC., Chicago, IL (US)

(72) Inventors: Andrew Baptist, Mt. Pleasant, WI (US); Wesley Leggette, Chicago, IL (US); Jason K. Resch, Chicago, IL (US)

(73) Assignee: International Business Machines Corporation, Armonk, NY (US)

(*) Notice: Subject to any disclaimer, the term of this patent is extended or adjusted under 35 U.S.C. 154(b) by 351 days.

(21) Appl. No.: 14/055,174

(22) Filed: Oct. 16, 2013

(65) Prior Publication Data
US 2014/0156716 A1    Jun. 5, 2014

Related U.S. Application Data

(60) Provisional application No. 61/733,686, filed on Dec. 5, 2012.

(51) Int. Cl.
*G06F 17/30* (2006.01)

(52) U.S. Cl.
CPC .............. *G06F 17/30194* (2013.01)

(58) Field of Classification Search
CPC ......... G06F 17/30067; G06F 17/30171; G06F 17/30194
USPC ....................................................... 707/827
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — James Trujillo
*Assistant Examiner* — Jessica N Le
(74) *Attorney, Agent, or Firm* — Garlick & Markison; Timothy W. Markison; Shayne X. Short

(57) ABSTRACT

A method begins by a processing module identifying, in accordance with an ordered manner, a next distributed computing function, where distributed computing functions are stored in multiple storage units as a set of encoded computing function slices. The method continues with the processing module determining whether ownership of the next distributed computing function can be established and when the ownership of the next distributed computing function can be established, securing ownership of the next distributed computing function. When the ownership of the next distributed computing function cannot be established, the method continues with the processing module requesting another next distributed computing function.

10 Claims, 60 Drawing Sheets

(56) References Cited

U.S. PATENT DOCUMENTS

| | | | |
|---|---|---|---|
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 7,962,641 | B1 * | 6/2011 | Dhuse ................ H04L 67/1097 709/203 |
| 8,479,046 | B1 * | 7/2013 | Bailey ................ G06F 11/1088 714/2 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0169391 | A1 * | 7/2010 | Baptist ............. G06F 17/30194 707/827 |
| 2011/0055277 | A1 * | 3/2011 | Resch ................ G06F 11/1004 707/785 |
| 2011/0184997 | A1 * | 7/2011 | Grube ................ H04L 67/1097 707/827 |
| 2011/0264717 | A1 * | 10/2011 | Grube ................ G06F 11/0727 707/827 |
| 2011/0289122 | A1 * | 11/2011 | Grube ................ G06F 11/2094 707/812 |
| 2013/0151558 | A1 * | 6/2013 | Chercoles Sánchez ............... G06F 17/30545 707/770 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

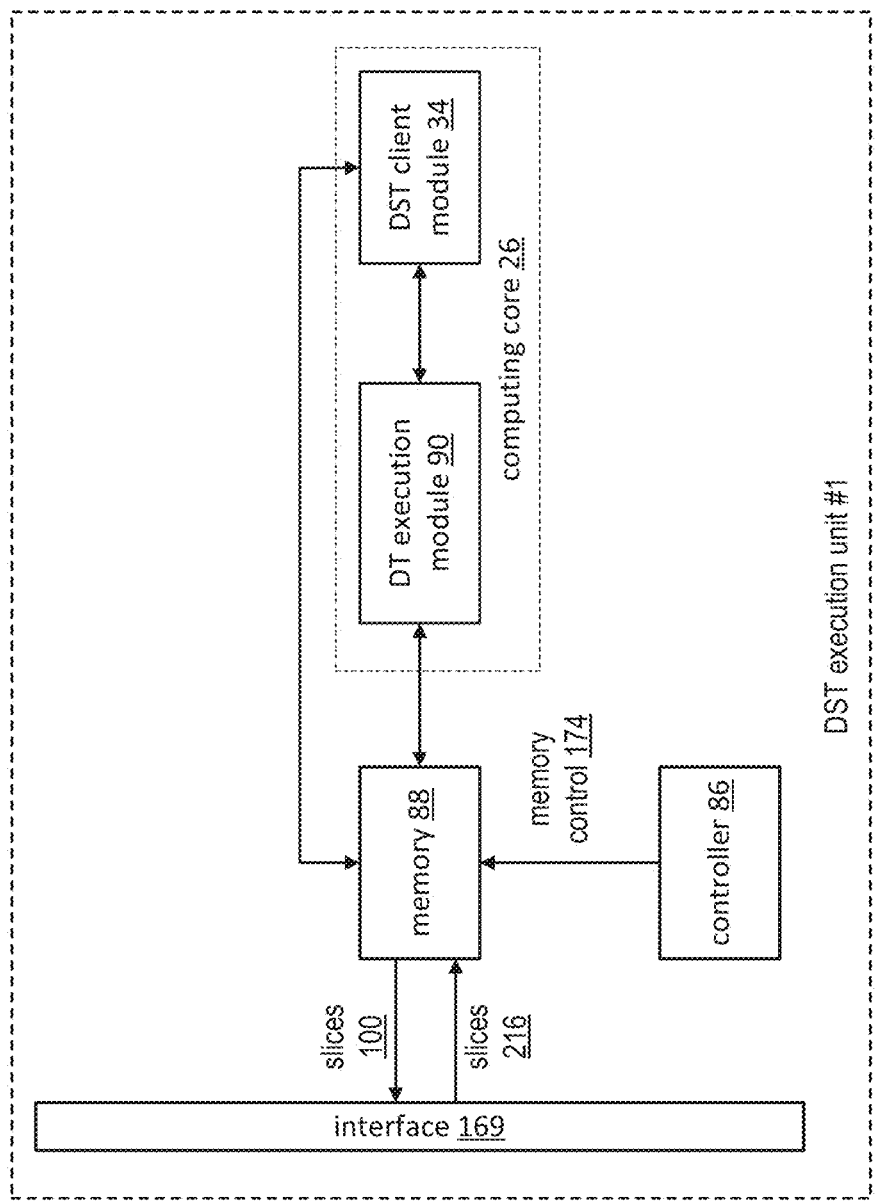
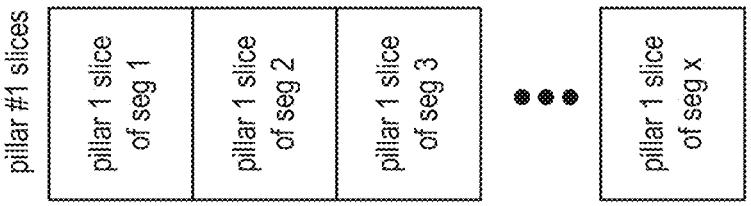
FIG. 24

DST allocation info 242 | data partition info 320: idata ID; No. of partitions; Addr. info for each partition; format conversion indication task execution info 322

| task 326 | task ordering 328 | data partition 330 | set of DT EX mods 332 | Name 334 | intermediate result info 324 ||||
|---|---|---|---|---|---|---|---|
| | | | | | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 & 1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

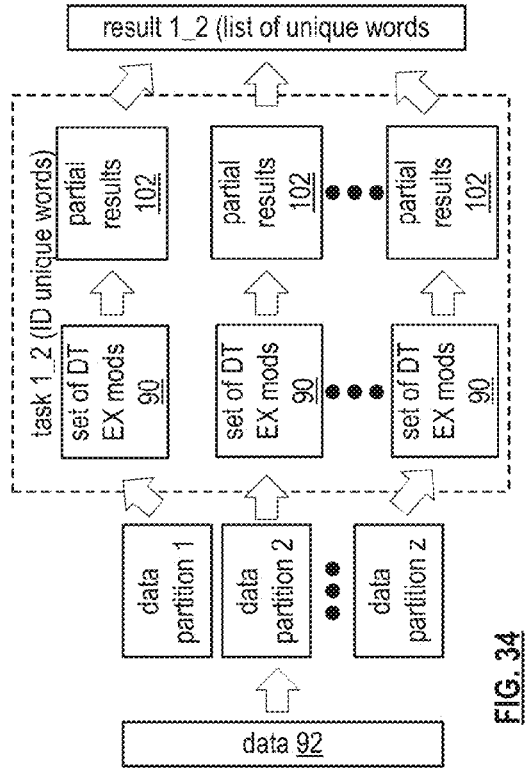
FIG. 34
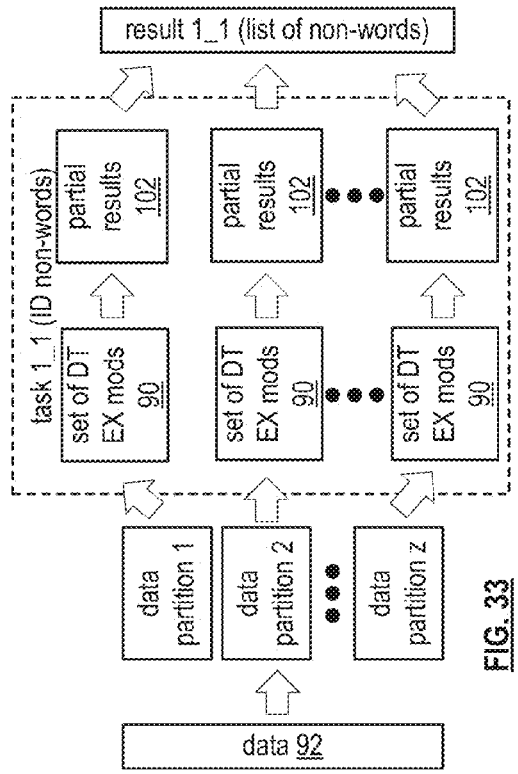
FIG. 33
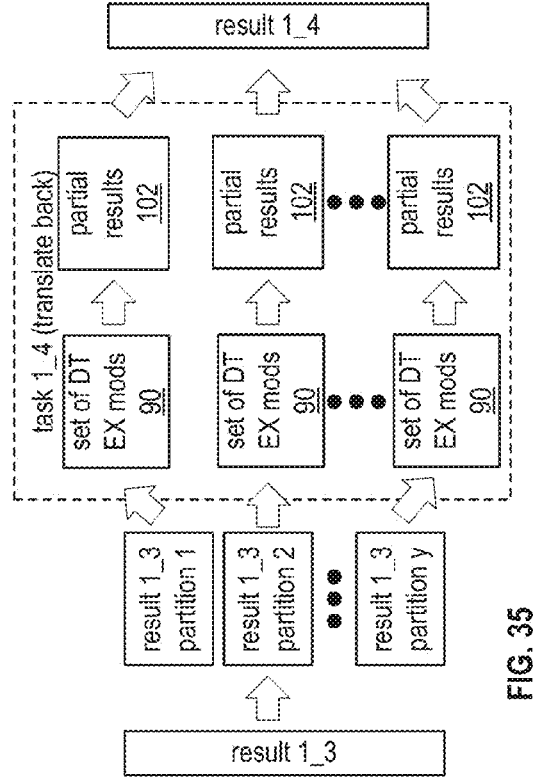
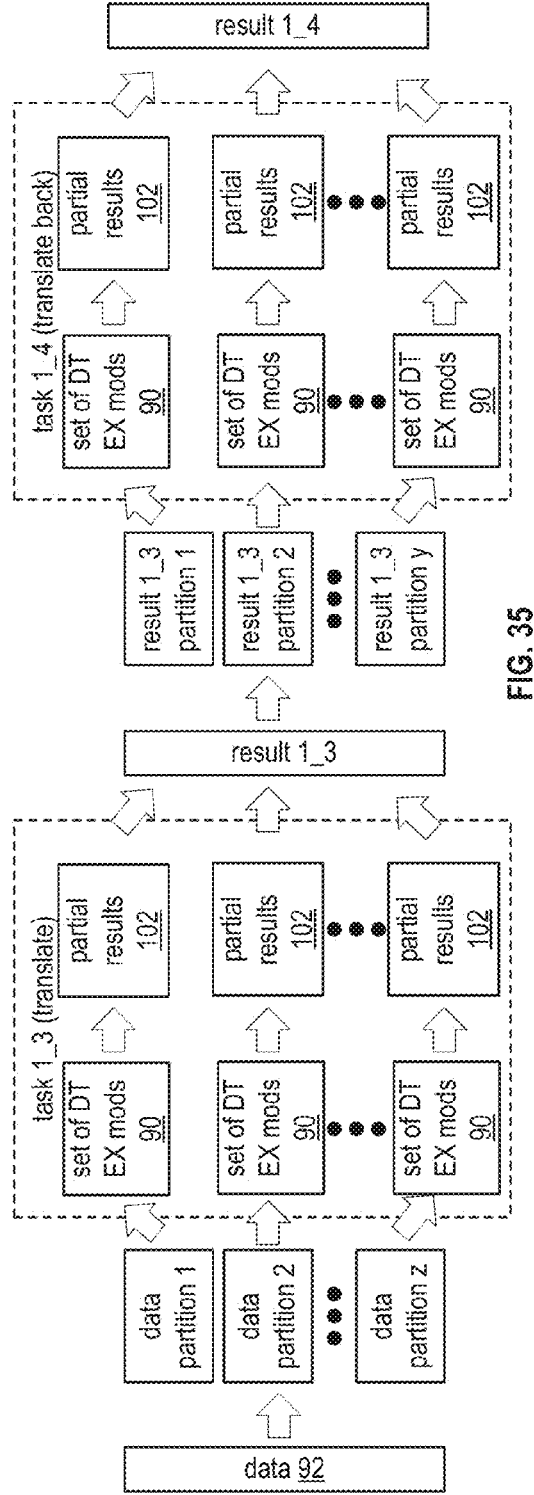
FIG. 35

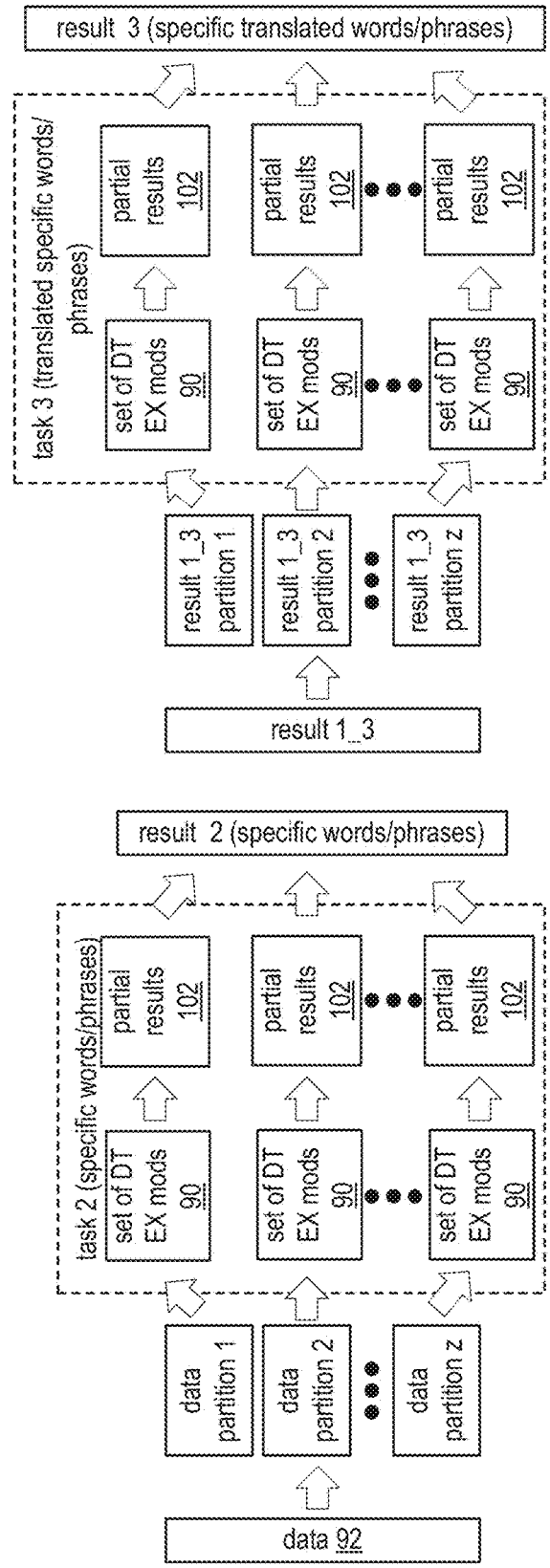
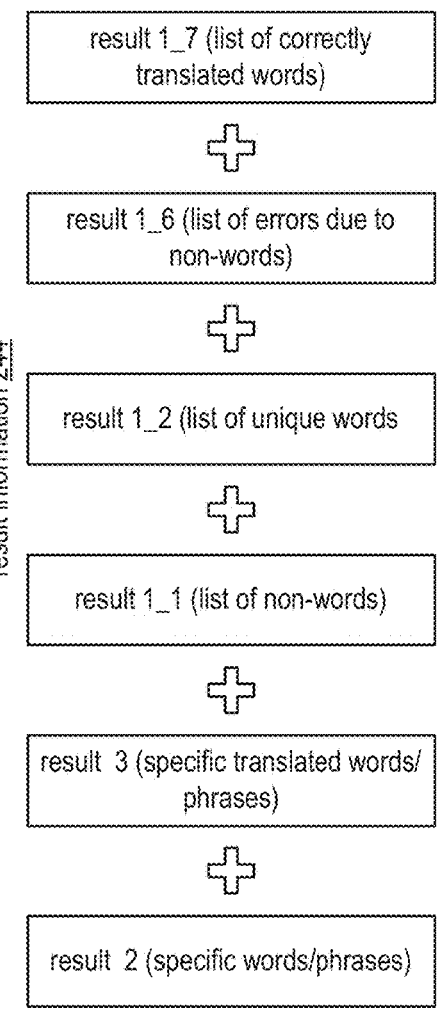
FIG. 37
FIG. 38
FIG. 39

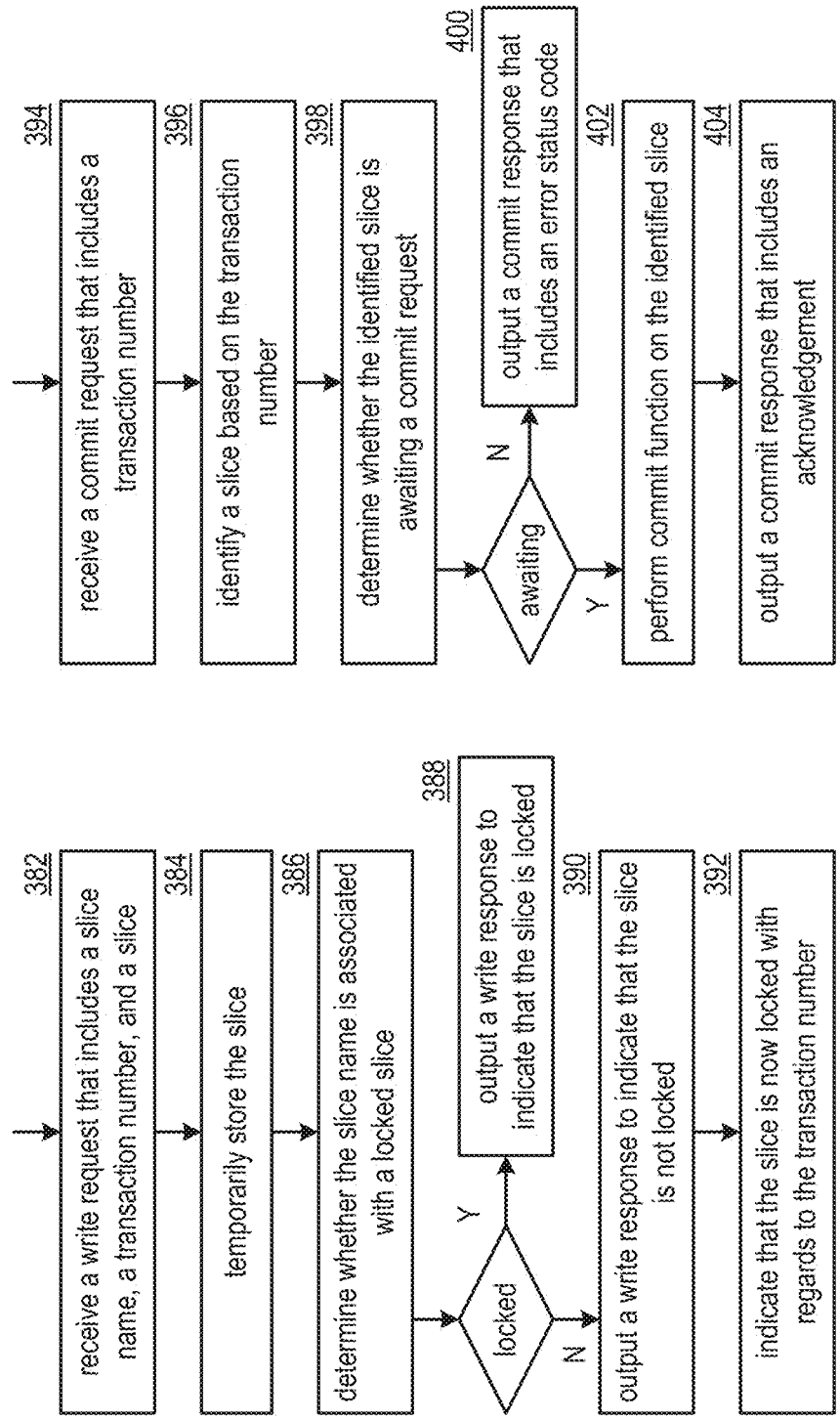

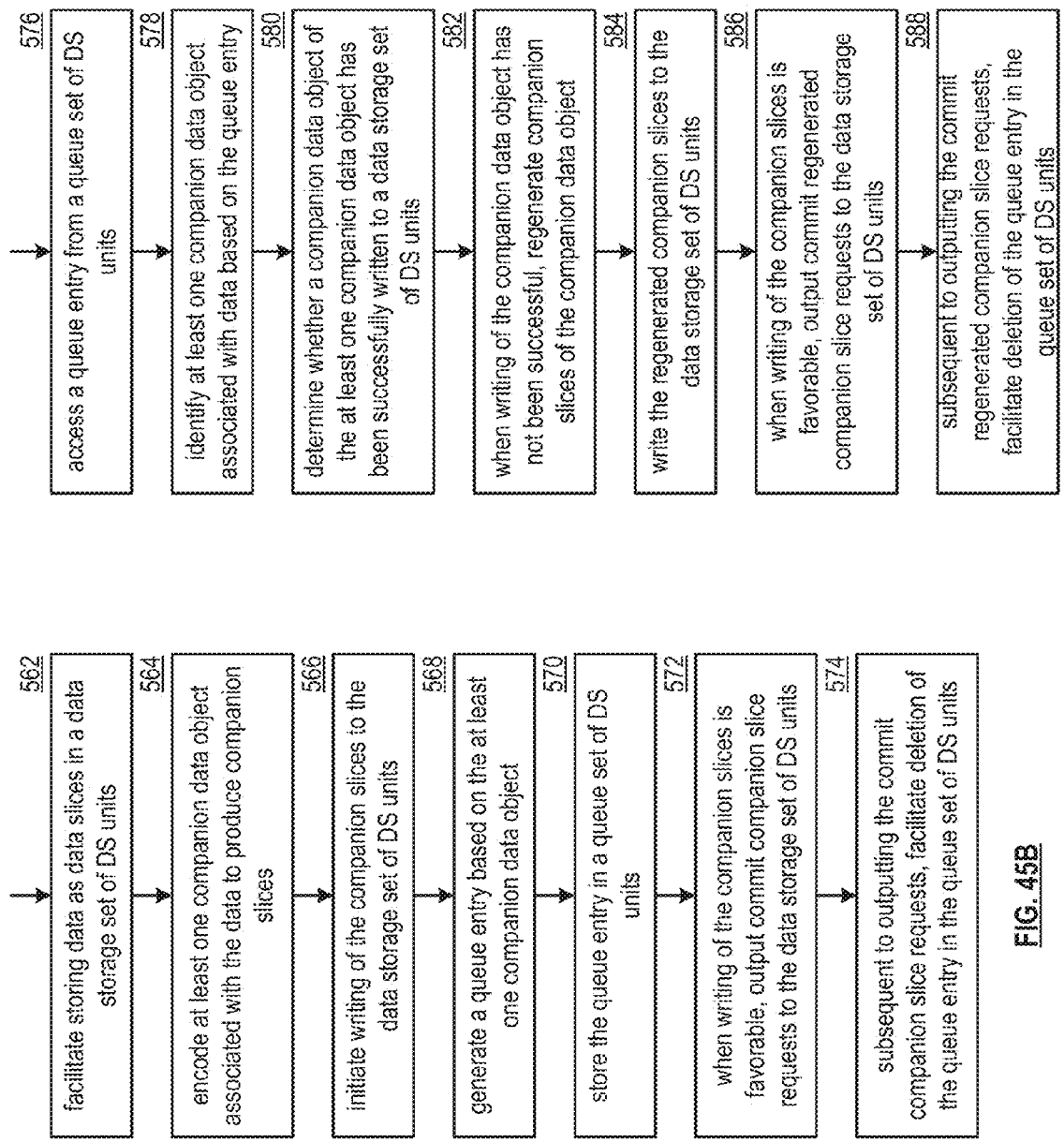

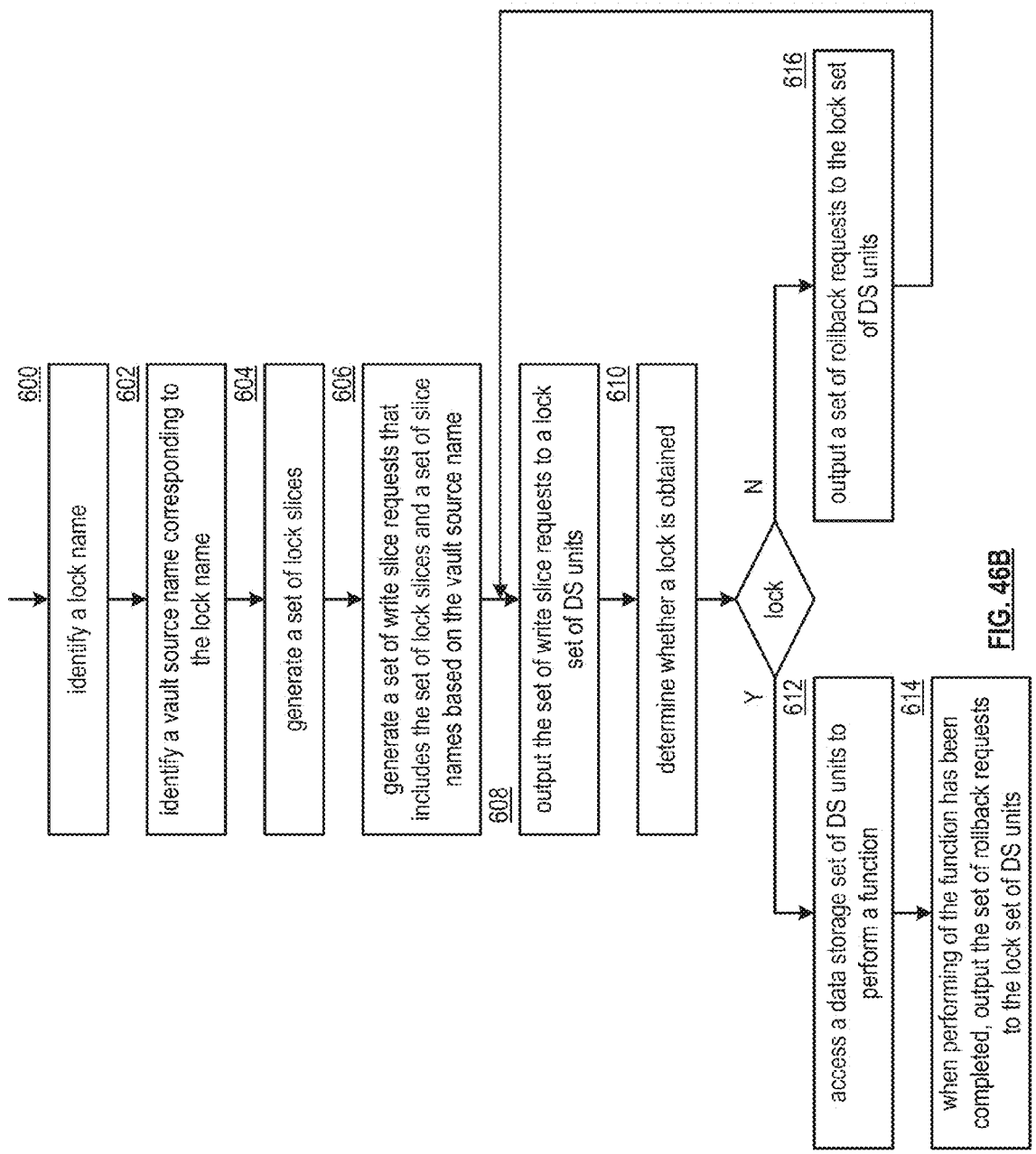

ACCESSING DISTRIBUTED COMPUTING FUNCTIONS IN A DISTRIBUTED COMPUTING SYSTEM

CROSS REFERENCE TO RELATED PATENTS

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 61/733,686, entitled "GENERATING A DISPERSED QUEUE," filed Dec. 5, 2012.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 40C is a flowchart illustrating another example of storing data in accordance with the present invention;

FIG. 40D is a flowchart illustrating another example of storing data in accordance with the present invention;

Figure 41A:
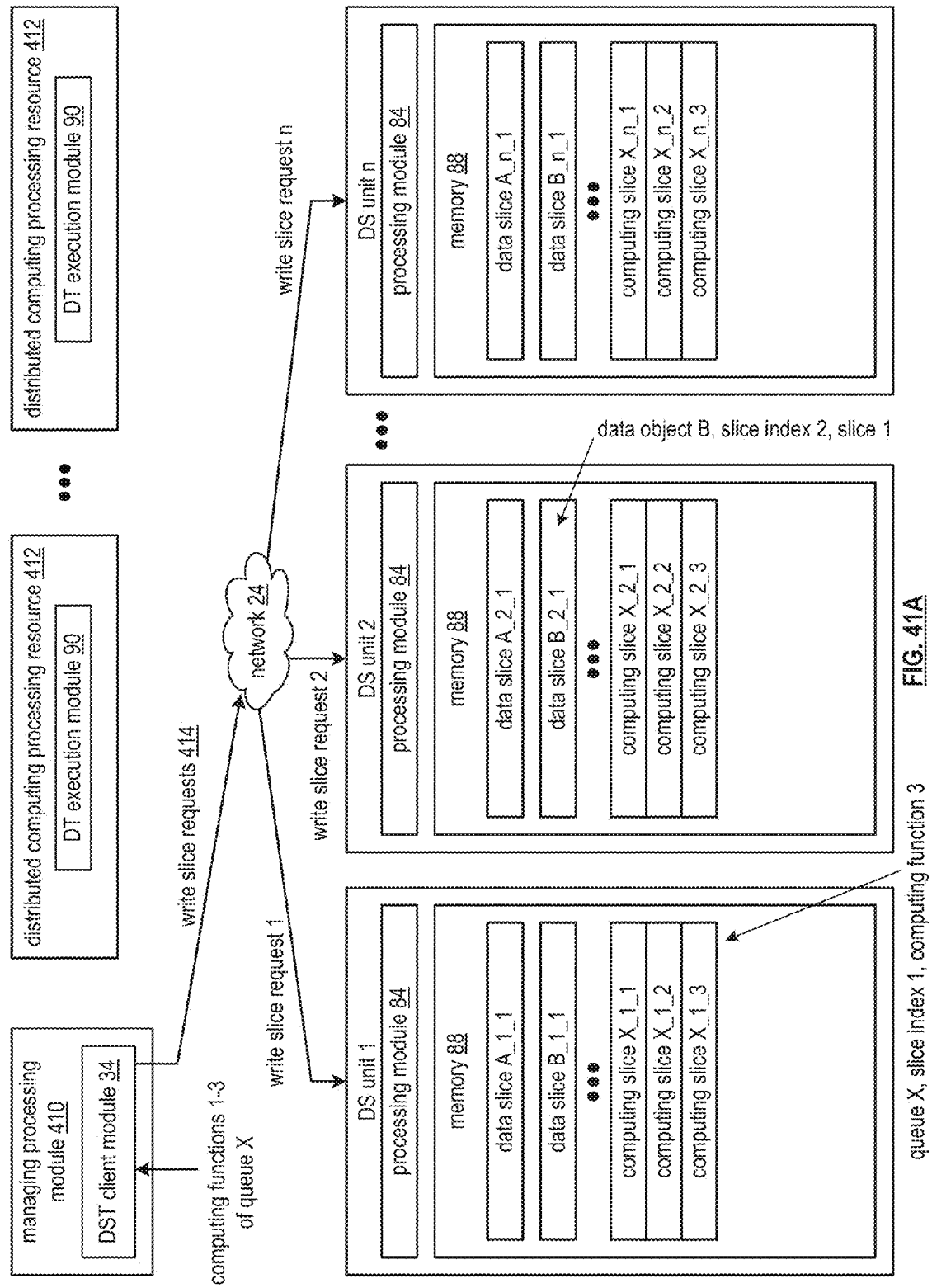
Figure 41B:
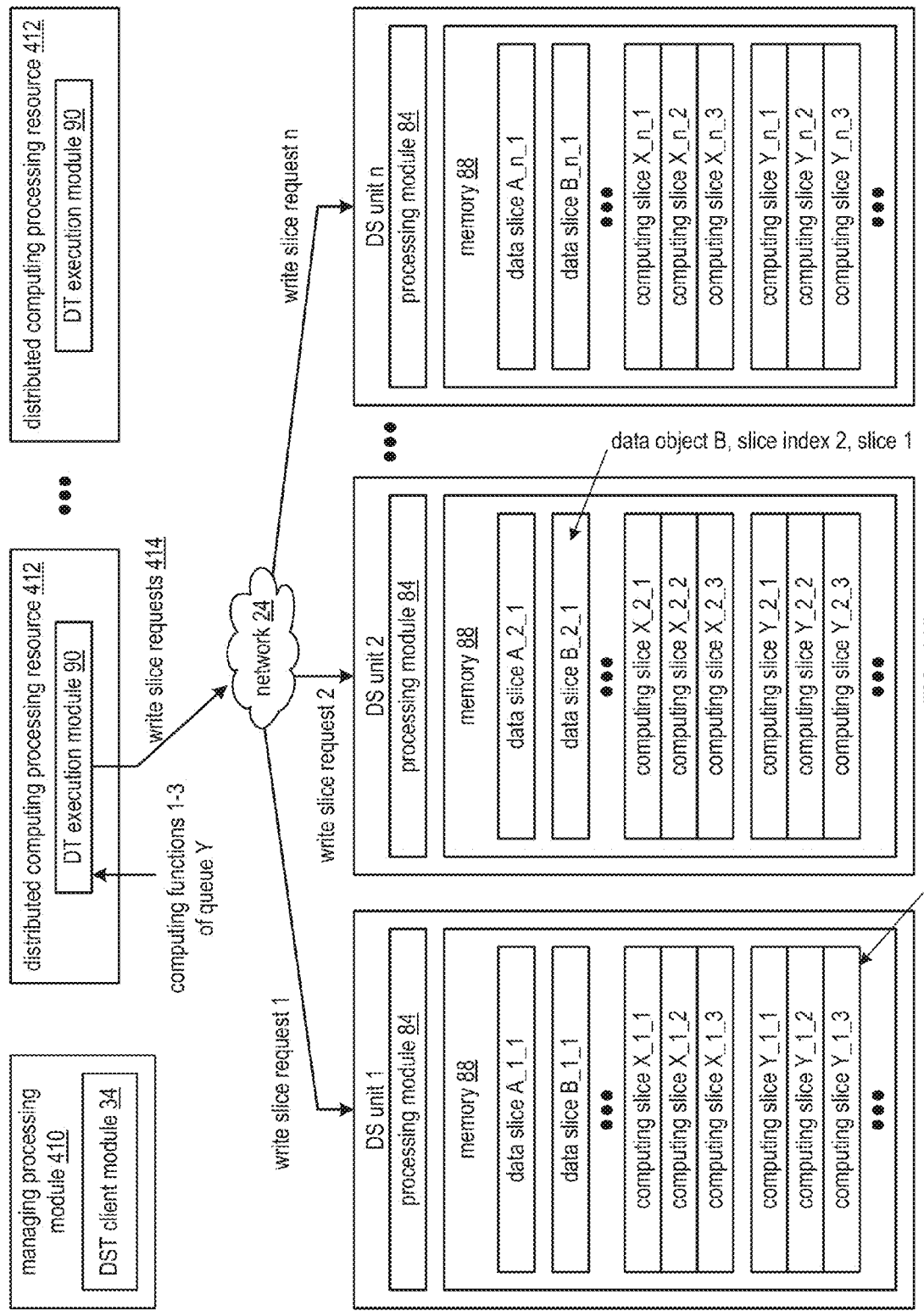
Figure 41C:
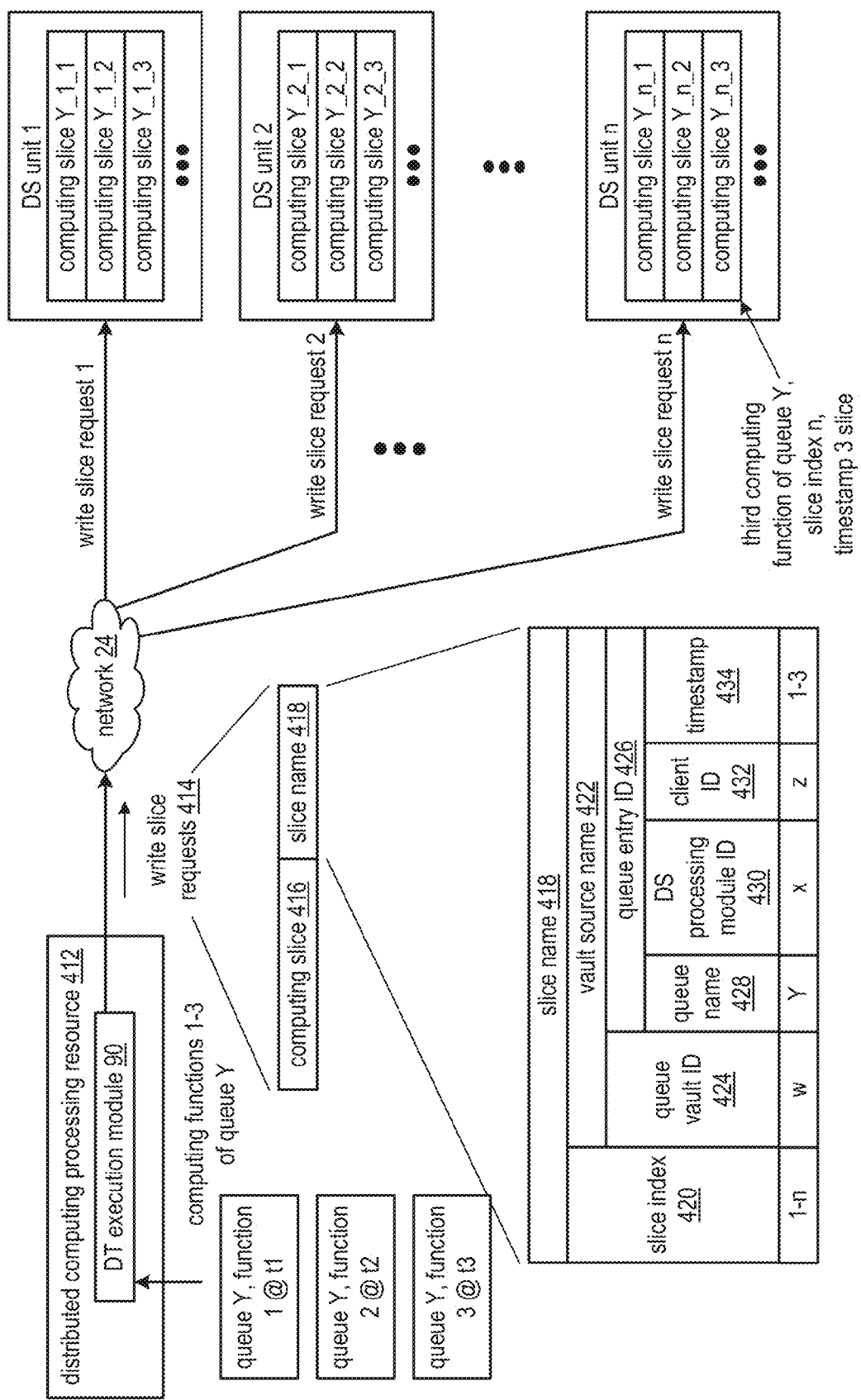
Figure 41D:
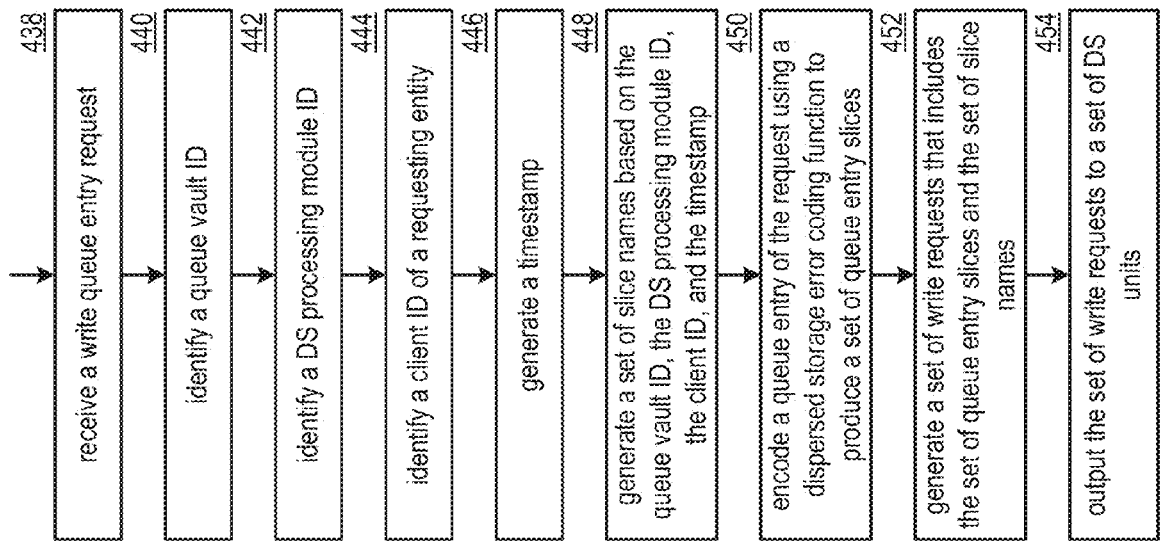
Figure 42A:
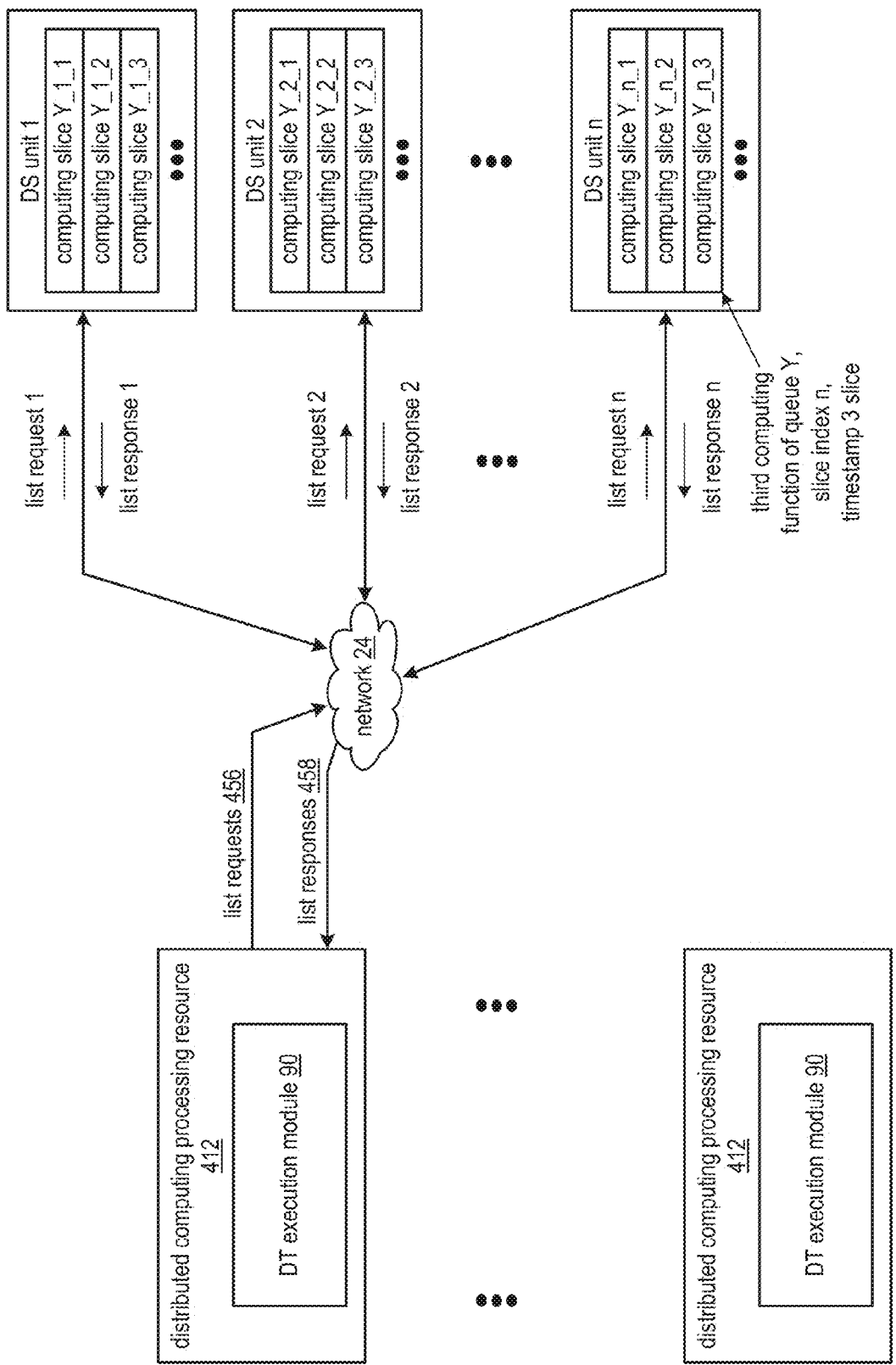
Figure 42B:
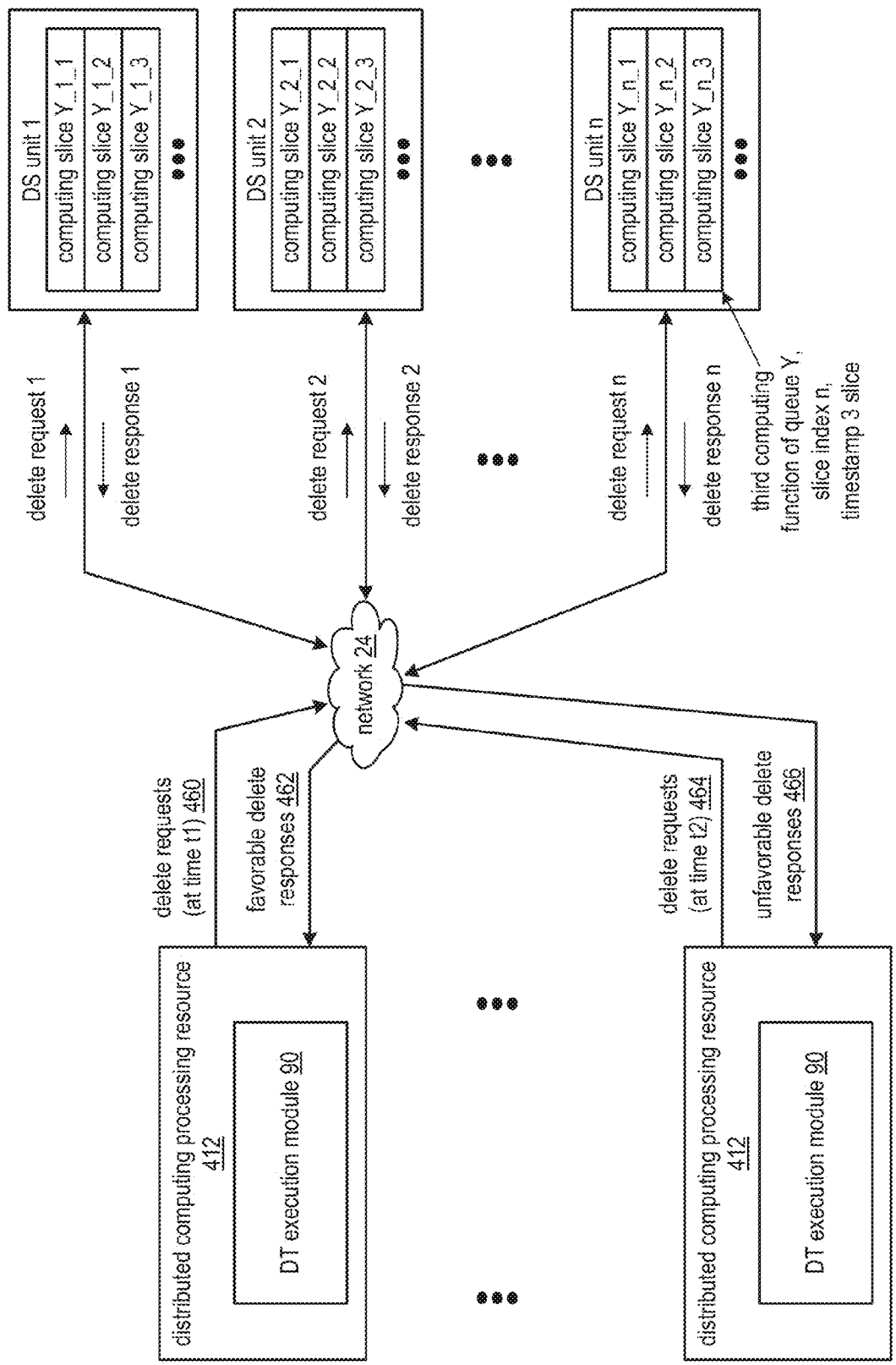
Figure 42C:
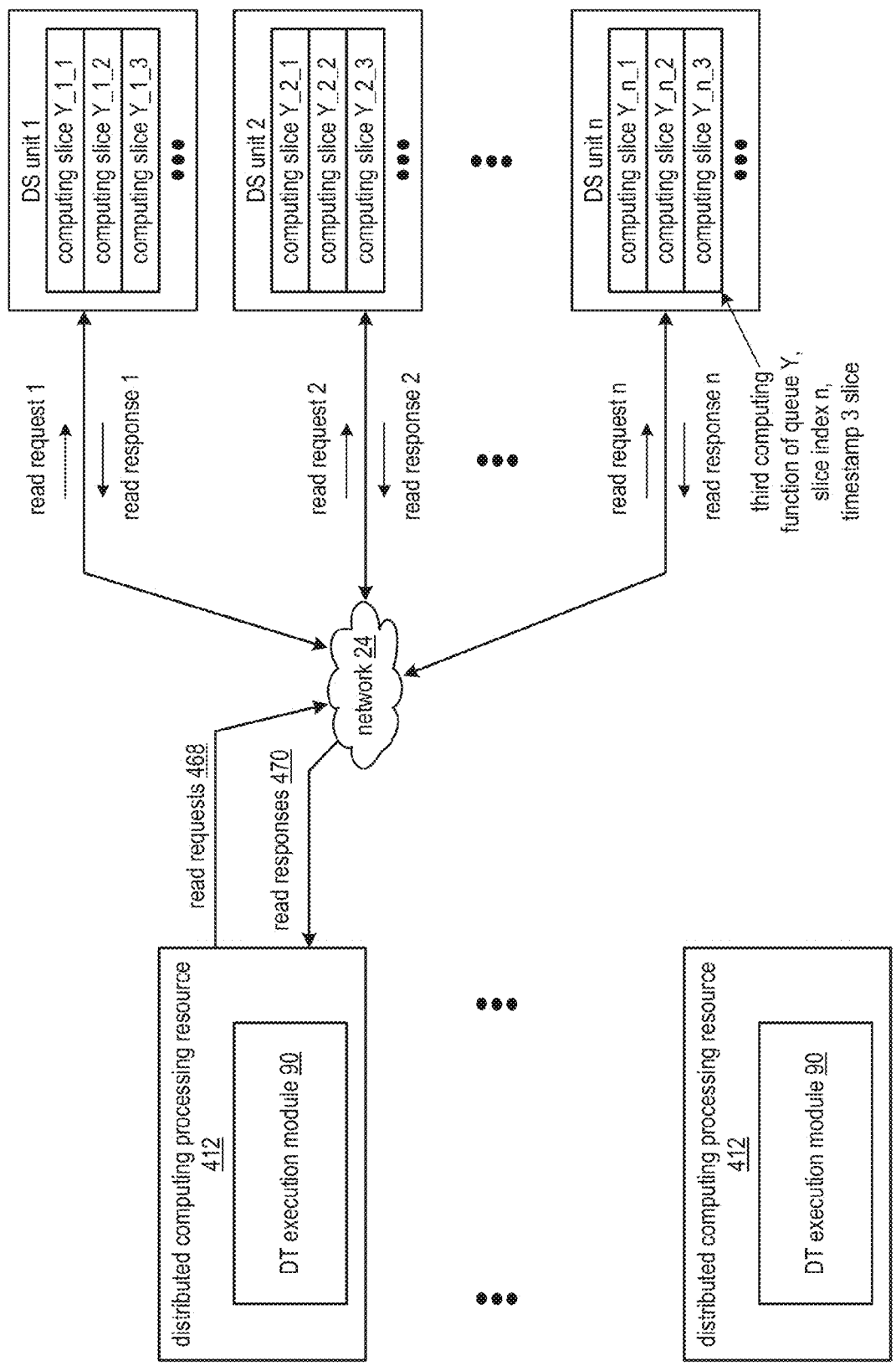
Figure 42D:
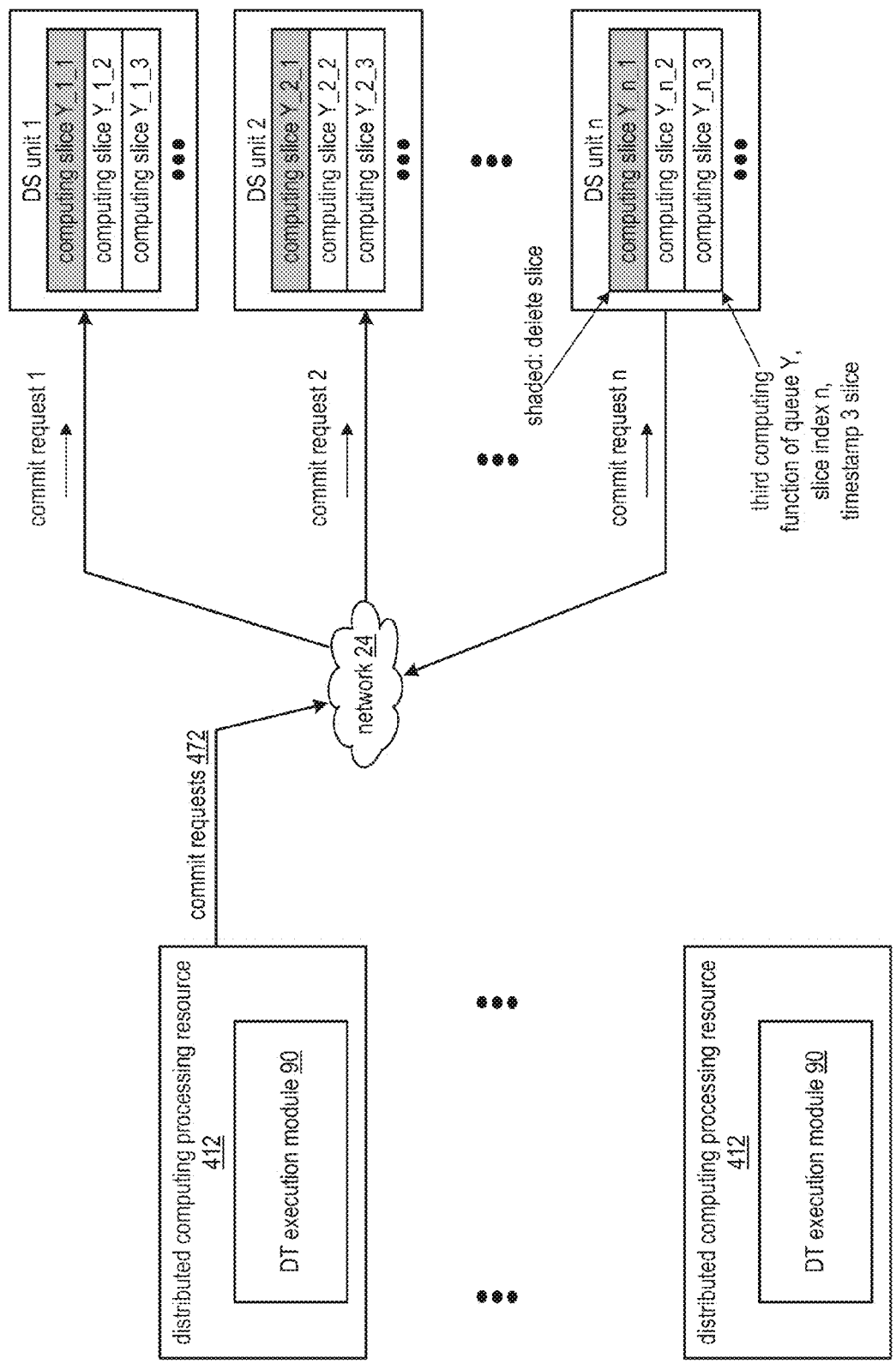
Figure 42E:
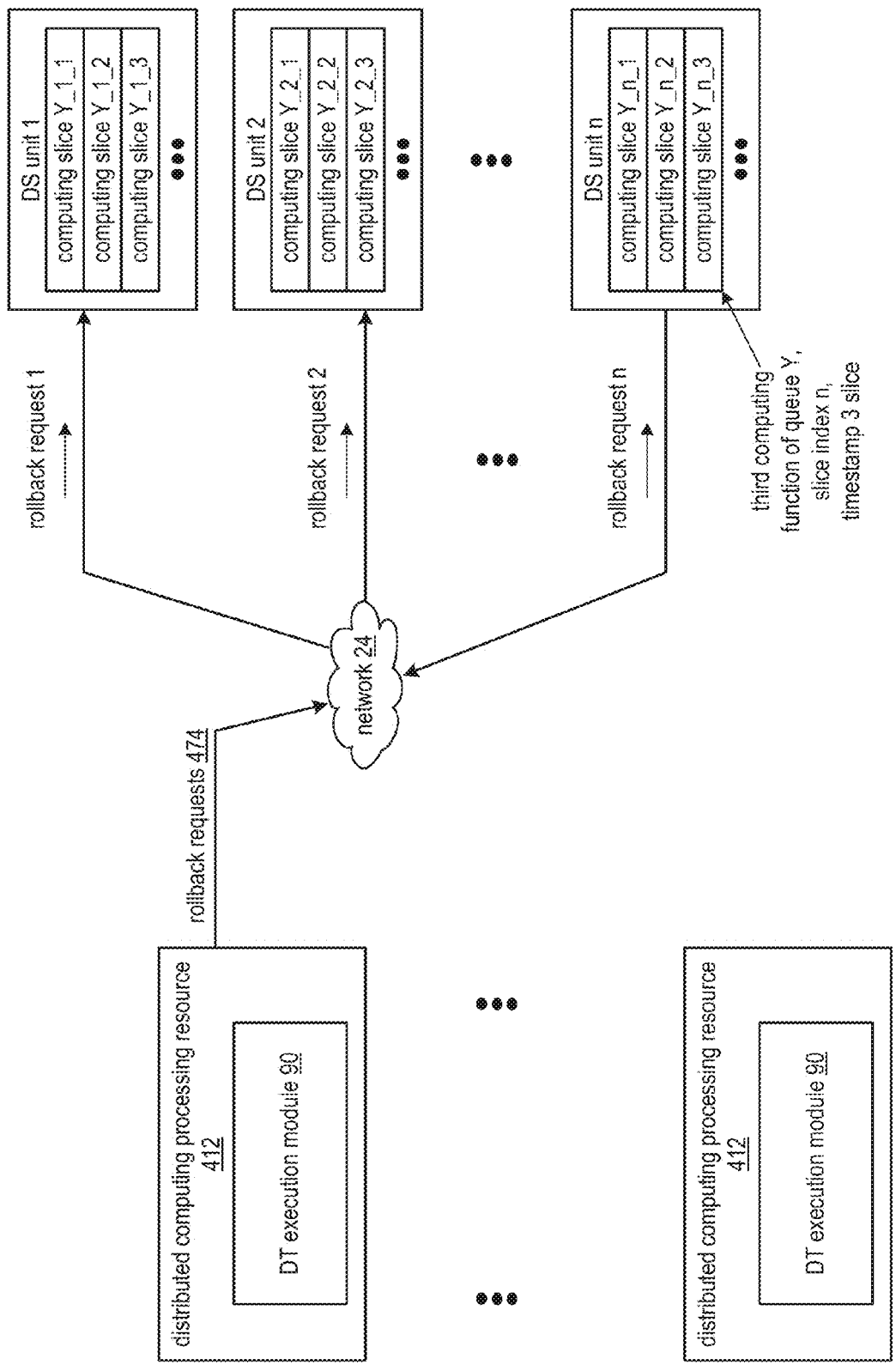
Figure 42F:
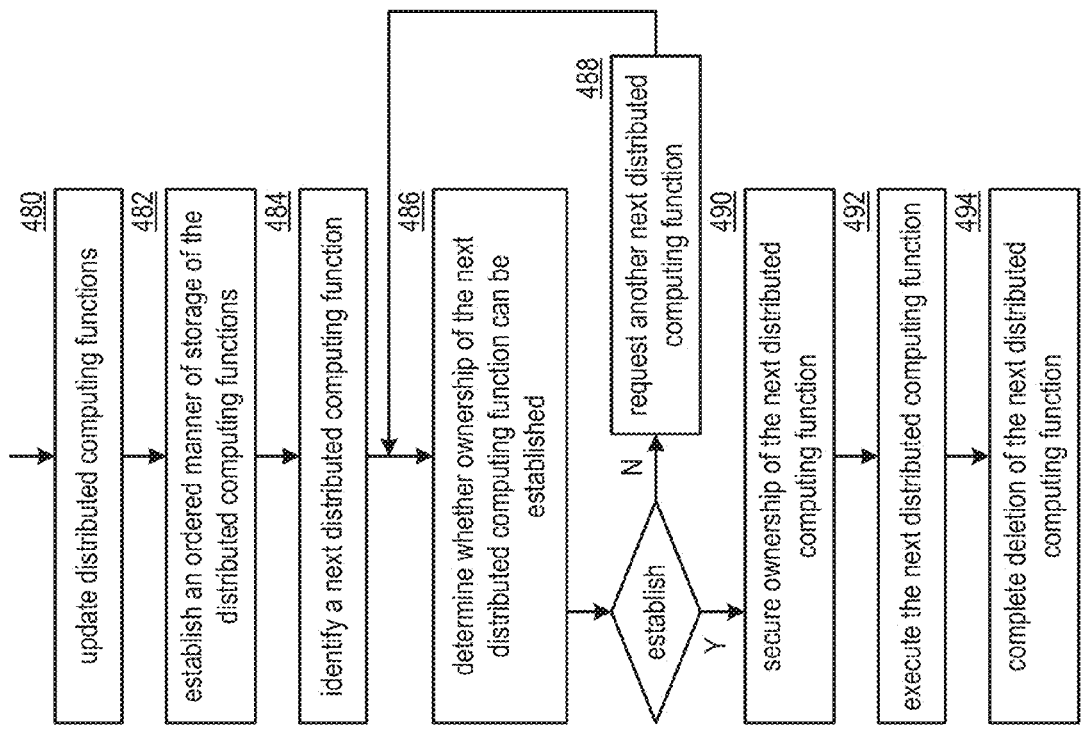
Figure 43A:
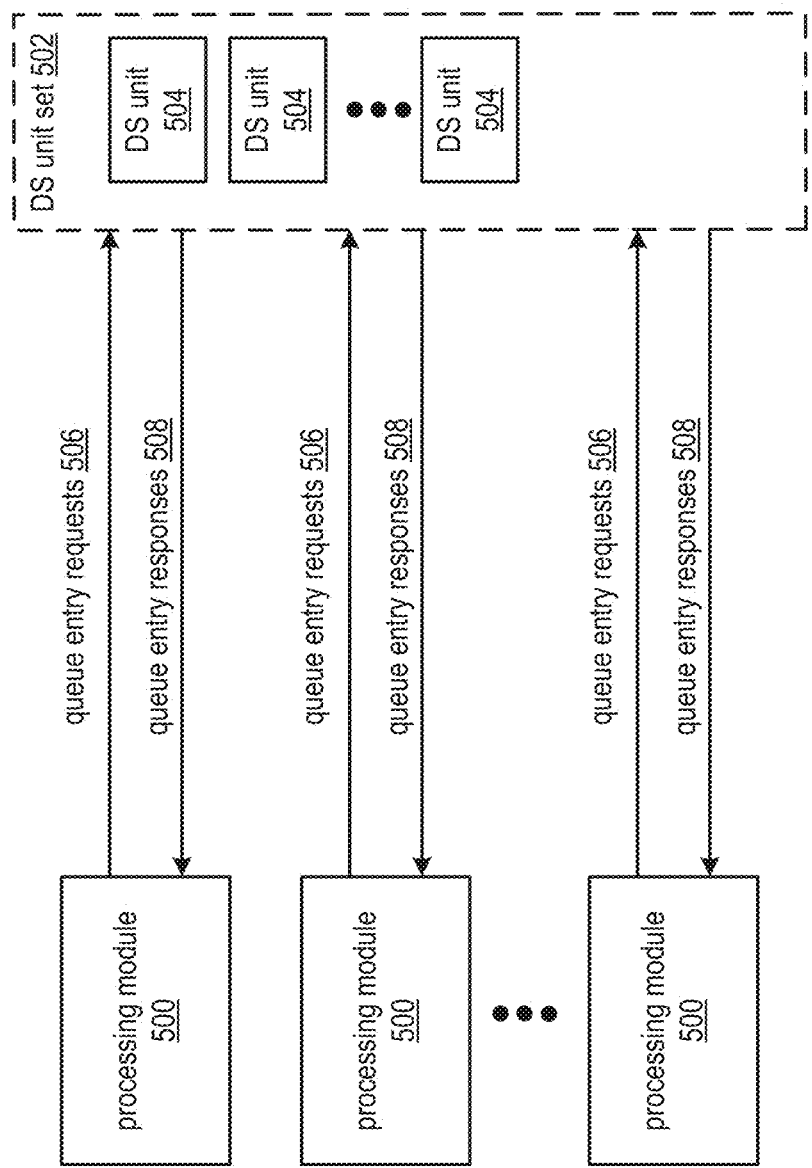
Figure 43B:
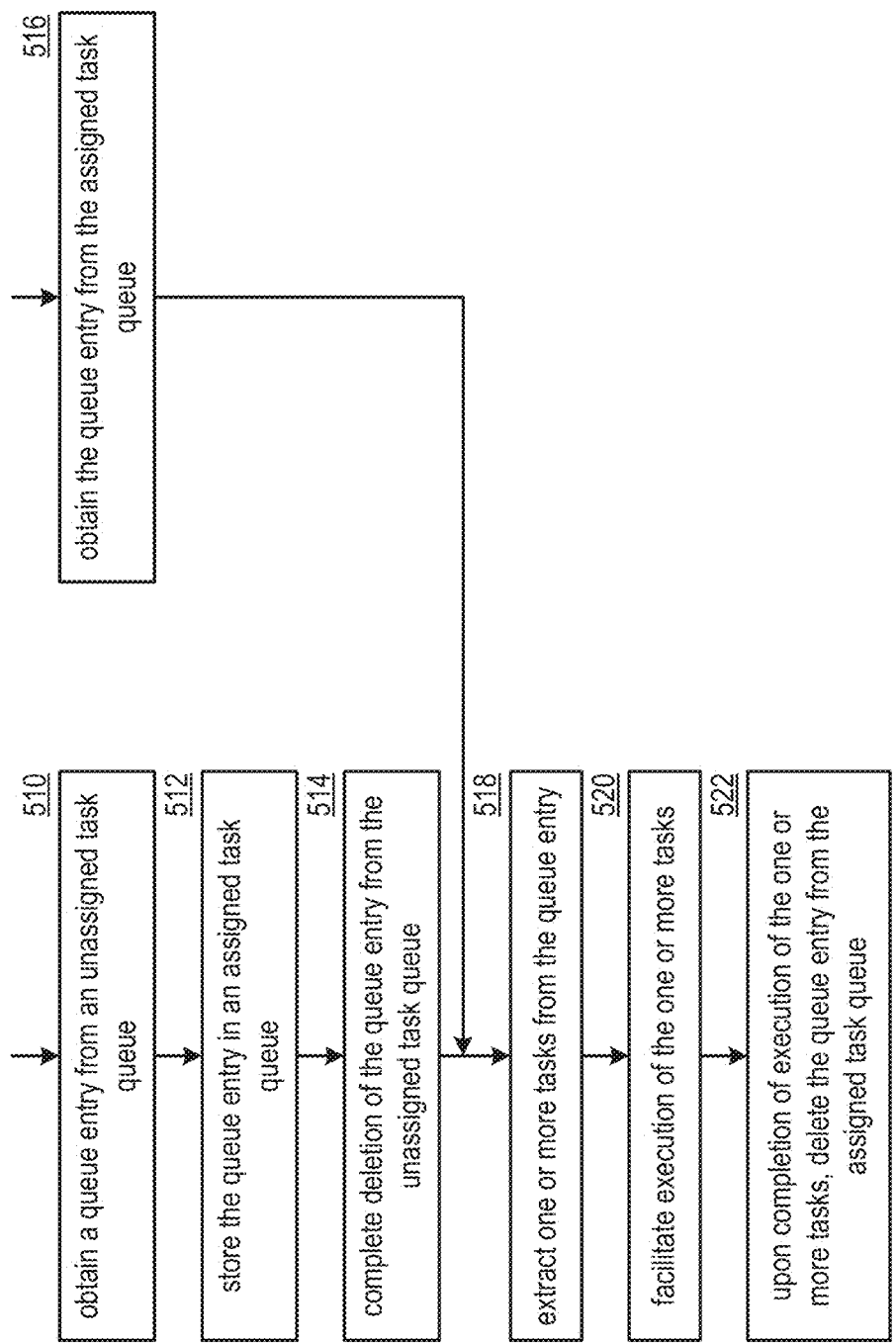
Figure 44A:
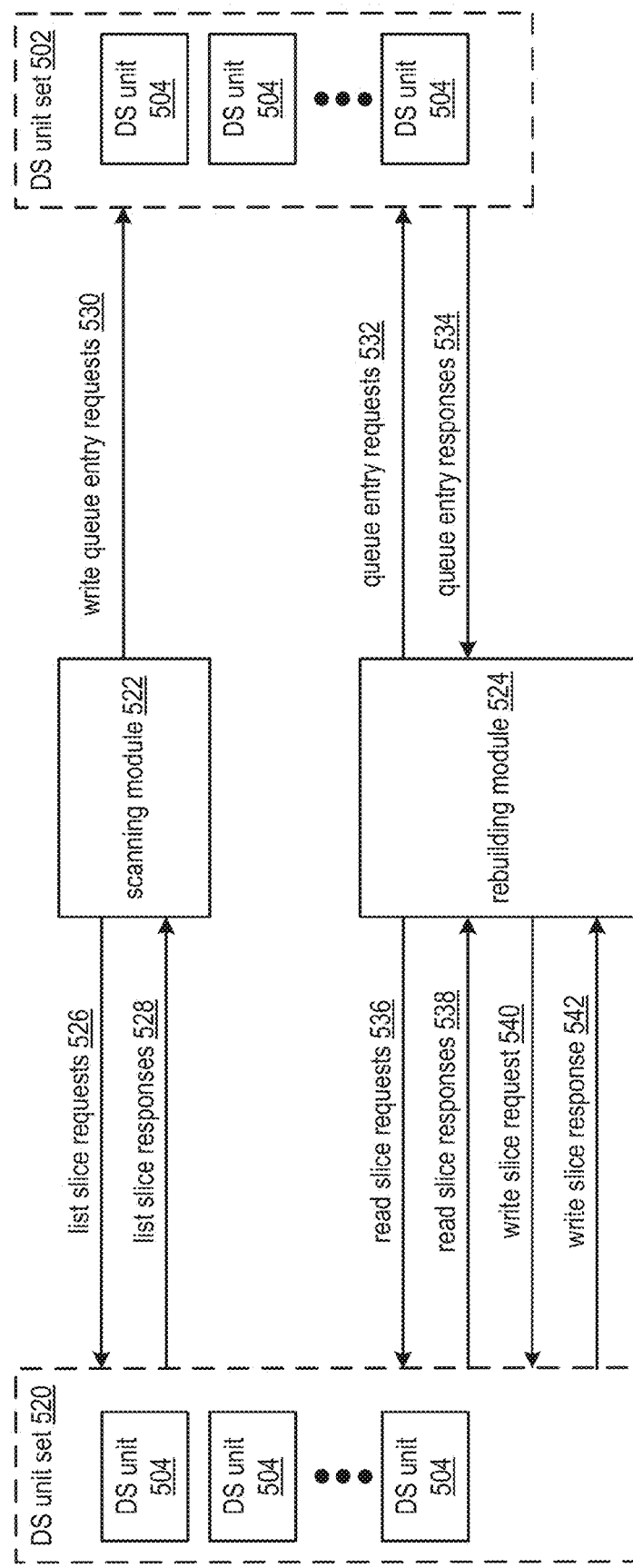
Figure 44B:
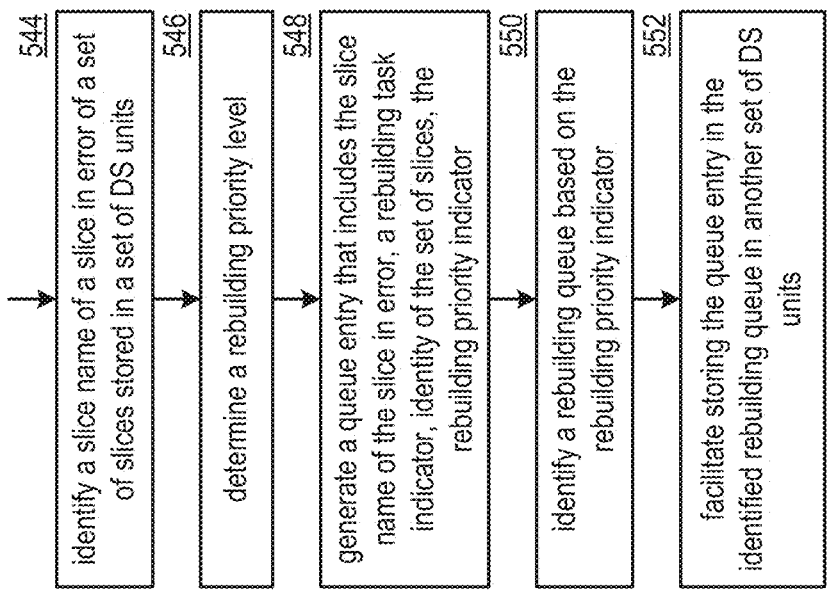
Figure 45A:
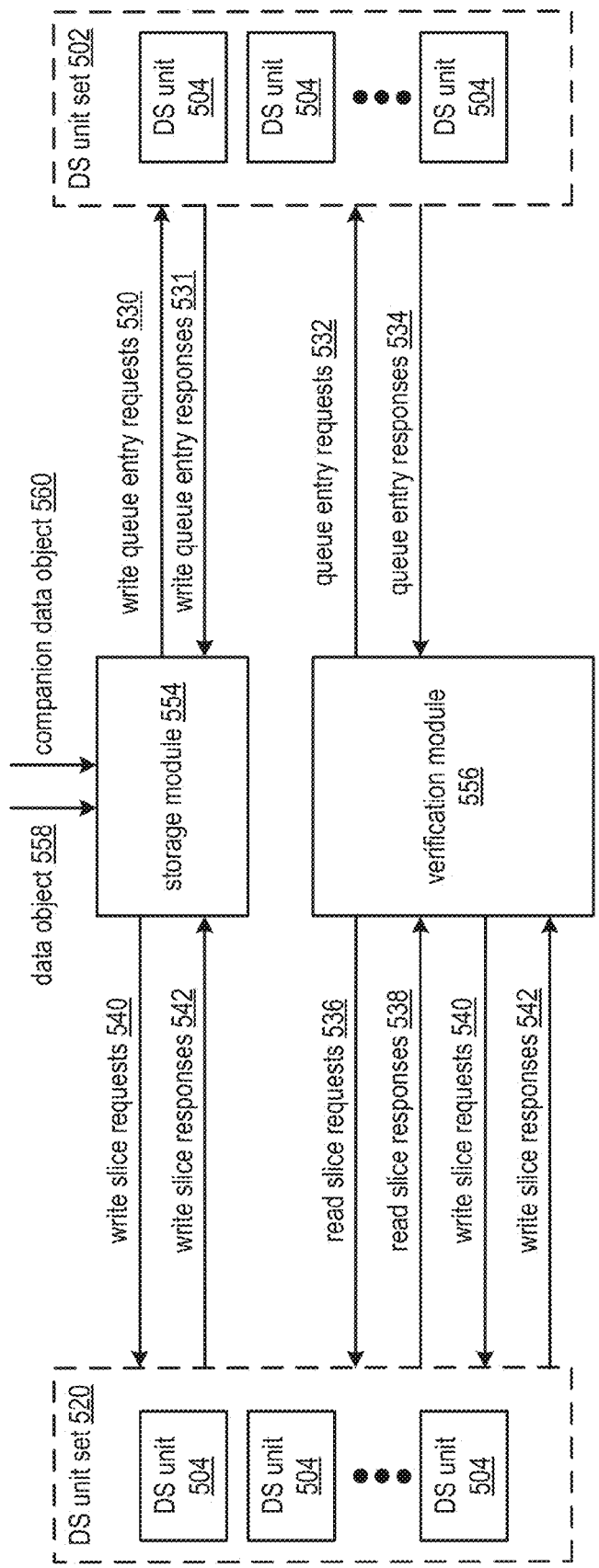
Figure 46A:
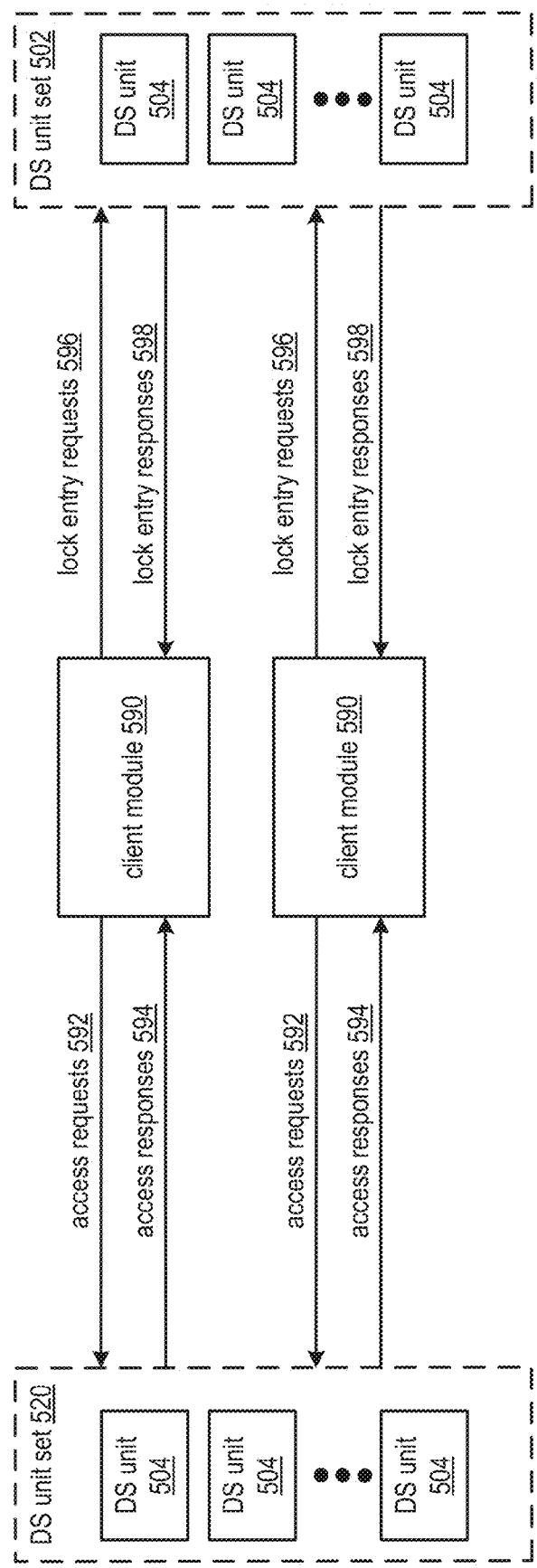
Figure 47:
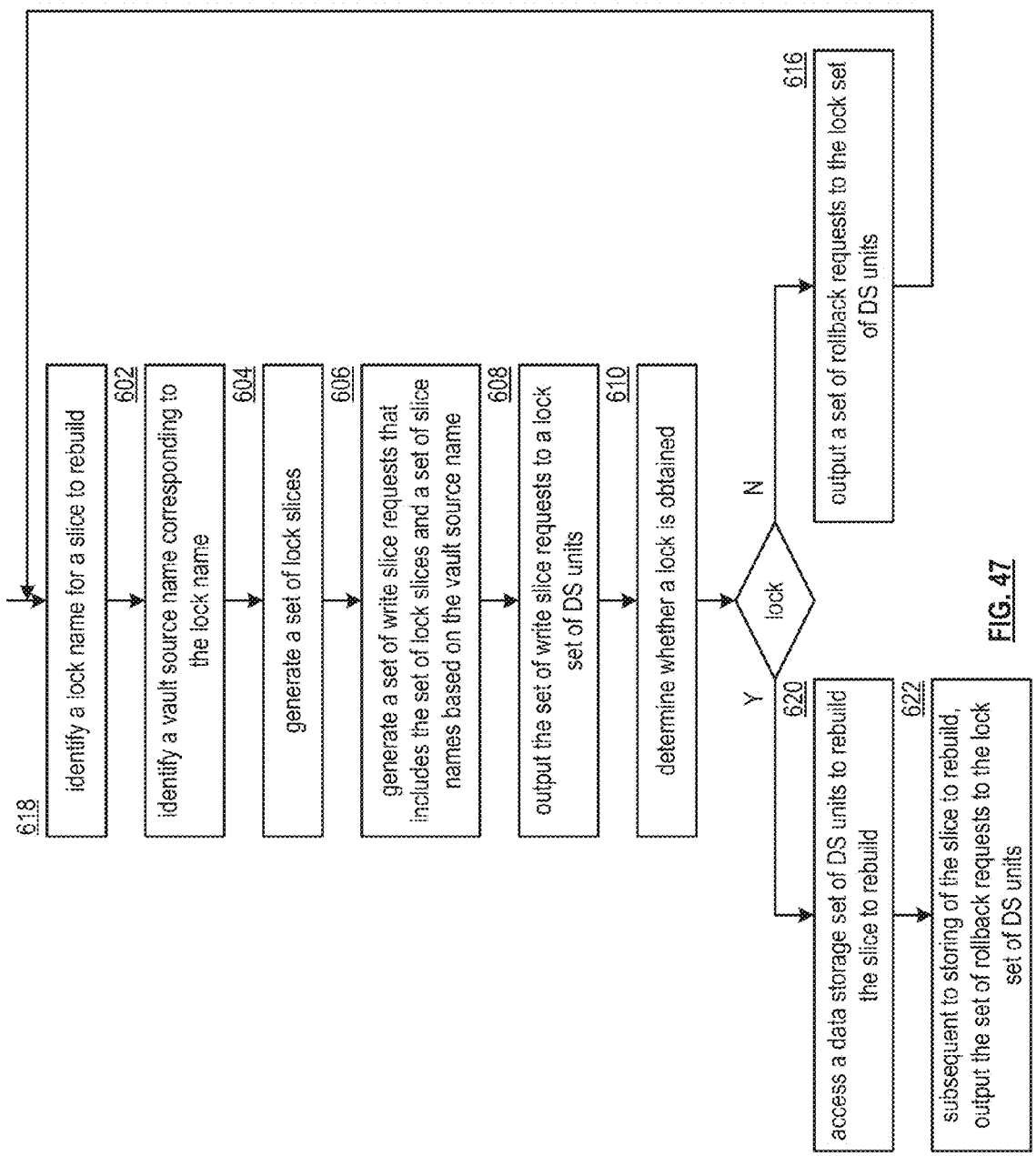
Figure 48A:
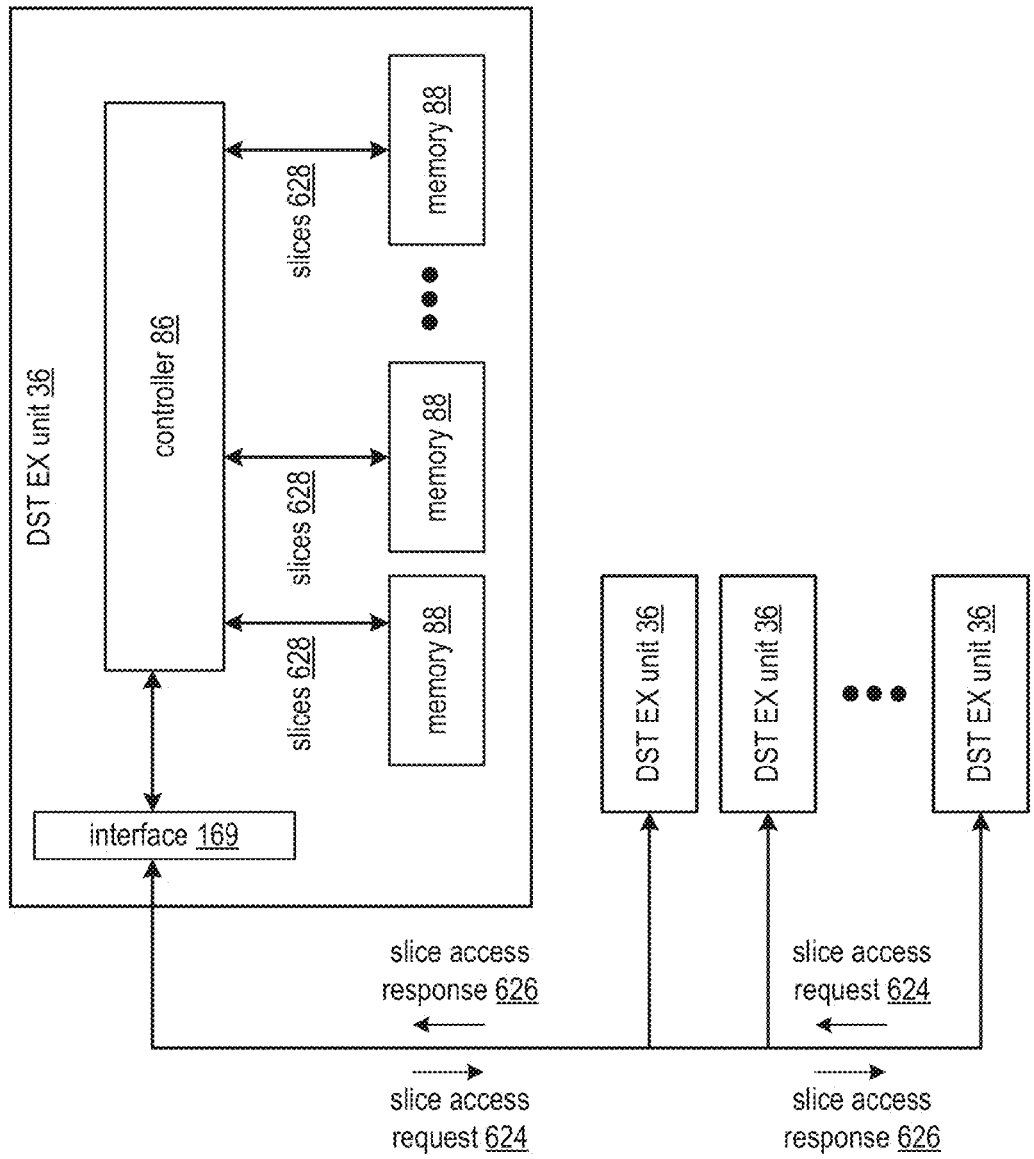
Figure 48B:
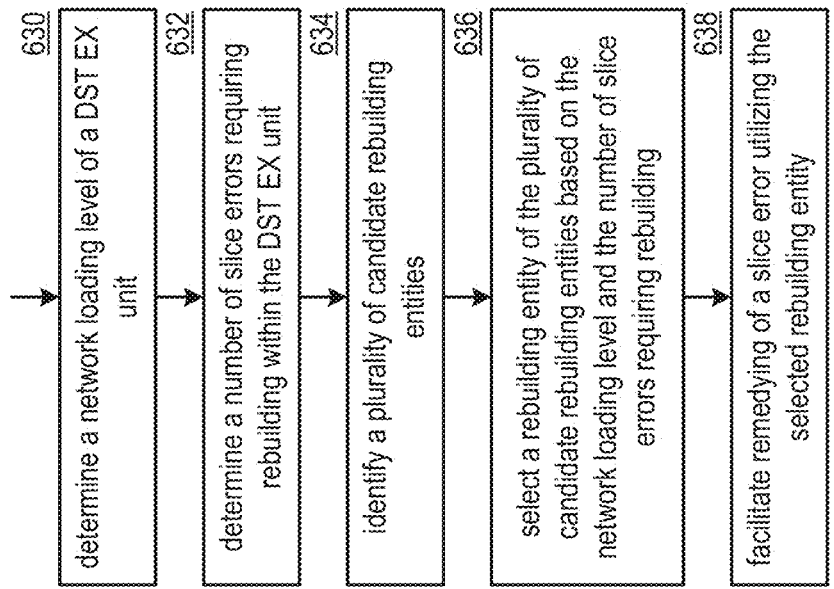
Figure 49:
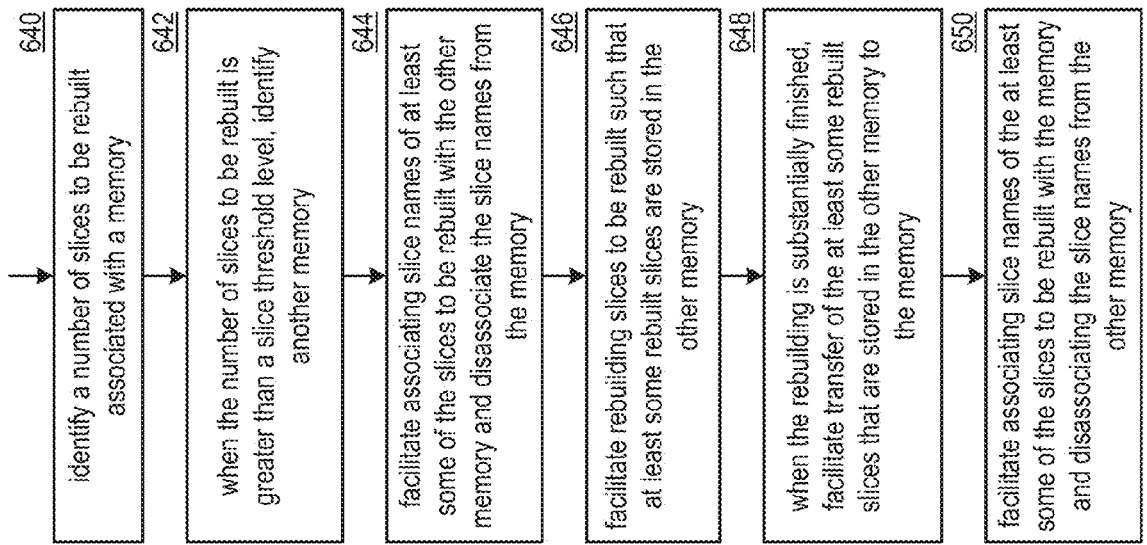

FIGS. 41A-C are schematic block diagrams of another embodiment of a distributed computing system in accordance with the present invention;

FIG. 41D is a flowchart illustrating an example of updating a dynamic plurality of computing functions in accordance with the present invention;

FIGS. 42A-E are schematic block diagrams of another embodiment of a distributed computing system in accordance with the present invention;

FIG. 42F is a flowchart illustrating an example of processing a distributed computing function in accordance with the present invention;

FIG. 43A is a schematic block diagram of another embodiment of a dispersed storage system in accordance with the present invention;

FIG. 43B is a flowchart illustrating an example of acquiring a task in accordance with the present invention;

FIG. 44A is a schematic block diagram of another embodiment of a dispersed storage system in accordance with the present invention;

FIG. 44B is a flowchart illustrating an example of queuing a rebuilding task in accordance with the present invention;

FIG. 45A is a schematic block diagram of another embodiment of a dispersed storage system in accordance with the present invention;

FIG. 45B is a flowchart illustrating another example of storing data in accordance with the present invention;

FIG. 45C is a flowchart illustrating another example of storing data in accordance with the present invention;

FIG. 46A is a schematic block diagram of another embodiment of a dispersed storage system in accordance with the present invention;

FIG. 46B is a flowchart illustrating an example of obtaining a dispersed lock in accordance with the present invention;

FIG. 47 is a flowchart illustrating an example of rebuilding a data slice in accordance with the present invention;

FIG. 48A is a schematic block diagram of another embodiment of a dispersed storage system in accordance with the present invention;

FIG. 48B is a flowchart illustrating an example of selecting a rebuilding entity in accordance with the present invention; and FIG. 49 is a flowchart illustrating another example of rebuilding a data slice in accordance with the present invention.

DETAILED DESCRIPTION OF THE INVENTION

Figure 1:
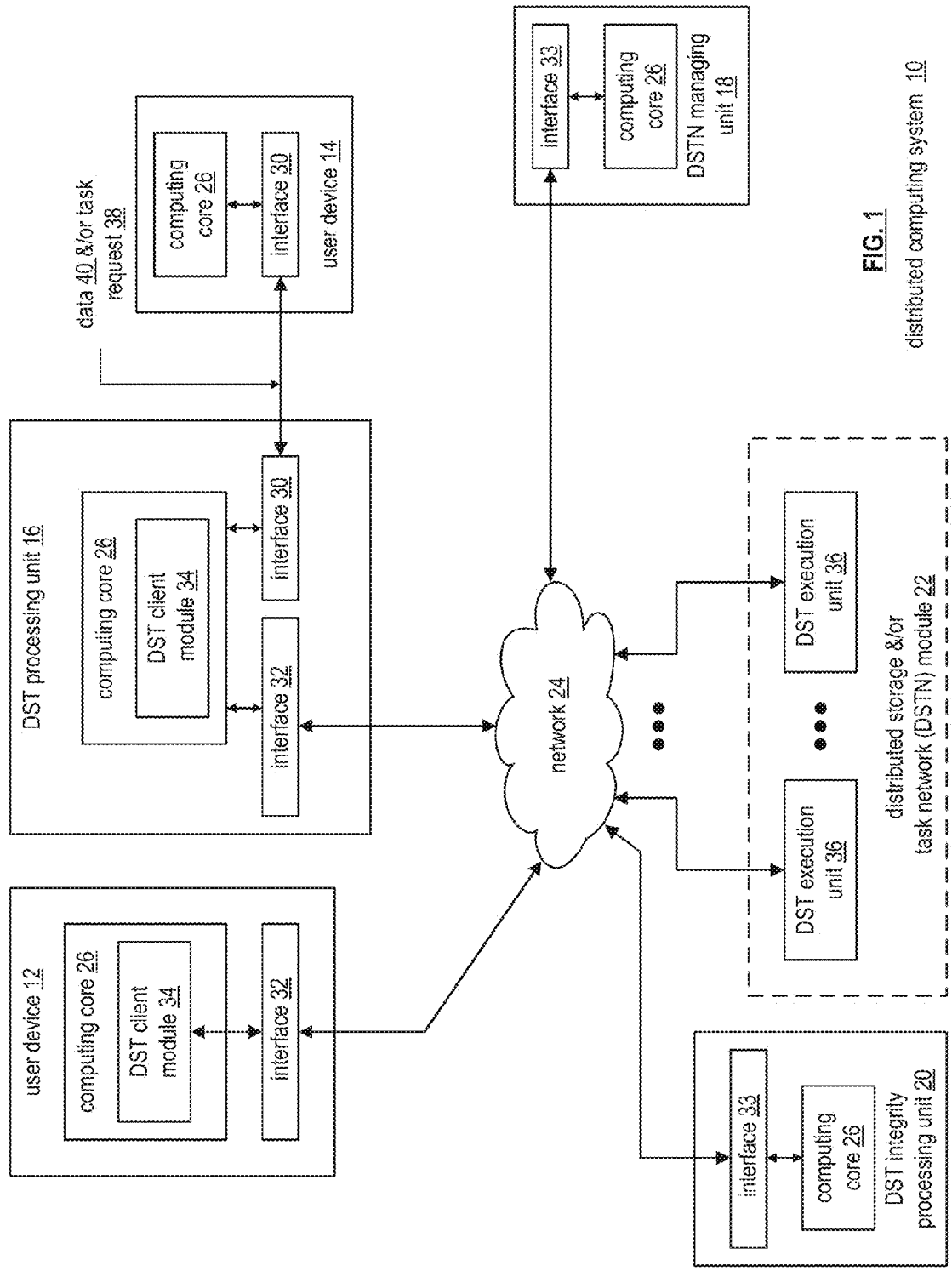
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
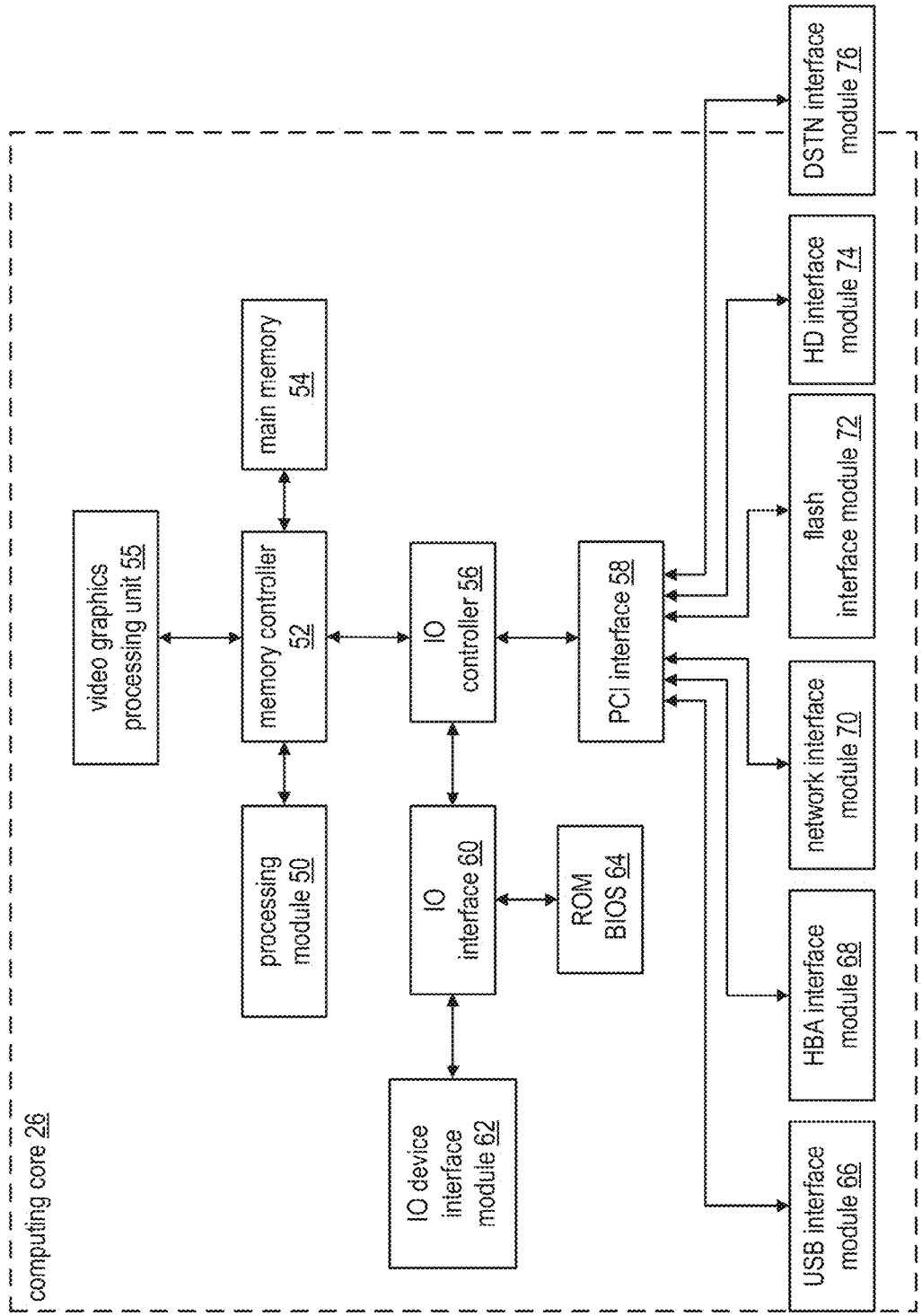
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
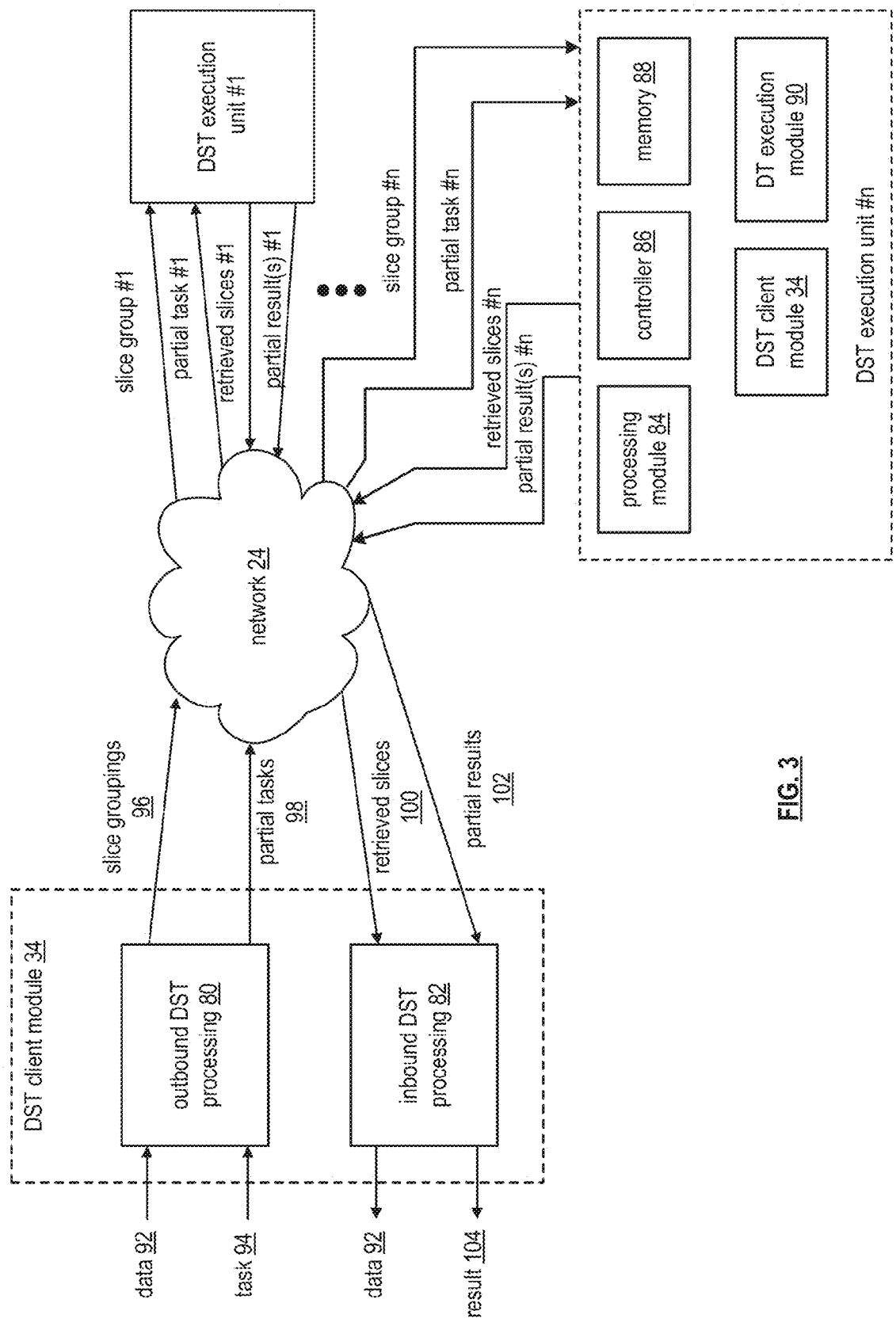
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
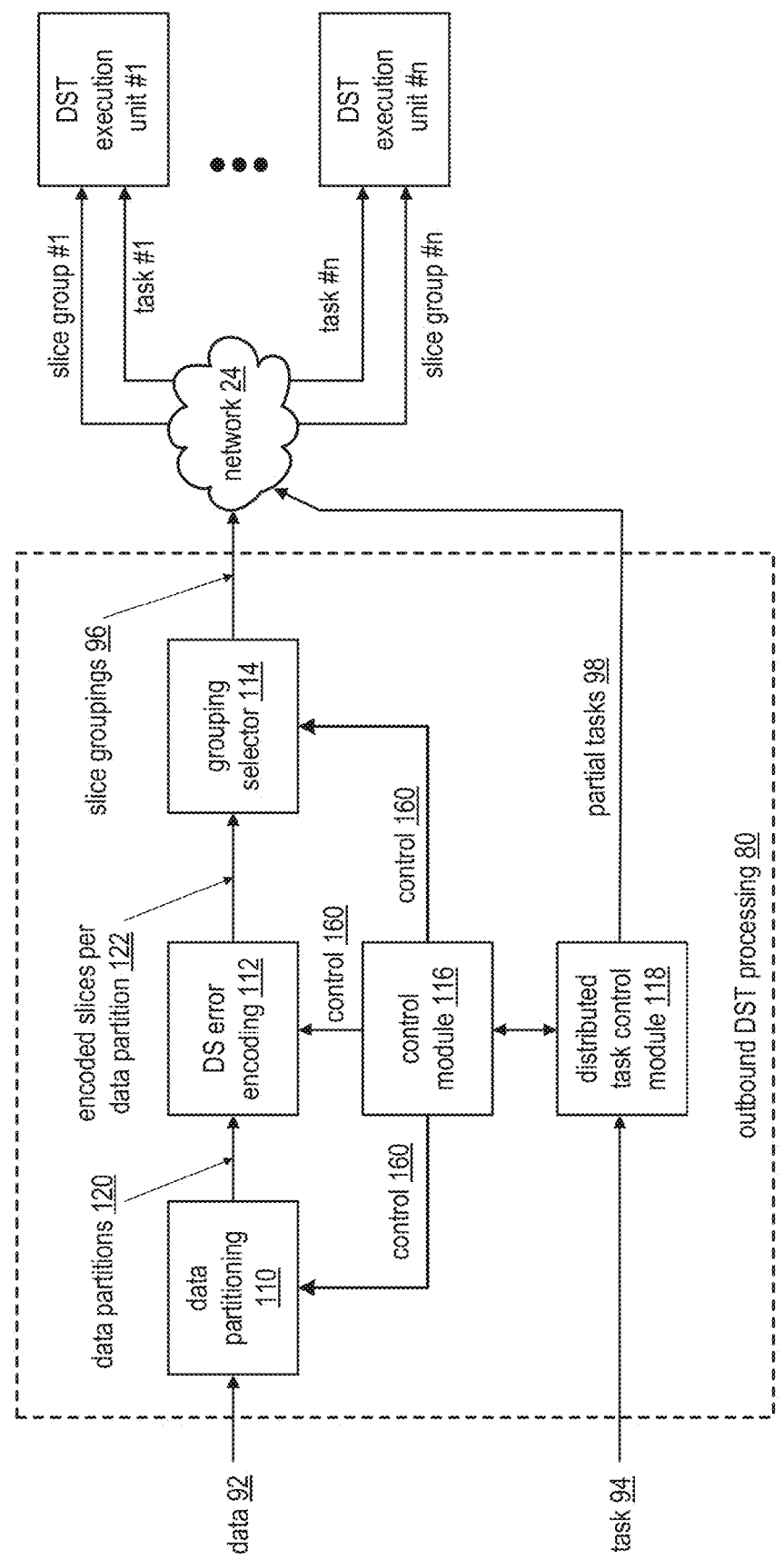
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
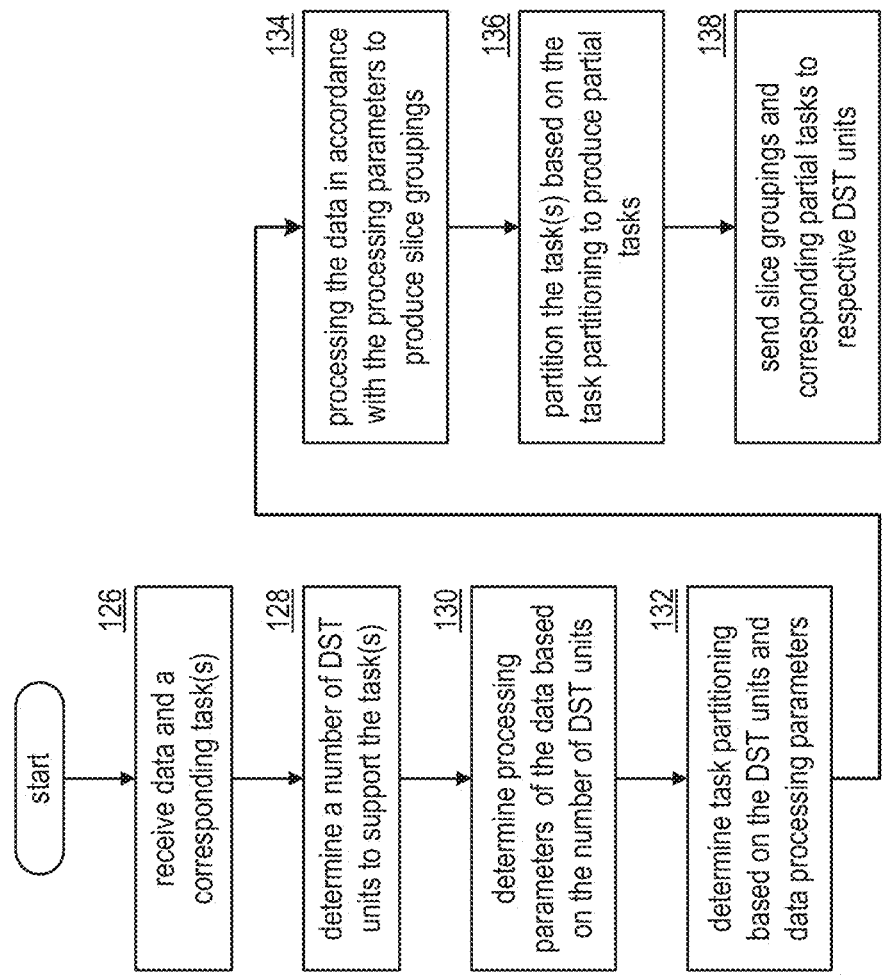
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
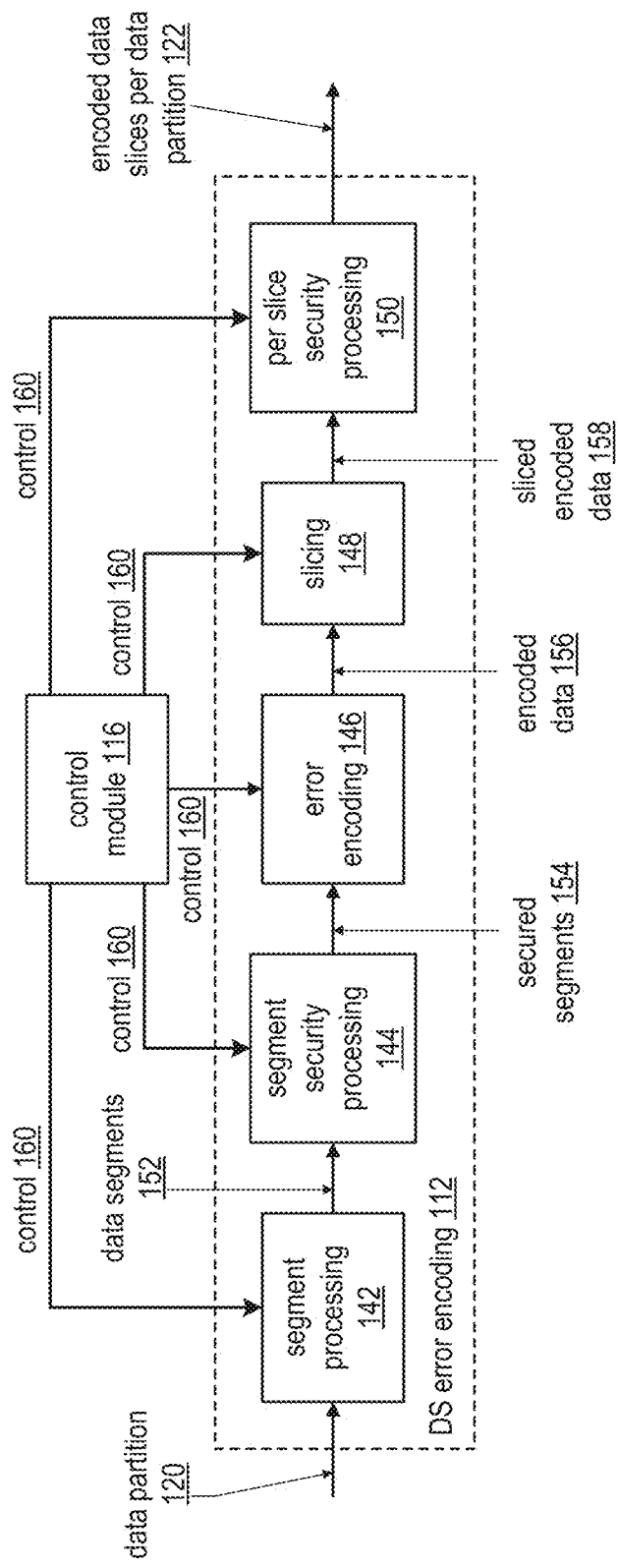
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
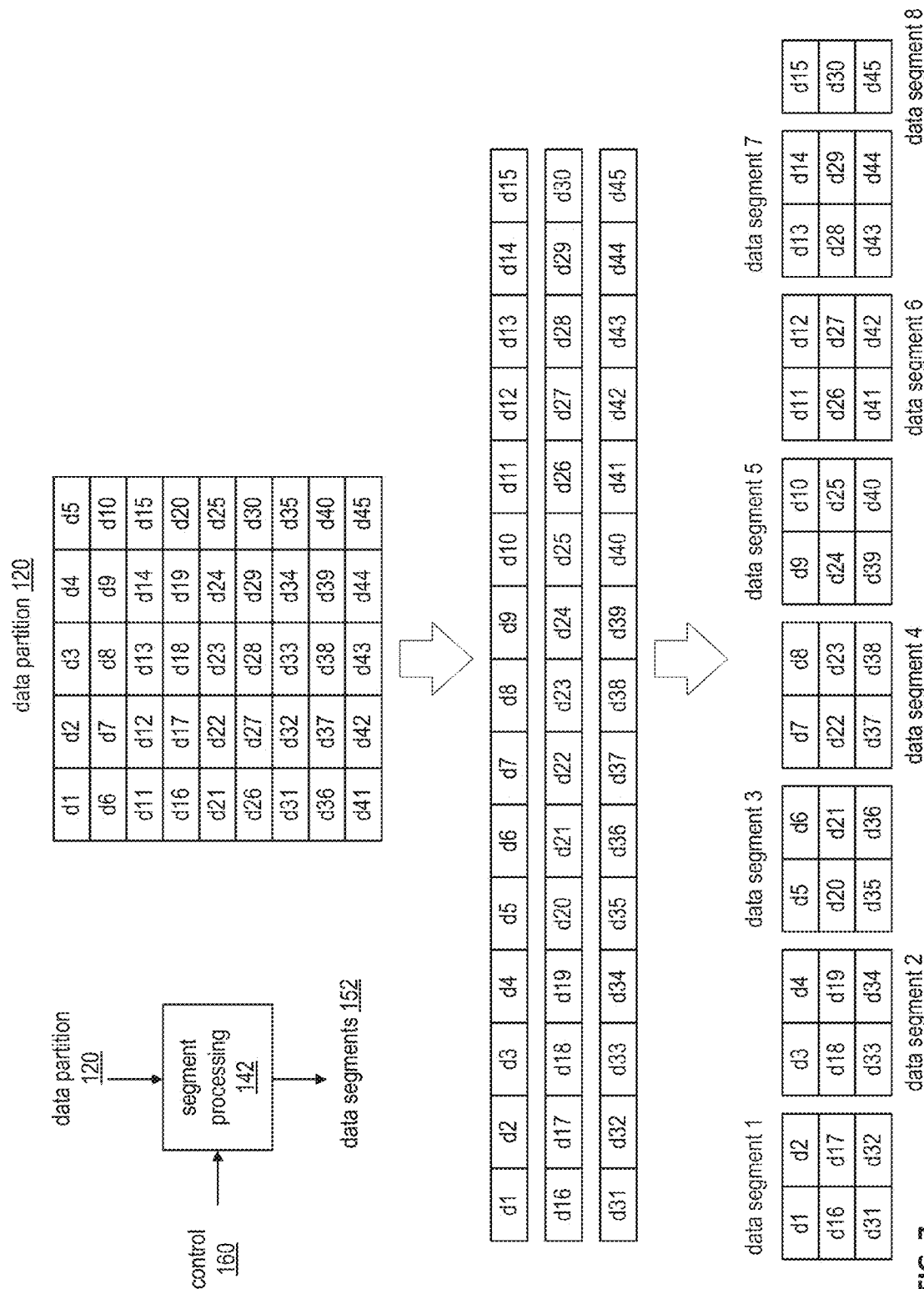
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
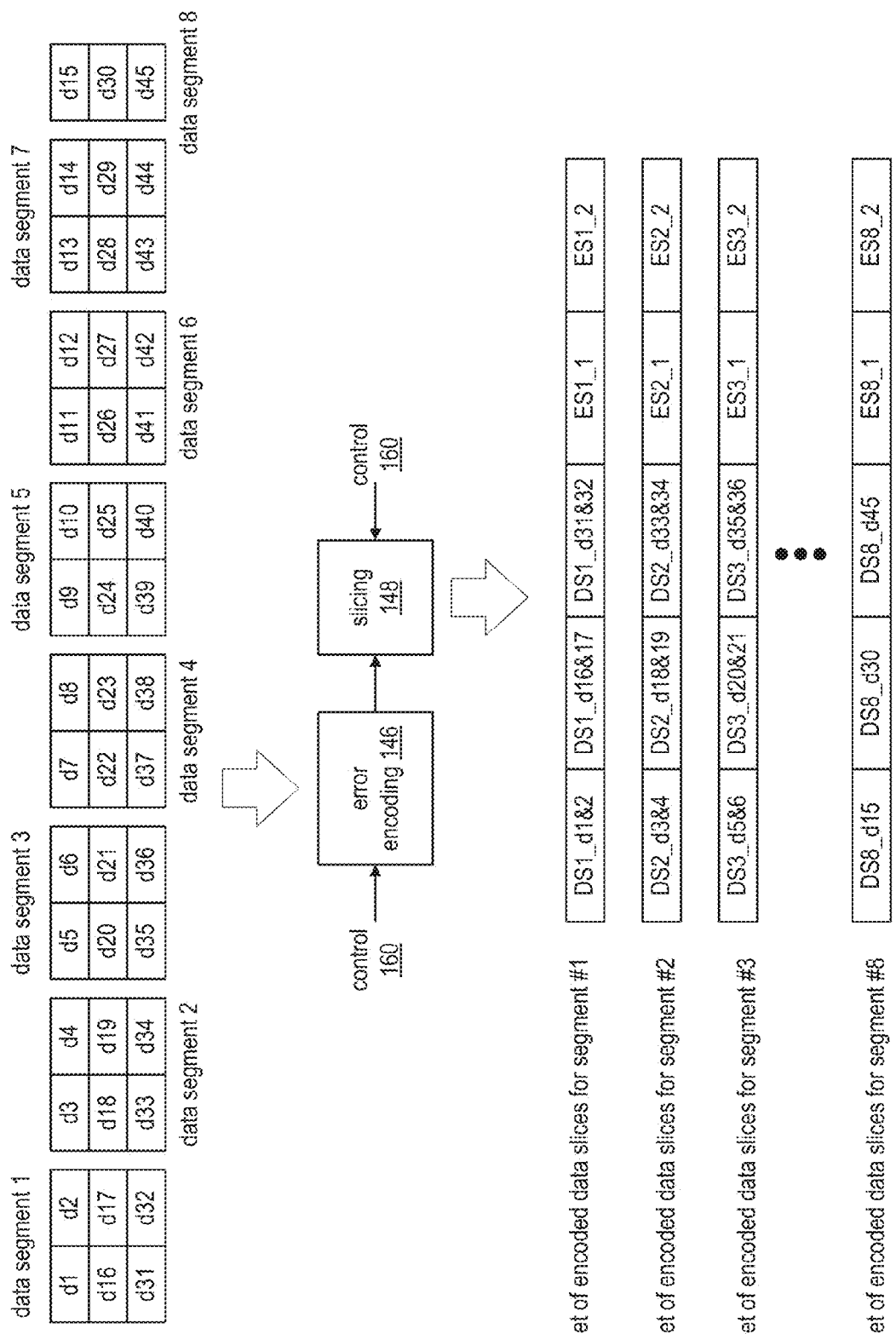
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1_1 and ES1_1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1_1 and ES1_1_2) of the second set of encoded data slices includes error correction data based on the first-third words of the second data segment.

Figure 9:
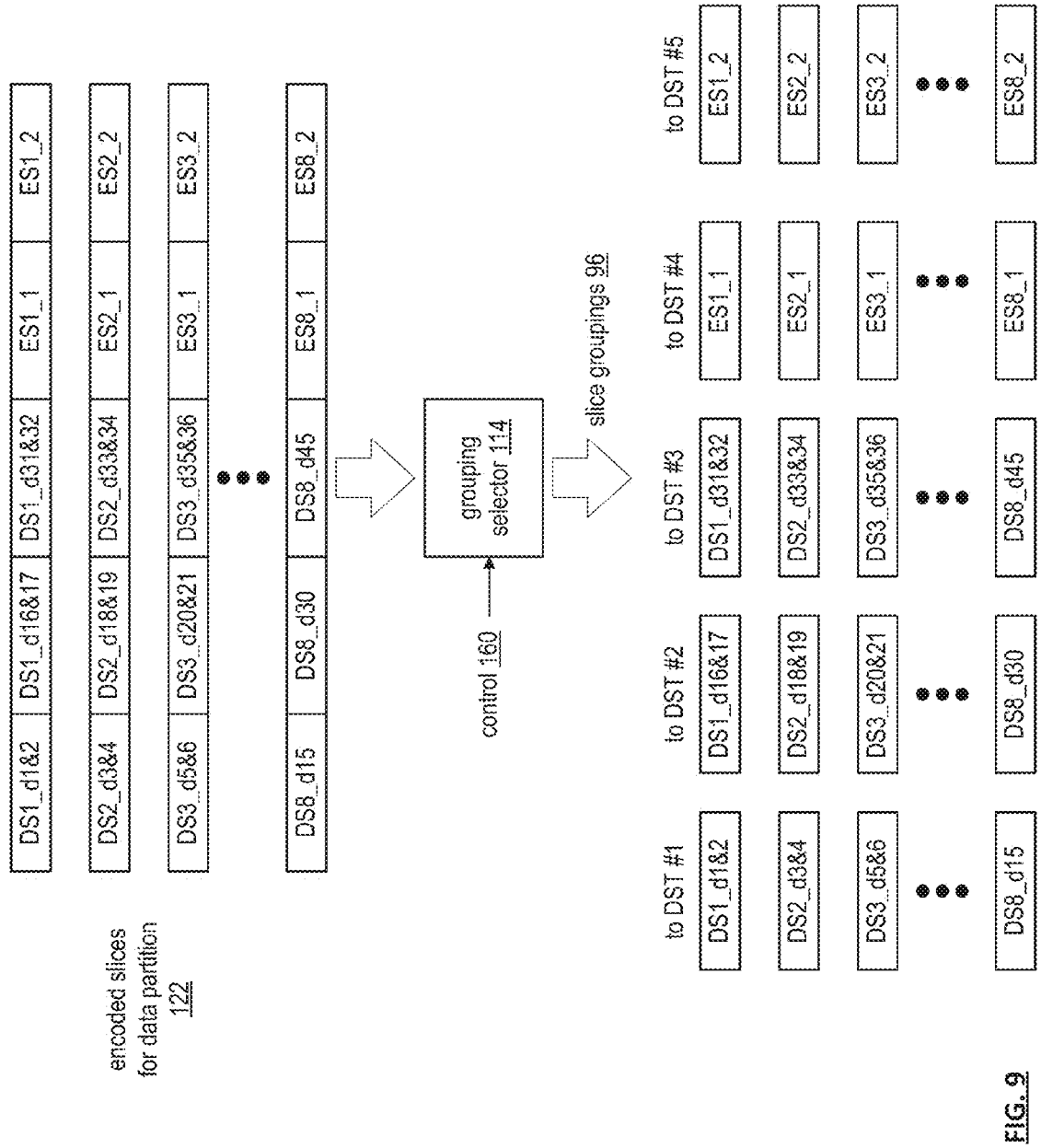
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with grouping selector information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
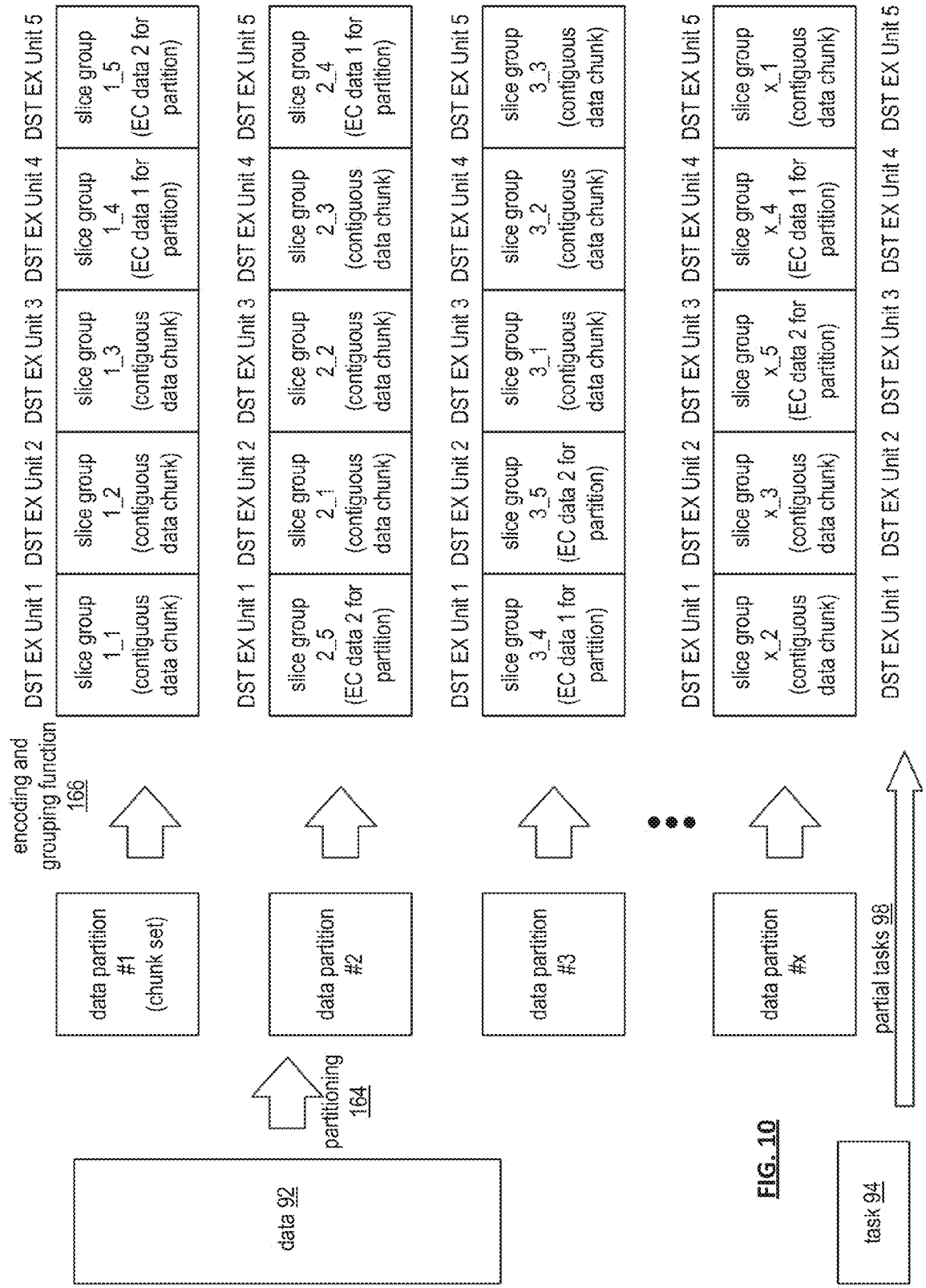
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
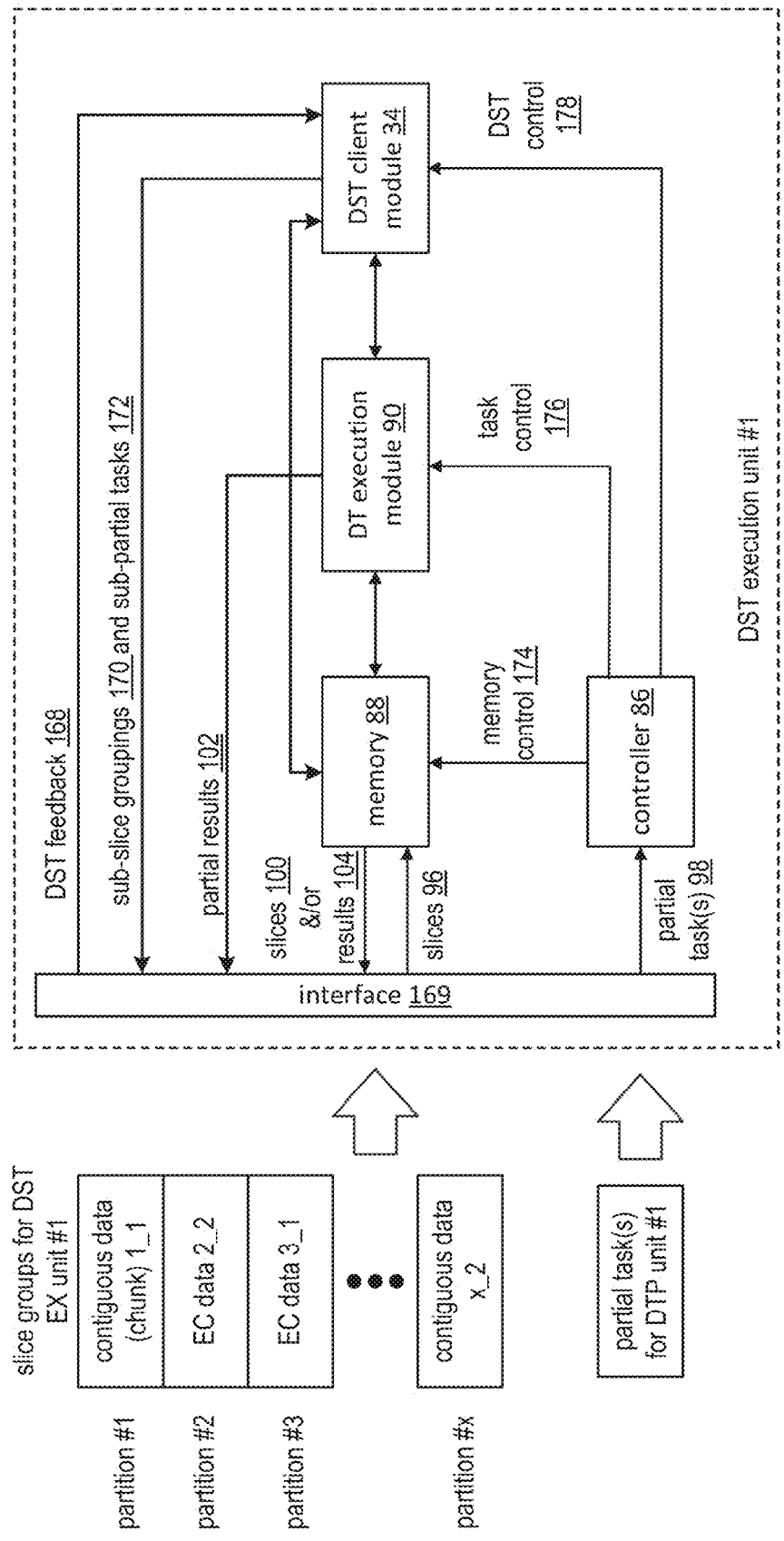
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
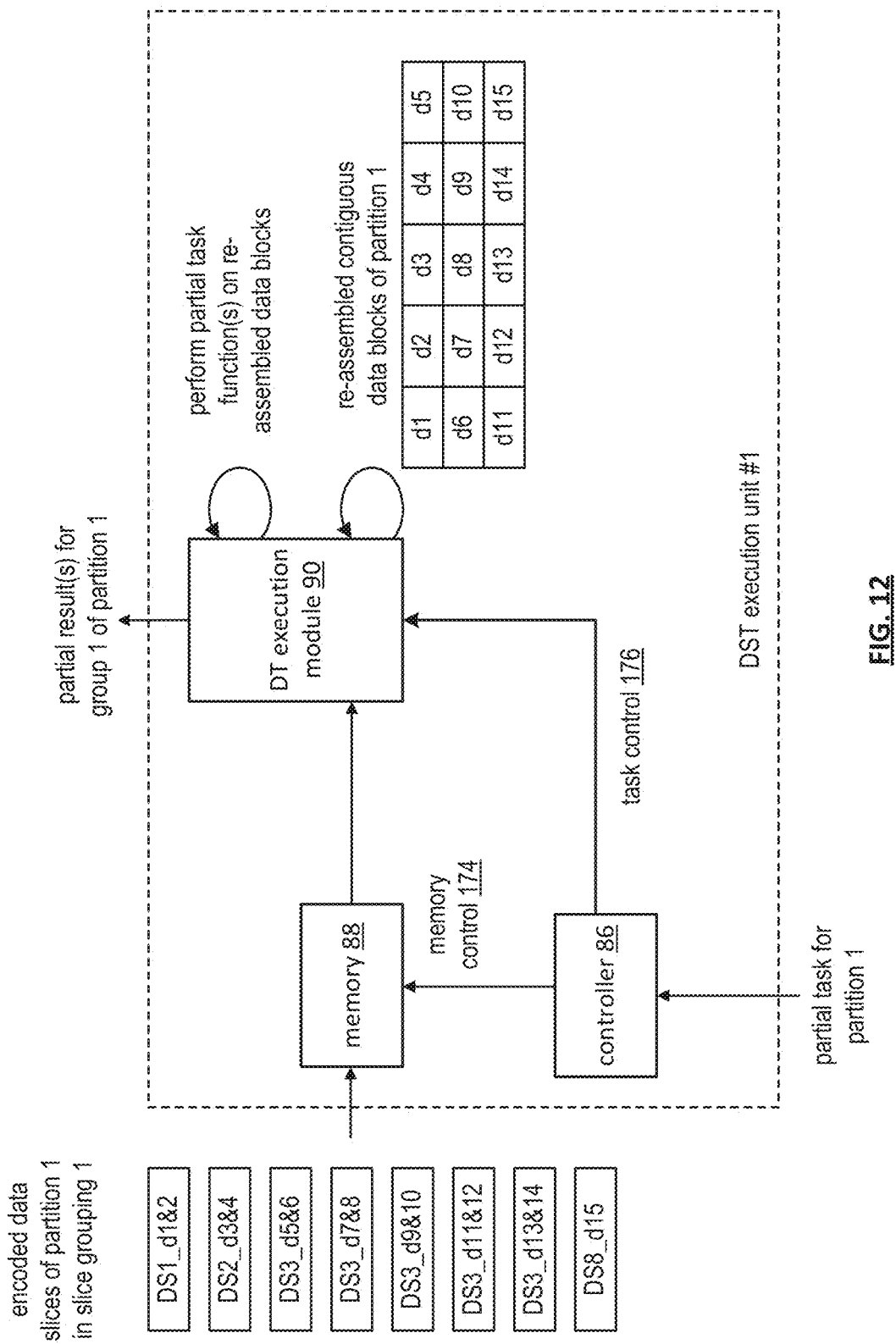
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task contr ol information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
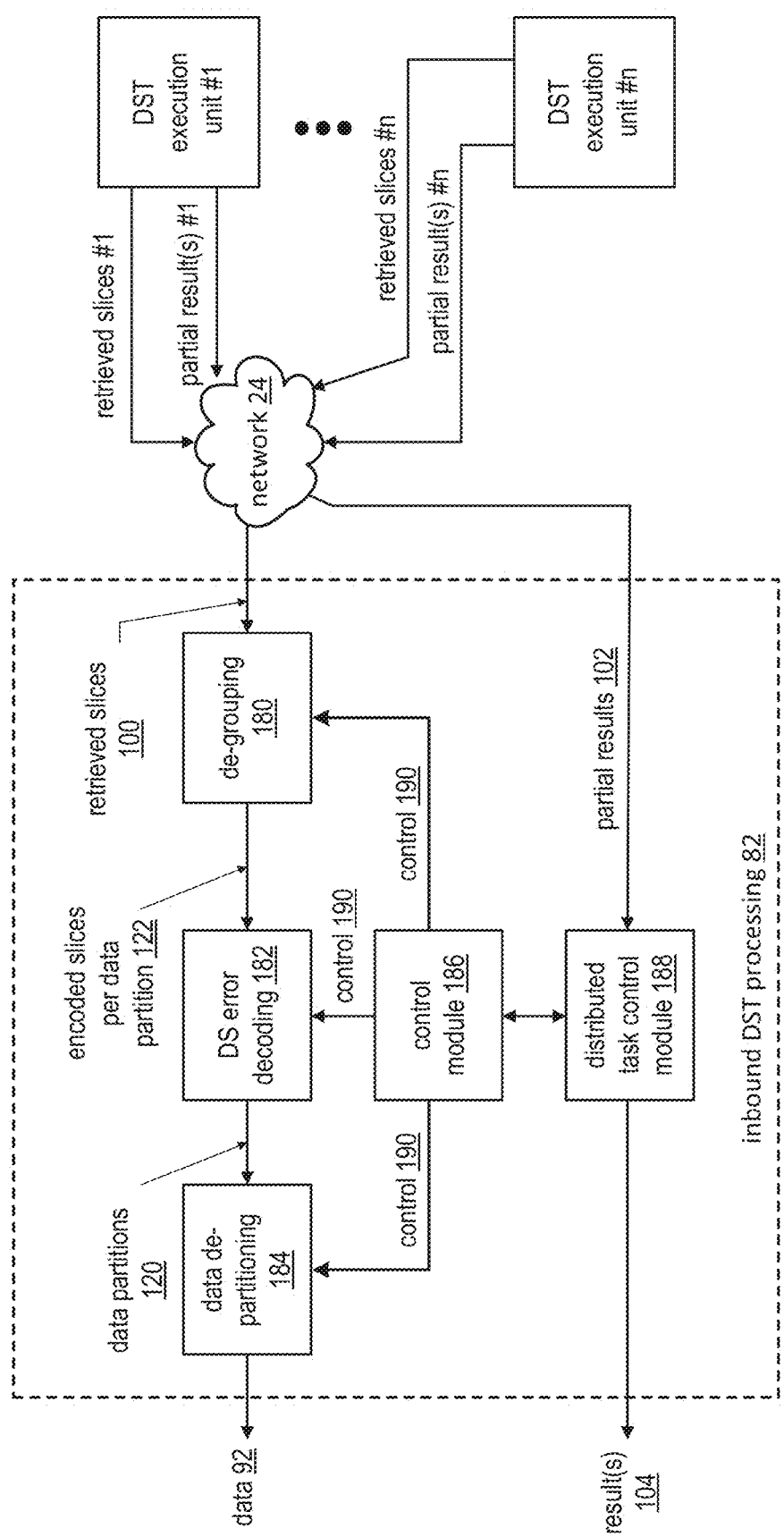
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
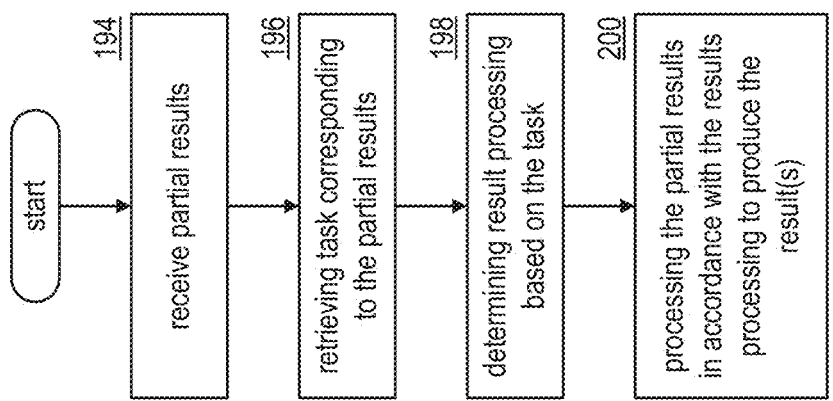
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
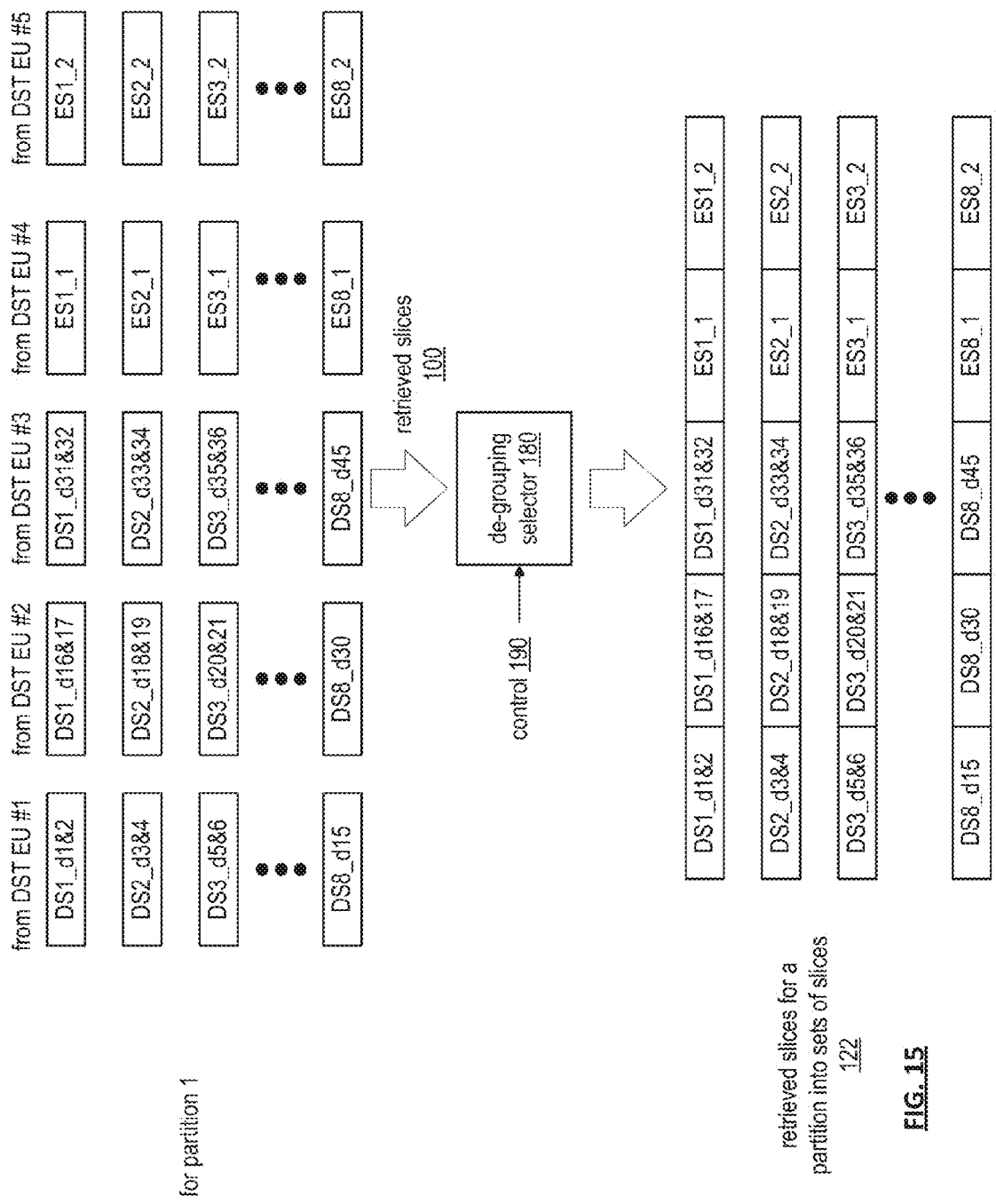
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
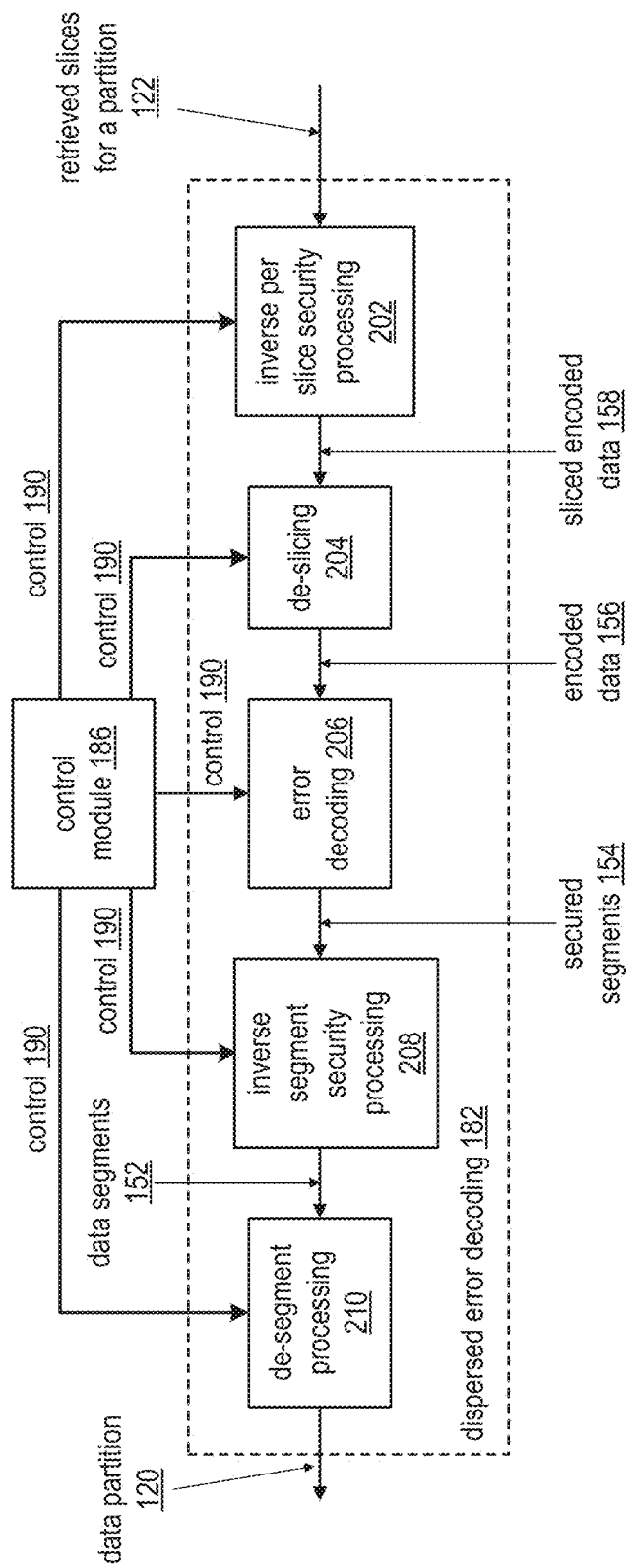
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
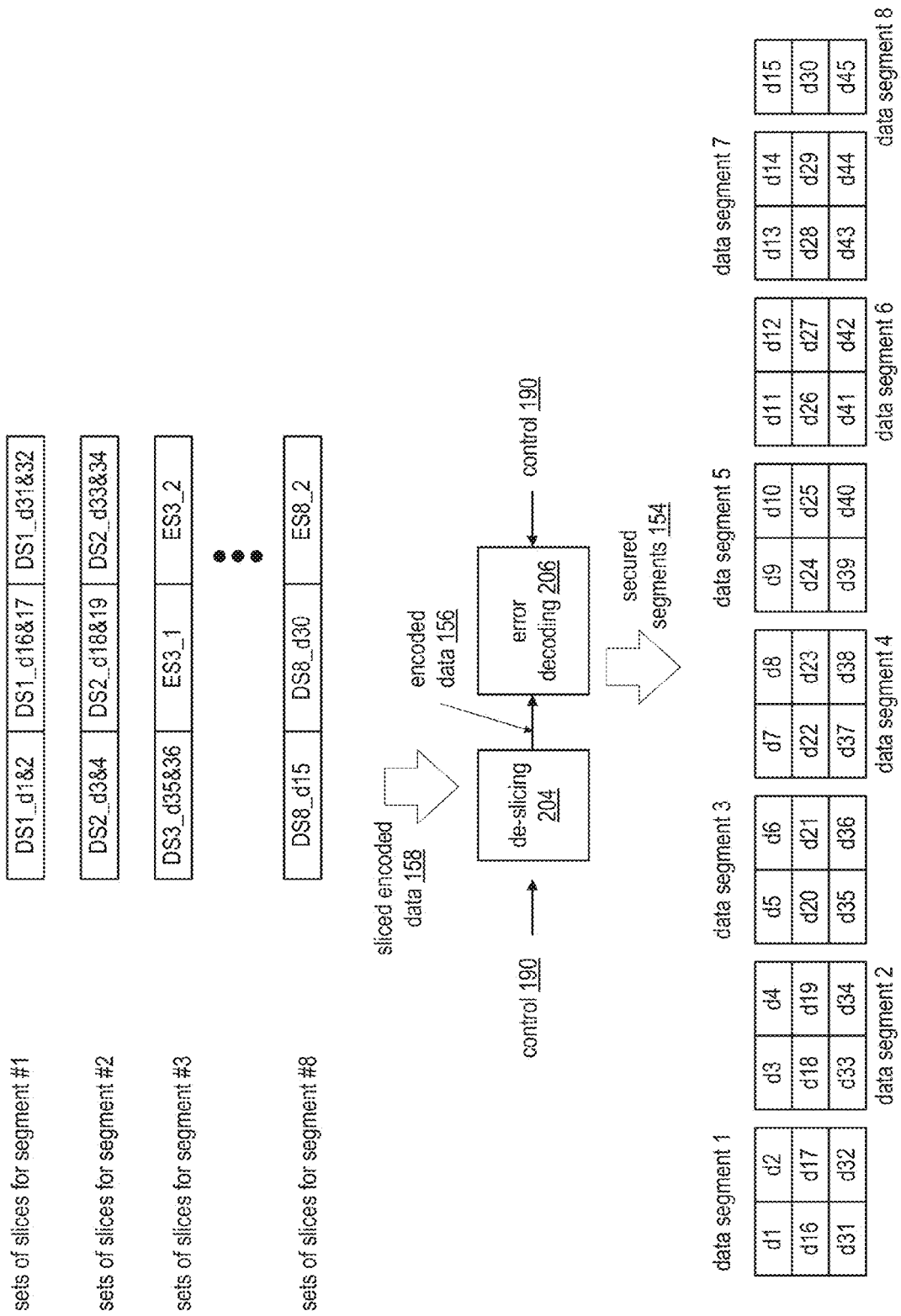
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
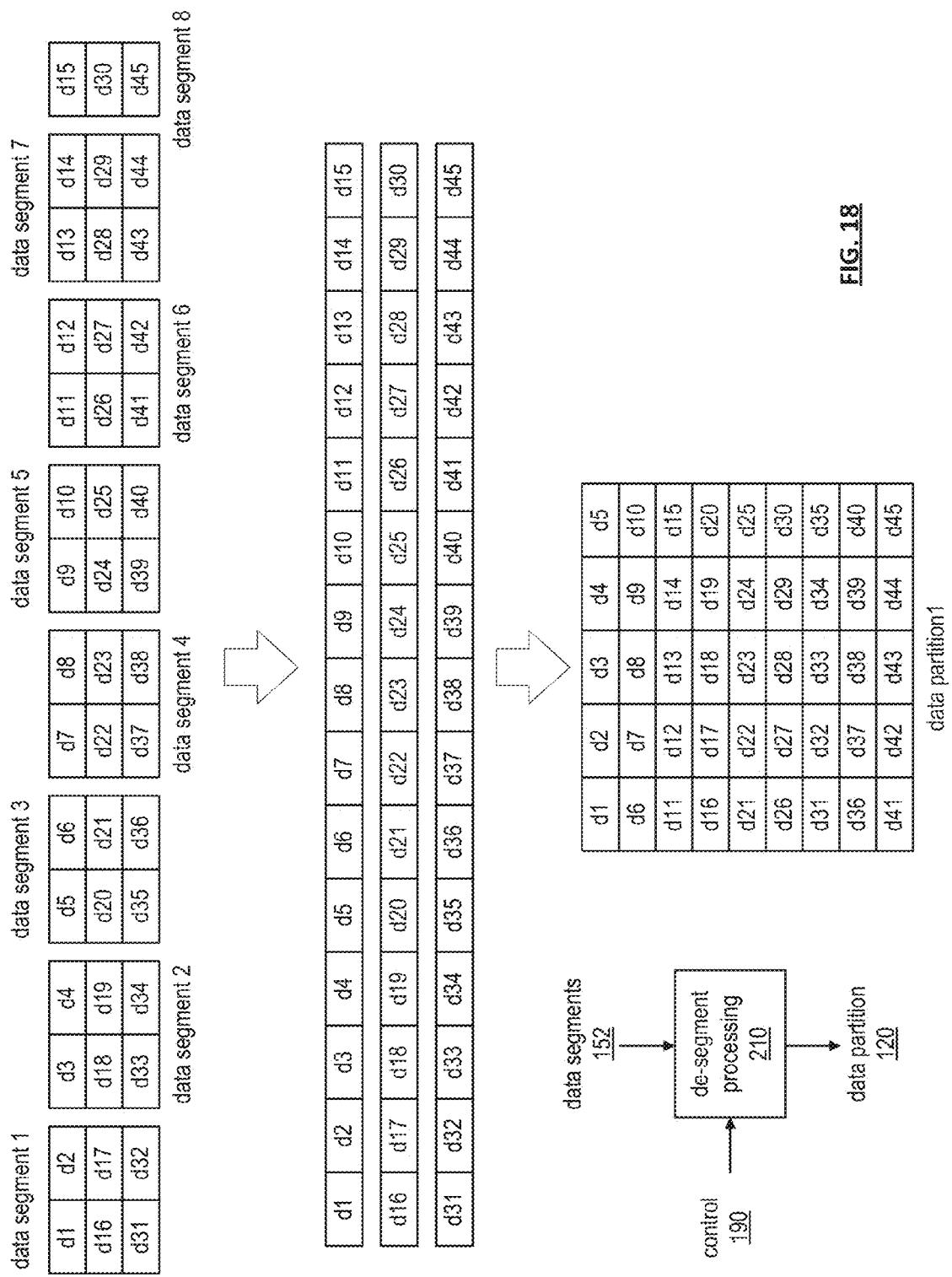
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
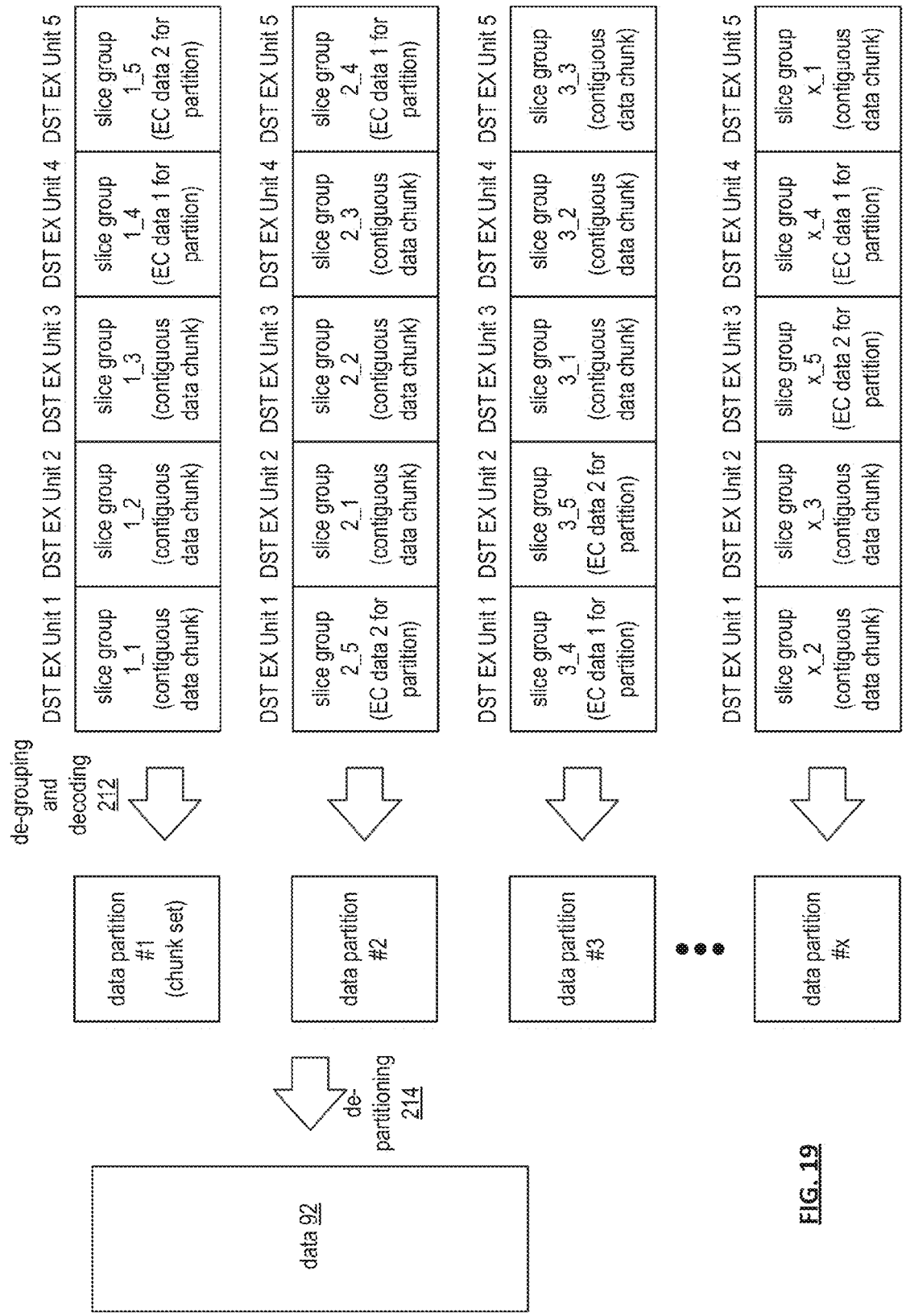
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
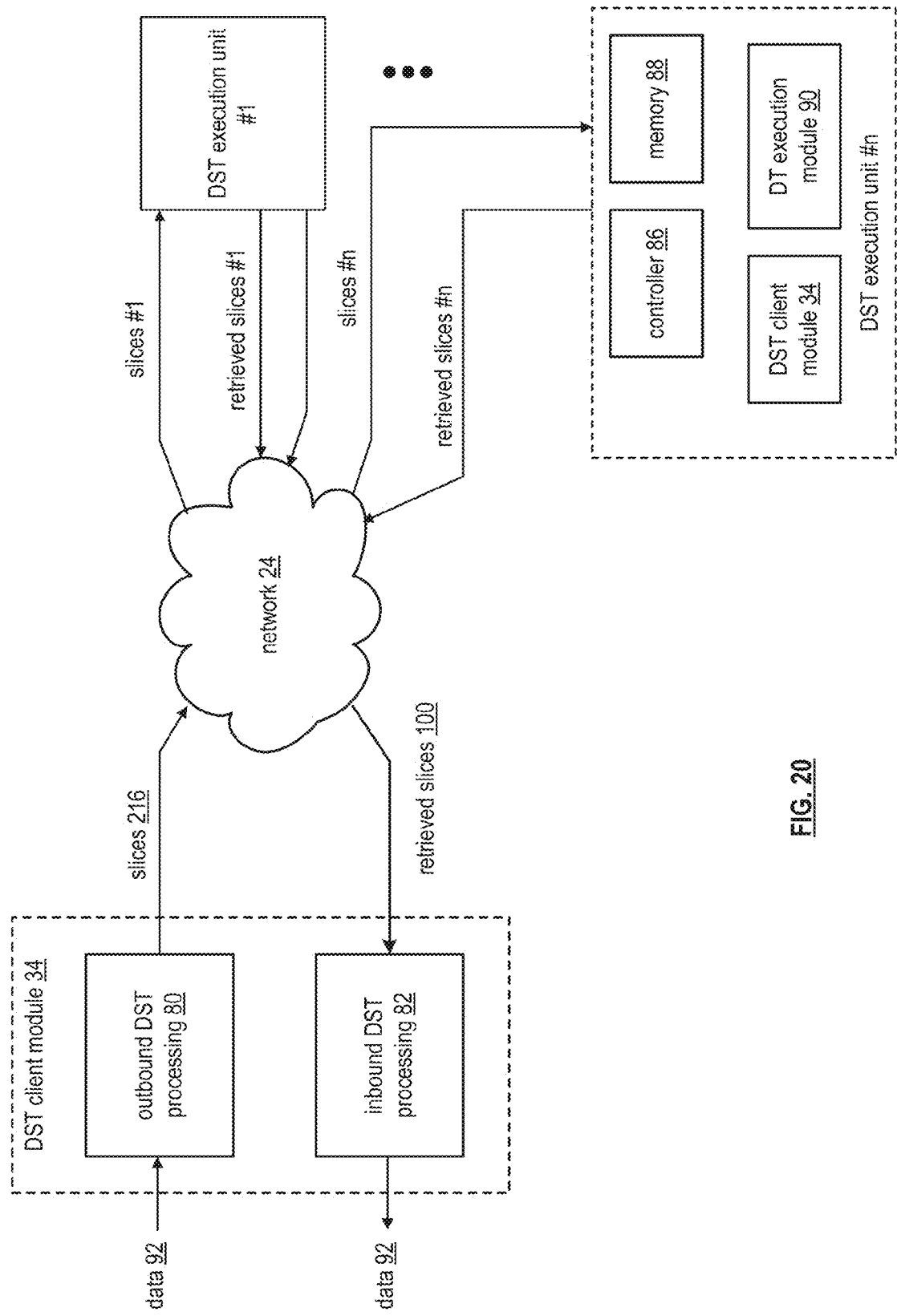
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
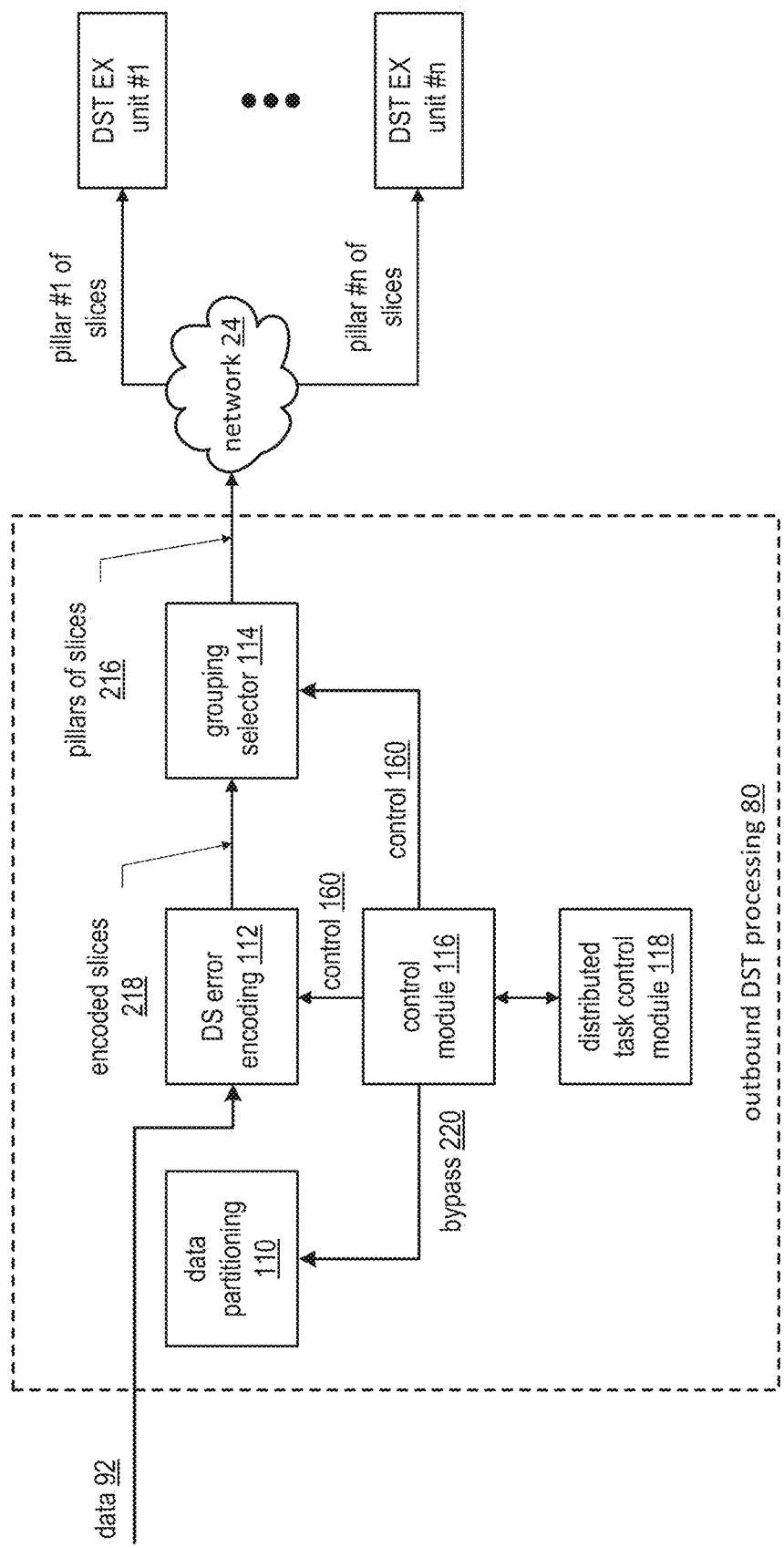
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
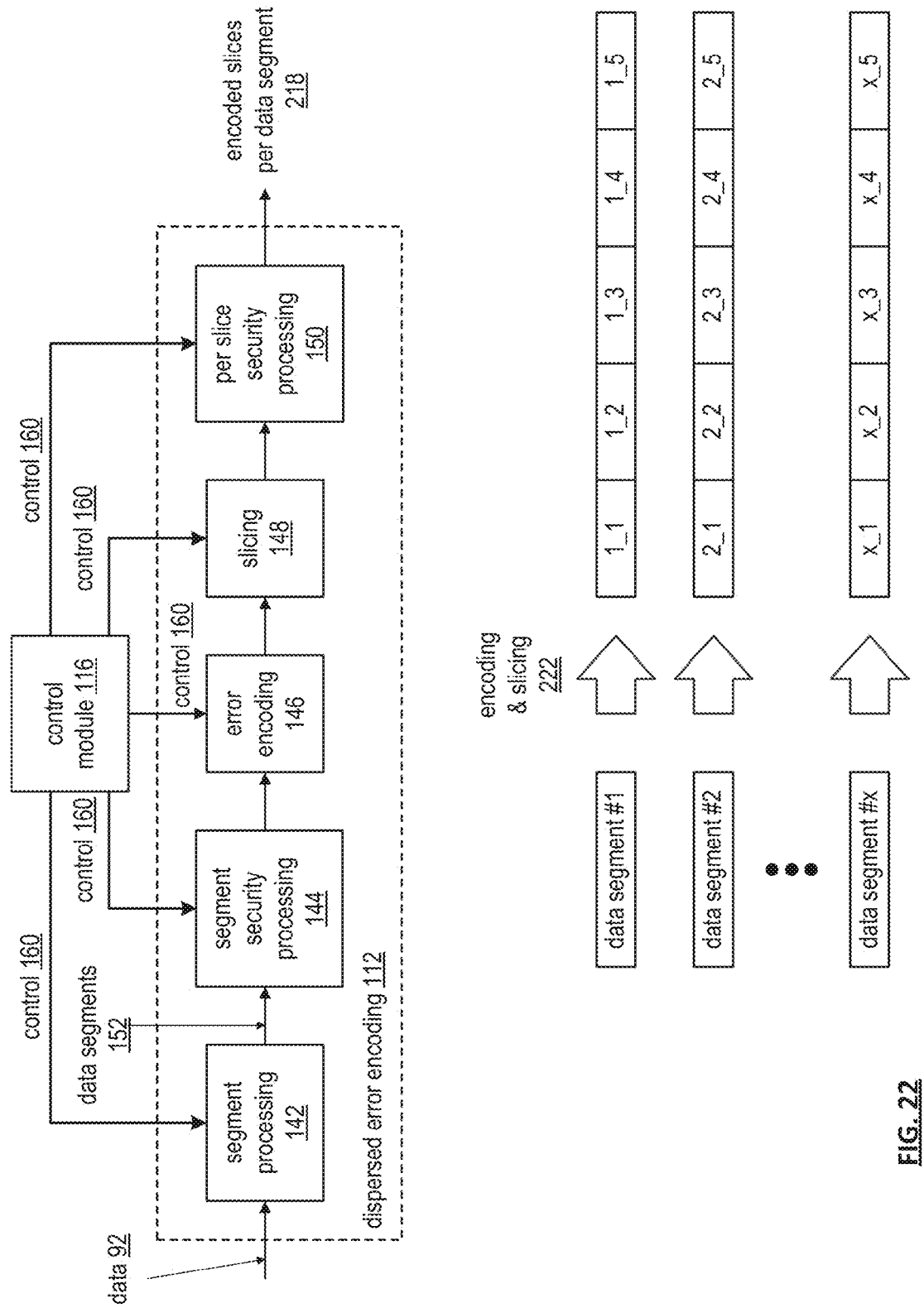
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
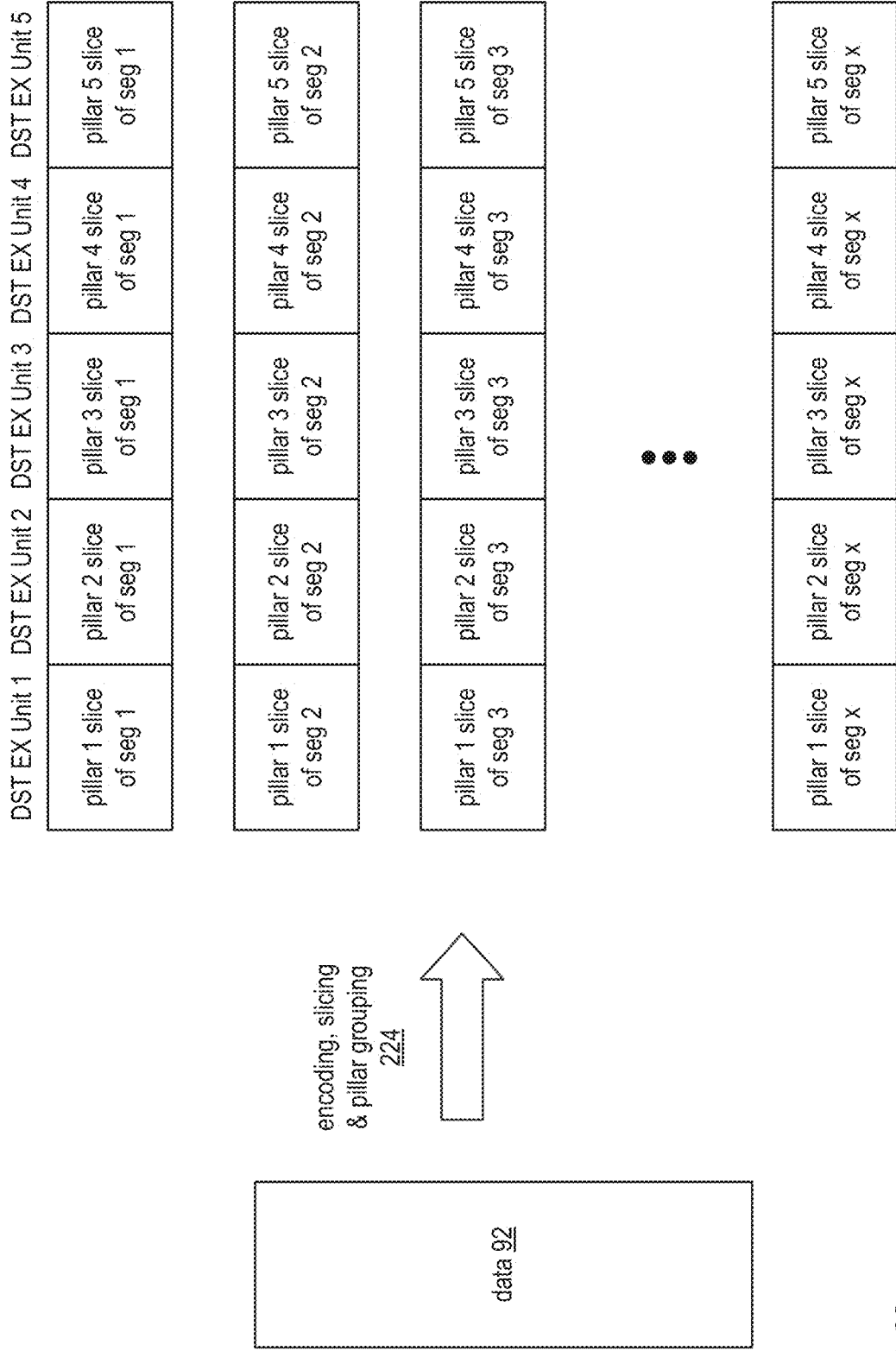
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
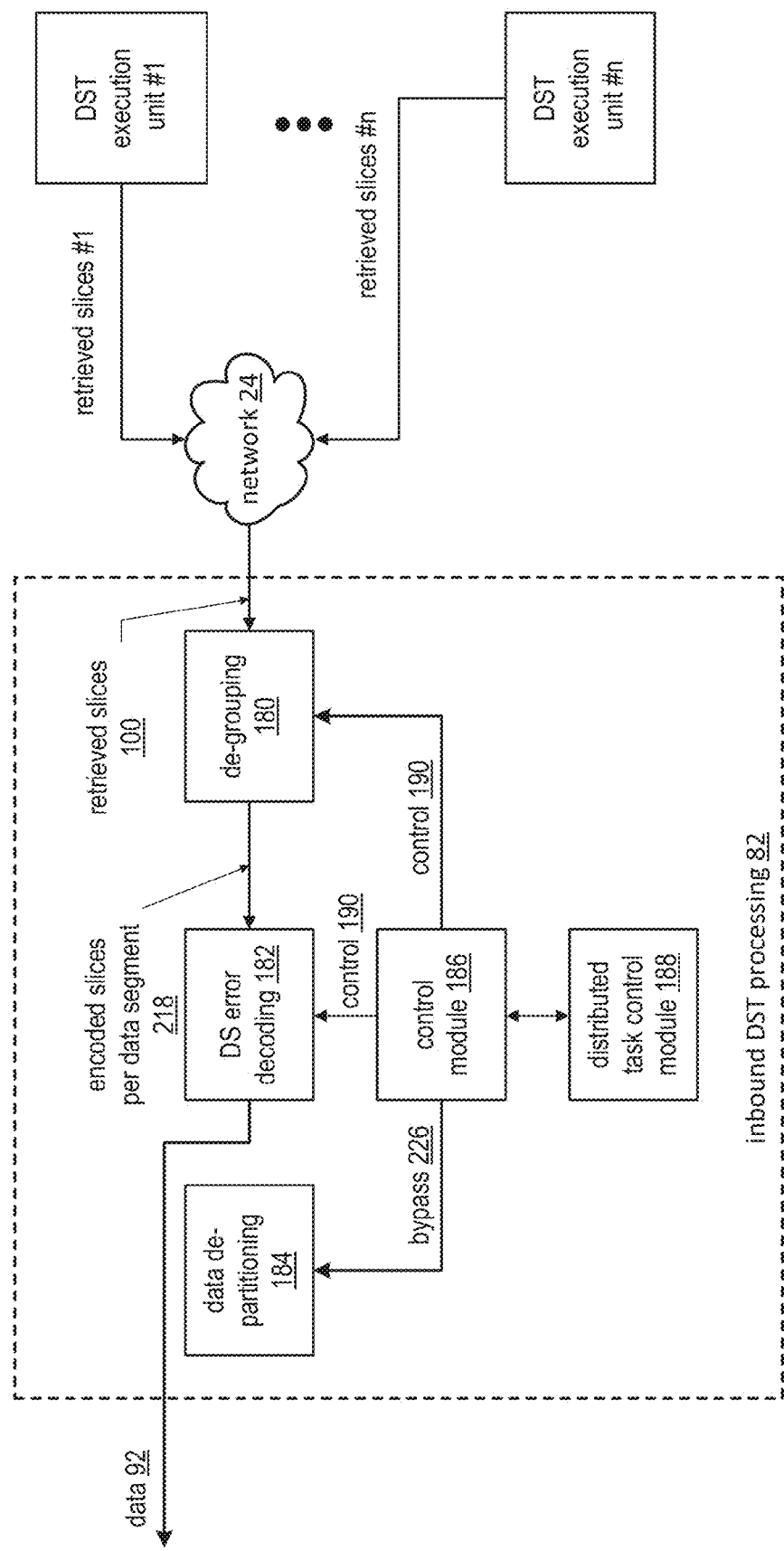
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
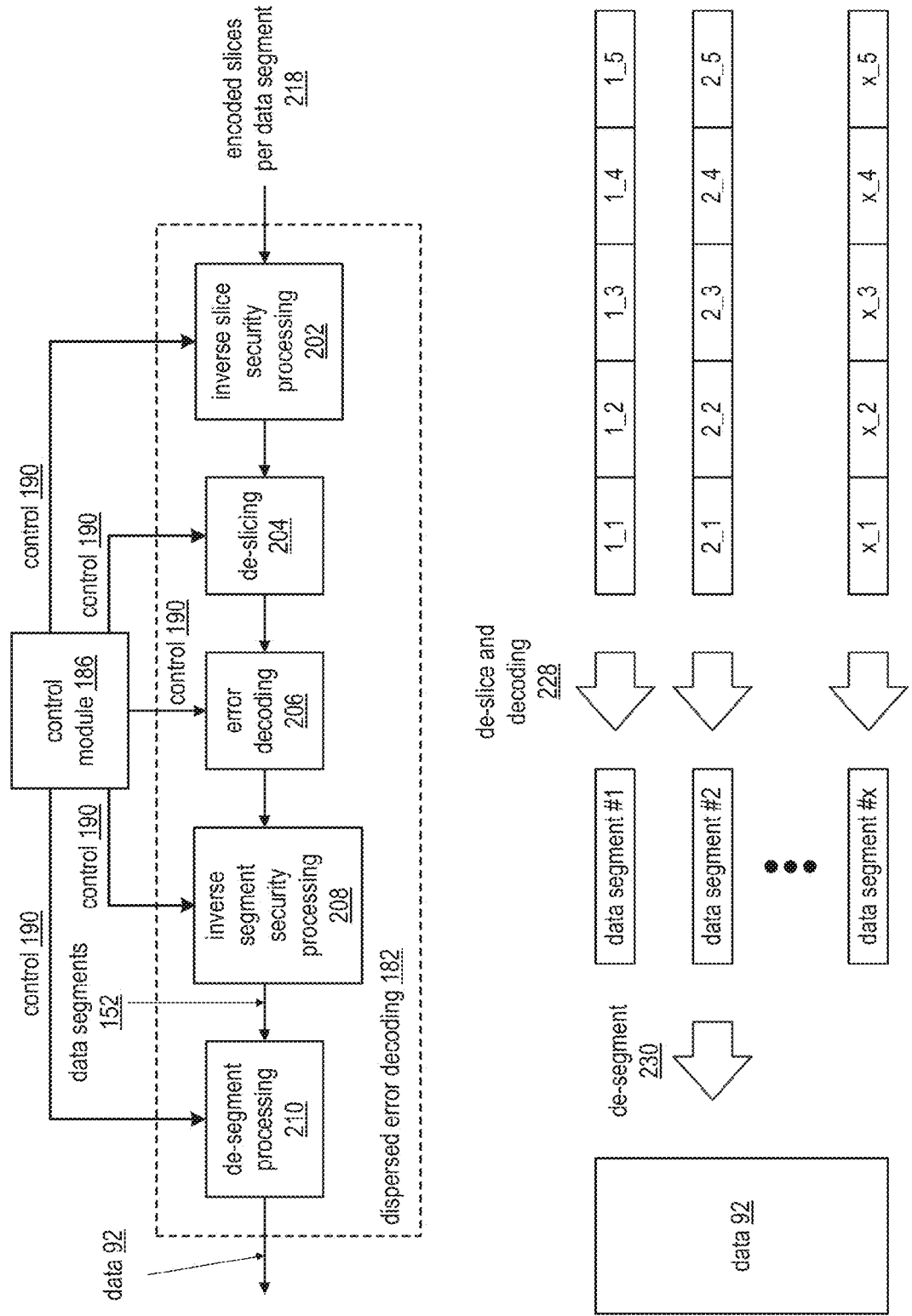
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
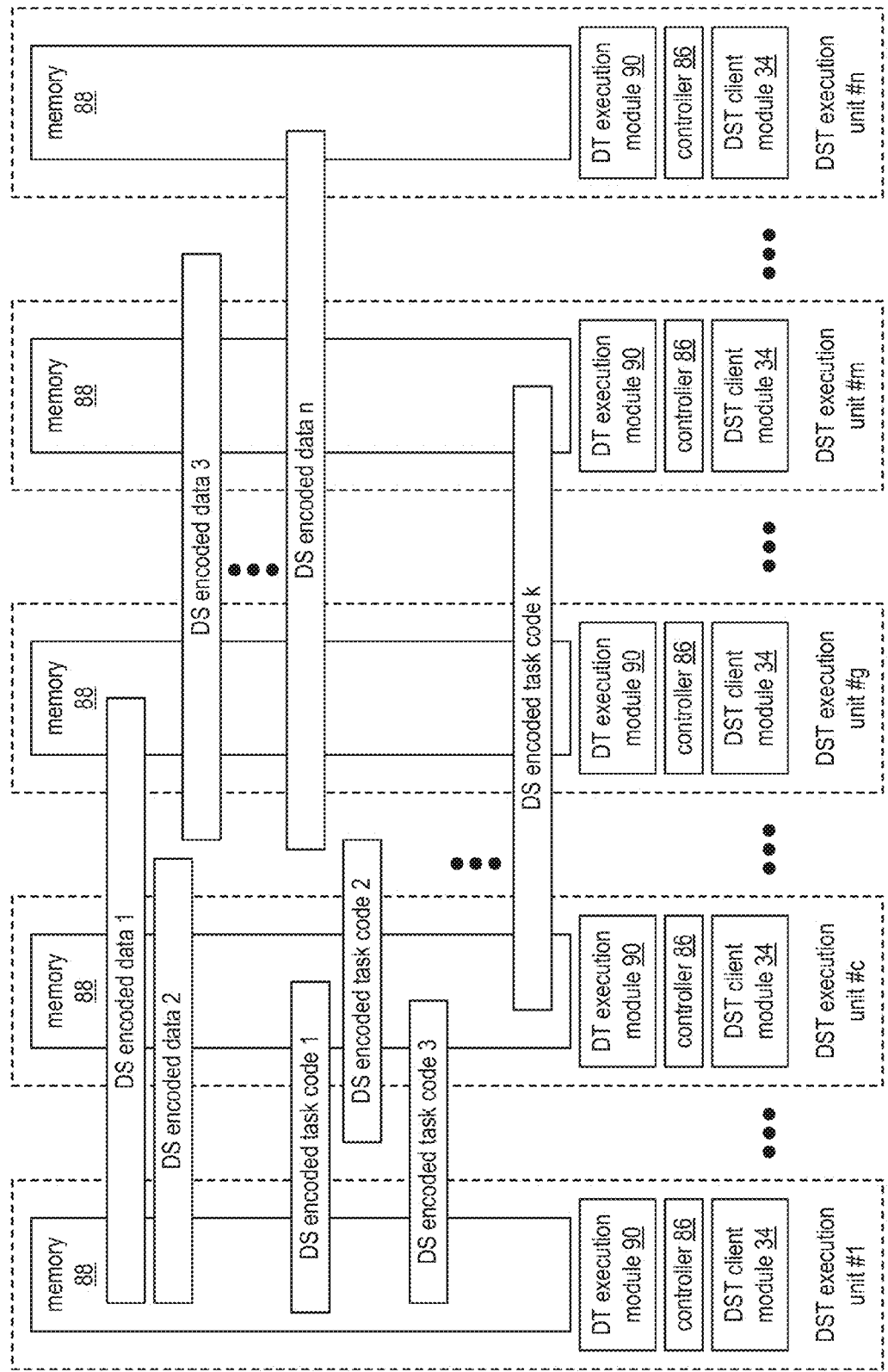
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content.

For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
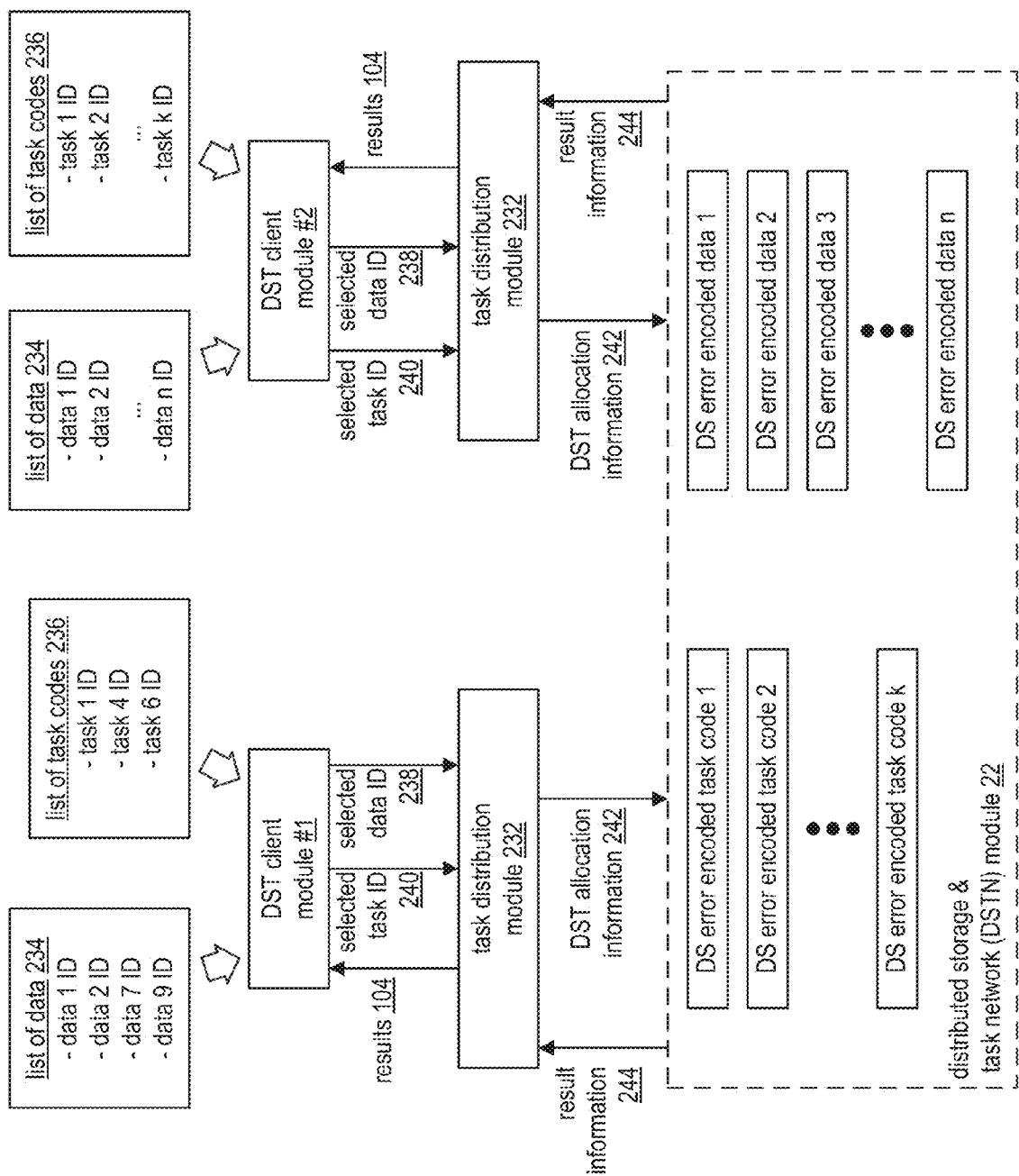
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
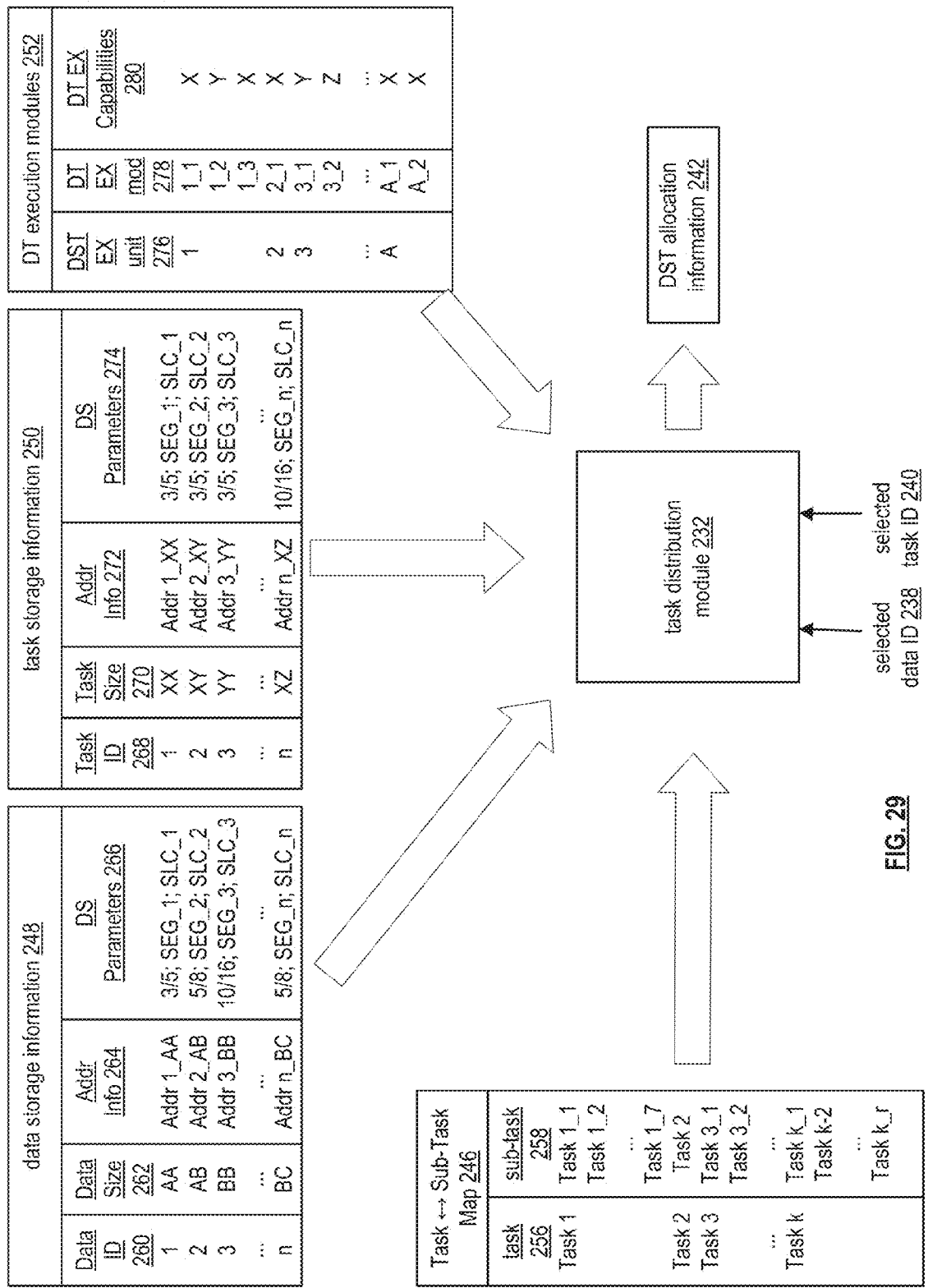
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
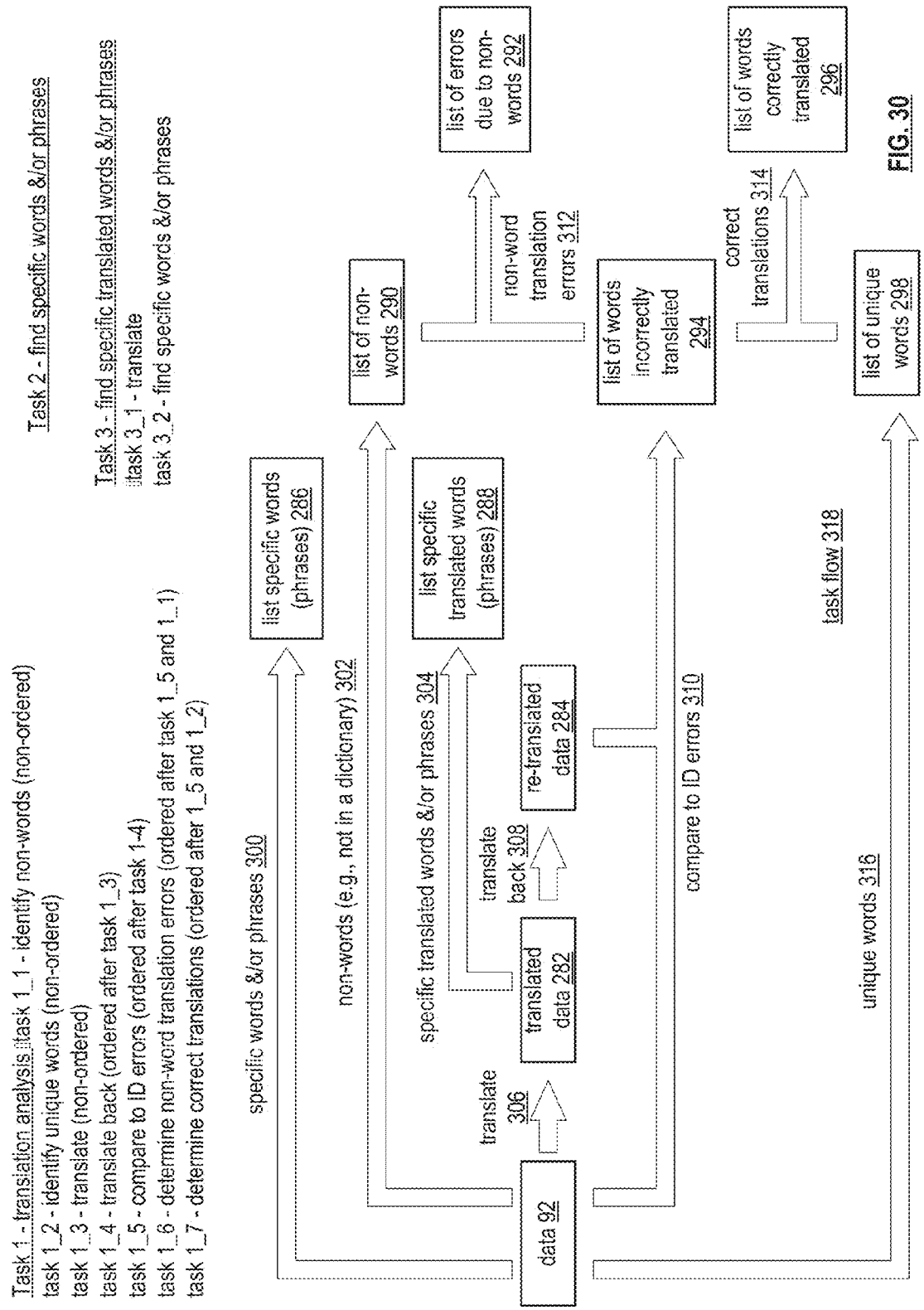
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4-translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
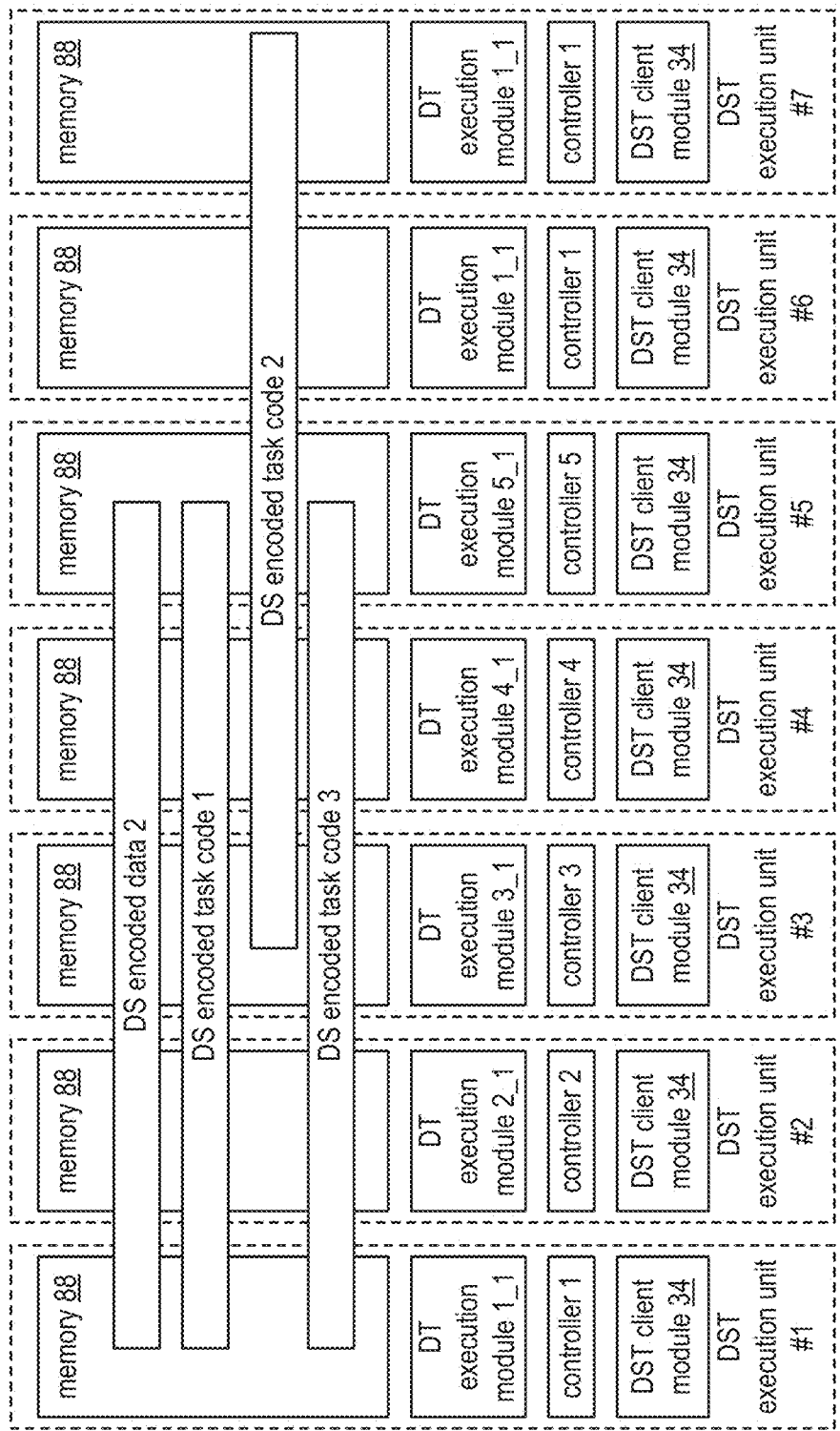
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
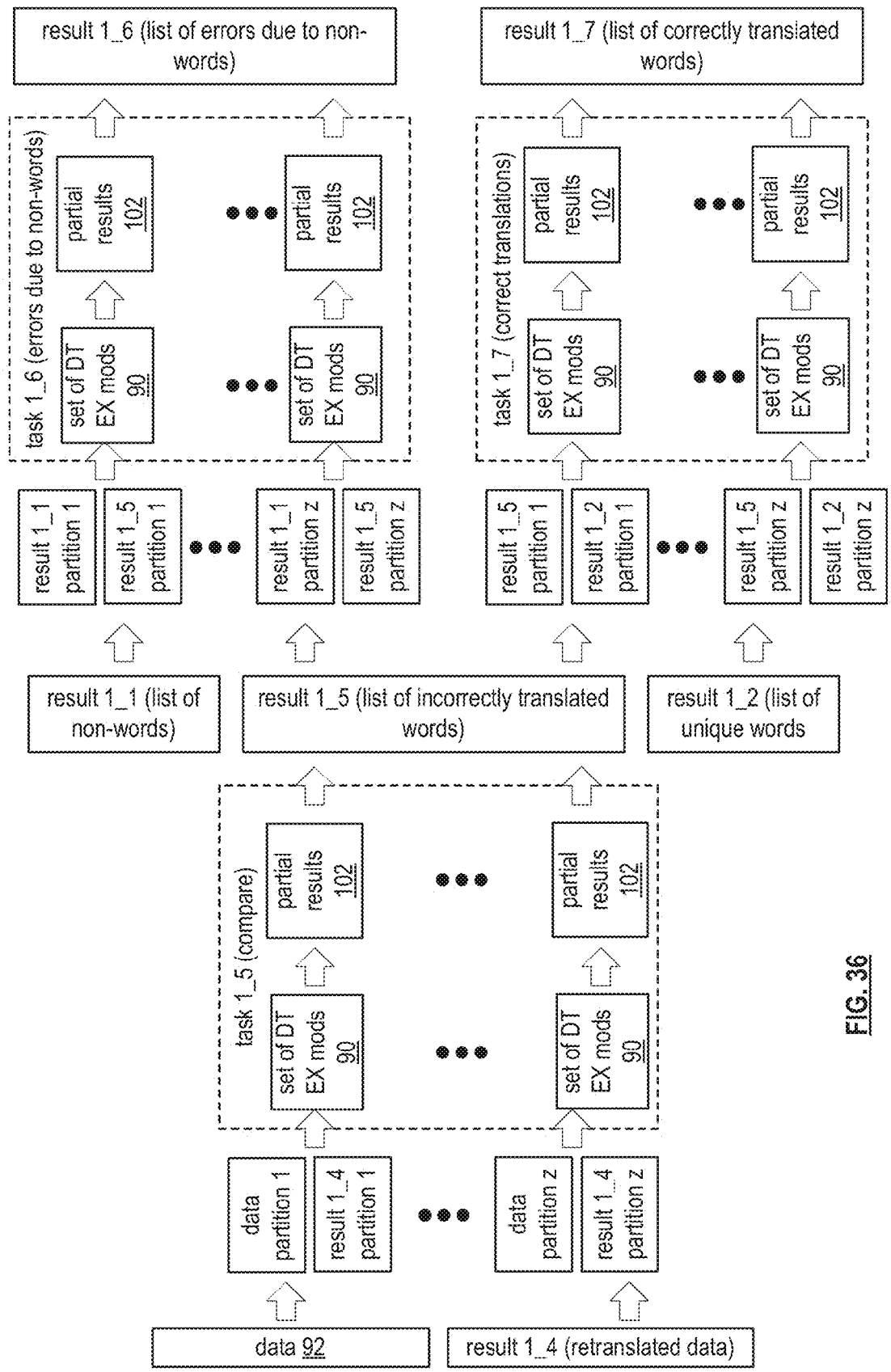

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2).

To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
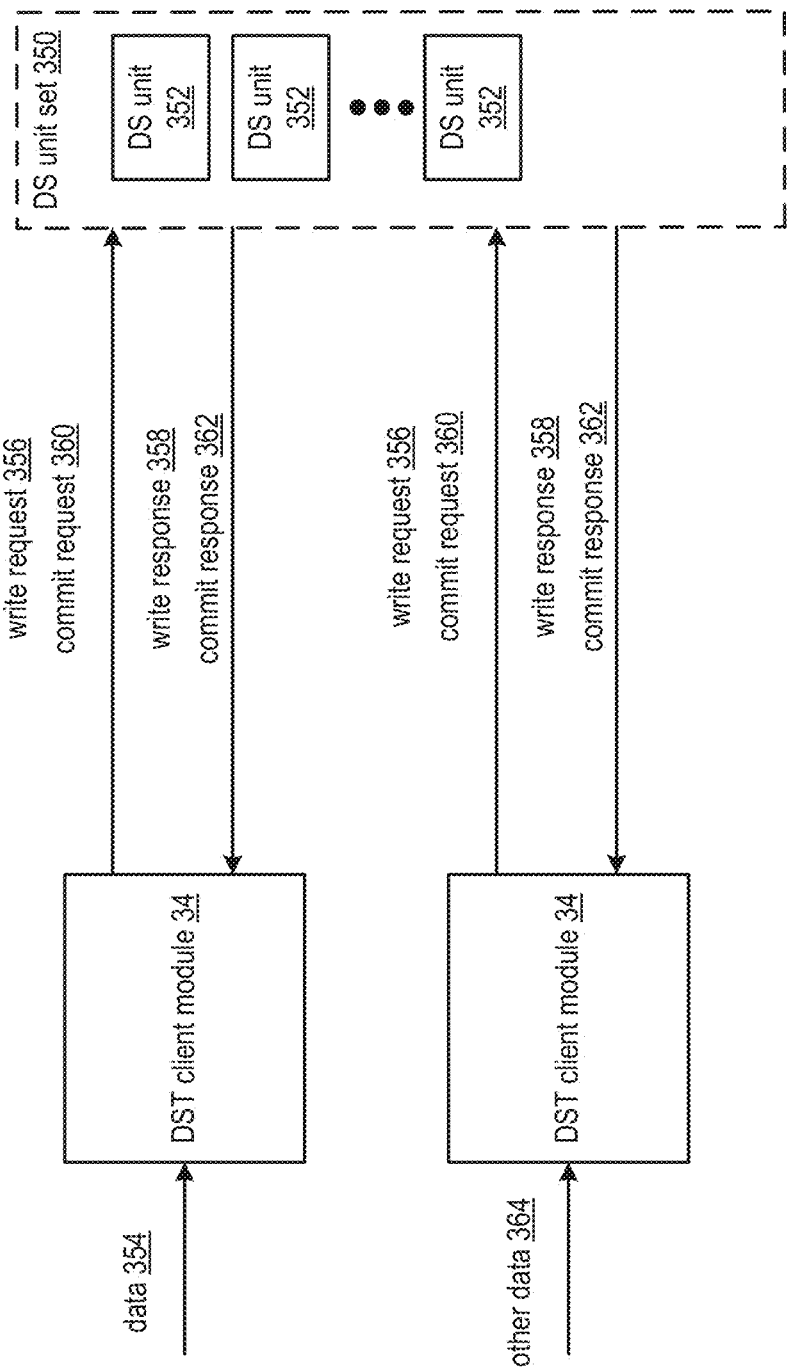
FIG. 40A is a schematic block diagram of an embodiment of a dispersed storage system in accordance with the present invention.

FIG. 40A is a schematic block diagram of an embodiment of a dispersed storage system that includes two or more distributed storage and task (DST) client modules 34 and a dispersed storage (DS) unit set 350. The DS unit set 350 includes a set of DS units 352. A DS unit 352 of the set of DS units may be implemented utilizing one or more of a storage server, a storage module, a memory device, a DS module, and the DST execution unit 36 of FIG. 1. Each DST client module 34 of the two or more DST client modules 34 may alternatively be implemented utilizing one or more of the processing module, a client device, a user device, a DST processing unit, a DST execution unit, a DS unit, and a DS processing unit. The DS unit set 350 is shared by the two or more DST client modules 34 for storage of one or more sets of encoded data slices. A set of encoded data slices of the one or more sets of encoded data slices may be shared between the two or more DST client modules 34 such that the two or more DST client modules 34 may substantially access the set of encoded data slices simultaneously (e.g., a race condition).

A DST client module 34 encodes data 354 to produce one or more sets of encoded data slices and generates one or more sets of associated slice names. The DST client module 34 generates a set of write requests 356 that includes the one or more sets of encoded data slices and the one or more sets of associated slice names. The DST client module 34 outputs the set of write requests 356 to the DS unit set 350 to facilitate storage of the data 354 in the DS unit set 350. Each write request 356 of the set of write requests includes one or more of a transaction number, a request number, a slice name, a slice revision, a slice length, and an encoded data slice. The DST client module 34 generates the transaction number based on one or more of a random number, a pseudorandom algorithm, a previous transaction number, and a look up. For example, a DST client module 34 generates a transaction number as a random number.

A DS unit 352 of the DS unit set 350 receives the write request 356 and processes the write request 356. The processing of the write request includes temporarily storing the encoded data slice and determining whether a storage error exists. The DS unit 352 generates a write response 358 to include one or more of the transaction number, the request number, and a status code with regards to the determining whether the storage error exists. The status code includes at least one of a succeeded indicator, a locked by another transaction error indicator, an address error indicator, a checked write condition error indicator, and an unauthorized error indicator. The processing of the write request further includes indicating that the encoded data slice is associated with a locked condition with regards to the transaction number when the status code indicates succeeded. The DS unit 352 outputs the write response 358 to the DST client module 34.

When a race condition exists, another DST client module 34 encodes other data 364 to produce another one or more sets of encoded data slices and generates the one or more sets of associated slice names (e.g., at least some identical slice names produced by the DST client module 34). The other DST client module 34 generates another set of write requests 356 that includes the other one or more sets of encoded data slices and the one or more sets of associated slice names. The other DST client module 34 outputs the other set of write requests 356 to the DS unit set 350 to facilitate storage of the other data 364 in the DS unit set 350.

Each write request 356 of the other set of write requests includes one or more of another transaction number, another request number, the slice name, a slice revision, a slice length, and another encoded data slice. The other DST client module 34 generates the other transaction number based on one or more of a random number, a pseudorandom algorithm, a previous transaction number, and a look up.

In the race condition scenario, the DS unit 352 receives the other write request 356 and processes the other write request. The processing of the other write request includes temporarily storing the other encoded data slice and determining whether a storage error exists with regards to the slice name. The other DS unit 352 generates another write response 358 to include one or more of the other transaction number, the other request number, and another status code with regards to the determining whether the storage error exists. The other DS unit 352 generates the status code to indicate that the slice name is locked by another transaction (e.g., the transaction with regards to the DST client module 34). The other DS unit 352 outputs the other write response 358 to the other DST client module 34.

When one of the DST client module 34 or the other DST client module 34 receives at least a write threshold number of favorable write responses 358 from the DS unit set 350 (e.g., that include the succeeded status code), the one DST client module 34 generates a set of commit requests 360 where each commit request 360 includes one or more of a corresponding transaction number (e.g., the transaction number for the DST client module 34, the other transaction number for the other DST client module 34), and a yet another request number. The one DST client module 34 outputs the set of commit requests 360 to the DS unit set 350. The DS unit 352 receives a commit request 360 of the set of commit requests. The DS unit 352 identifies a corresponding slice name based on the corresponding transaction number. The DS unit 352 performs a commit function on the identified slice name. The commit function includes at least one of facilitating storage of a temporarily stored slice that corresponds to the slice name (e.g., going from temporary storage to long-term storage) and indicating that the slice name is not locked.

The DS unit 352 generates a commit response 362 where the commit response 362 includes one or more of the yet another request number, a commit status indicator, and the corresponding transaction number. The commit status indicator indicates an error condition or a non-error condition with regards to performing the commit function. The DS unit 352 generates the commit status indicator to include the error condition when the slice name was not locked at the time of receiving the commit request. As such, the DS unit 352 performs the commit function regardless of whether the slice name was previously locked with regards to storage of a slice associated with the commit request 360. The DS unit 352 performs the commit function for a first received commit request after a slice name is locked. The error condition is indicated for any received commit requests subsequent to the first received commit request. A DST client module 34 that receives a commit response 362 that includes the error condition commit status indicator generates a set of undo requests for output to DS unit set 350. The method of operation of the DST client module 34 is discussed in greater detail with reference to FIG. 40B. The method of operation of the DS unit 352 is discussed in greater detail with reference to FIGS. 40C and 40D.

Figure 40B:
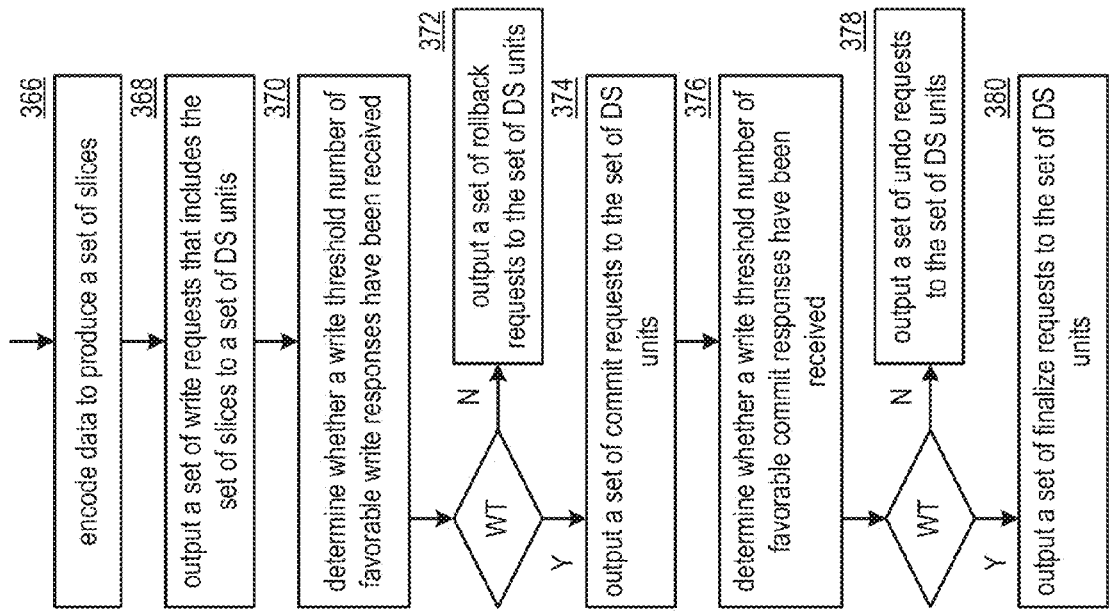
FIG. 40B is a flowchart illustrating an example of storing data in accordance with the present invention.

FIG. 40B is a flowchart illustrating an example of storing data. The method begins at step 366 where a processing module (e.g., of a distributed storage and task (DST) client module) encodes data using a dispersed storage error coding function to produce a set of slices. The method continues at step 368 where the processing module outputs a set of write requests that includes the set of slices to a set of dispersed storage (DS) units. The outputting includes generating a set of slice names corresponding to the set of slices and generating the set of write requests that includes the set of slice names and the set of slices.

The method continues at step 370 where the processing module determines whether a write threshold number of favorable write responses have been received. A favorable write response includes a status code that indicates the write has succeeded. The determining includes receiving write responses from one or more DS units of the set of DS units. The method branches to step 374 when the write threshold number of favorable write responses have been received. The method continues to step 372 when the write threshold number of favorable write responses have not been received within a time period. The method continues at step 372 where the processing module outputs a set of rollback requests to the set of DS units when the write threshold number of favorable write responses have not been received within the time period. The outputting includes generating a set of rollback requests to include a transaction number associated with the set of write requests.

The method continues at step 374 where the processing module outputs a set of commit requests to the set of DS units when the write threshold number of favorable write responses have been received. The outputting includes generating the set of commit requests to include the transaction number associated with the set of write requests. The method continues at step 376 where the processing module determines whether a write threshold number of favorable commit responses have been received. A favorable commit response includes a status code that indicates the commit has succeeded. The determining includes receiving commit responses from one or more DS units of the set of DS units. The method branches to step 380 when the write threshold number of favorable commit responses have been received. The method continues to step 378 when the write threshold number of favorable commit responses have not been received within a time period. The method continues at step 378 where the processing module outputs a set of undo requests to the set of DS units when the write threshold number of favorable commit responses have not been received within the time period. The outputting includes generating a set of undo requests to include the transaction number associated with the set of write requests.

The method continues at step 380 where the processing module outputs a set of finalize requests to the set of DS units when the write threshold number of favorable commit responses have been received. The outputting includes generating the set of finalize requests to include the transaction number associated with the set of write requests.

FIG. 40C is a flowchart illustrating another example of storing data. The method begins at step 382 where a processing module (e.g., of a dispersed storage (DS) unit) receives (e.g., from a distributed storage and task (DST) client module) a write request from a requesting entity that includes a slice name, a transaction number, and a slice. The method continues at step 384 where the processing module temporarily stores the slice. The storing includes storing the slice name and the transaction number. The method continues at step 386 where the processing module determines whether the slice name is associated with a locked slice. The determining may be based on one or more of accessing a local slice status table (e.g., that associates slice names with a transaction number of an open write transaction when locked), receiving a locked indicator, a query, and a look up. The method branches to step 390 when the slice name is not associated with a locked slice. The method continues to step 388 when the slice name is associated with a locked slice (e.g., locked by another transaction associated with another requesting entity). The method continues at step 388 where the processing module outputs a write response to the requesting entity to indicate that the slice is locked. The outputting includes generating the write response to include one or more of the slice name, the transaction number, and a status code indicating that the slice is locked by another transaction.

The method continues at step 390 where the processing module outputs a write response to the requesting entity to indicate that the slice is not locked when the slice name is not associated with a locked slice. The outputting includes generating the write response to include one or more of the slice name, the transaction number, and a status code indicating that the writing has succeeded (e.g., no error). The method continues at step 392 where the processing module indicates that the slice is now locked with regards to the transaction number. For example, the processing module updates the local slice status table to associate the slice name, the transaction number, and a locked status.

FIG. 40D is a flowchart illustrating another example of storing data. The method begins at step 394 where a processing module (e.g., of a dispersed storage (DS) unit) receives (e.g., from a distributed storage and task (DST) client module) a commit request from a requesting entity that includes a transaction number associated with a corresponding previous write request. The method continues at step 396 where the processing module identifies a slice based on the transaction number. For example, the processing module accesses a local slice status table using the transaction number to identify a slice name of the slice. The method continues at step 398 where the processing module determines whether the identified slice is awaiting a commit request. The determining includes identifying whether the slice name is associated with a locked status (e.g., previously received one or more write requests but no commit requests so far). For example, the processing module accesses the local slice status table to identify the locked status. The method branches to step 402 when the identified slice is awaiting a commit request. The method continues to step 400 when the identified slice is not awaiting a commit request. The method continues at step 400 where the processing module outputs a commit response to the requesting entity where the commit response includes an error status code. The outputting includes generating the commit response to include one or more of the slice name, the transaction number, and a status code indicating an error that the slice is not awaiting a commit request.

The method continues at step 402 where the processing module performs a commit function on the identified slice. The performing of the commit function includes at least one of facilitating non-temporary storage of the slice, indicating that the slice is visible for subsequent read requests, and removing the lock. The facilitating of the non-temporary storage of the slice includes retrieving the slice from a temporary storage memory and storing the slice in a non-temporary storage memory. The facilitating of the indicating includes updating the local slice status table to indicate that the slice associated with the slice name is visible. The facilitating of the removing includes updating the local slice status table to indicate that the slice is not locked.

The method continues at step 404 where the processing module outputs a commit response to the requesting entity to indicate that the commit function has been performed on the slice. The outputting includes generating the commit response to include one or more of the slice name, the transaction number, and a status code indicating that the commit function has been performed (e.g., no error).

FIGS. 41A-C are schematic block diagrams of another embodiment of a distributed computing system that includes at least one managing processing module 410, a plurality of distributed computing processing resources 412, a network 24, and a distributed memory that includes a set of dispersed storage (DS) units 1-n of a plurality of dispersed storage units. The DS unit may be the distributed storage and task (DST) execution unit 36 of FIG. 1. The distributed computing processing resource 412 may be the DST execution unit 36 of FIG. 1. Alternatively, the distributed computing processing resource 412 may be the DST client module 34 of FIG. 1. The managing processing module 410 may be a processing module of a computing device of the distributed computing system (e.g., the DST client module 34 of the DST processing unit 16 of FIG. 1). Alternatively, the managing processing module 410 may be one or more of the distributed computing processing resources 412 (e.g., the DST execution unit 36 of FIG. 1). The managing processing module 410 includes the DST client module 34 of FIG. 1. The distributed computing processing resource 412 includes the distributed task execution module 90 of FIG. 3. The DS unit includes the processing module 84 and the memory 88 of FIG. 3.

In an example of operation, FIG. 41A illustrates the managing processing module 410 storing a plurality of data objects in the set of DS units 1-n as one or more sets of encoded data slices. As a specific example, the DST client module 34 encodes a data object A to produce a set of encoded data slices, generates a set of corresponding slice names, and issues write slice requests 414 (e.g., write slice requests 1-n) to the set of DS units 1-n, where the write slice requests 414 includes the set of encoded data slices and the set of slice names. The processing module 84 of each DS unit receives a corresponding write slice request, extracts a corresponding encoded data slice from the write slice request, and stores the encoded data slice in the memory 88. For instance, DS unit 1 stores data slice A_1_1 in memory 88 of DS unit 1, DS unit 2 stores data slice A_2_1 (e.g., slice name=data object A, slice index 2, segment 1) in memory 88 of DS unit 2, through DS unit n stores data slice A_n_1 in memory 88 of DS unit n.

In another example of operation, FIG. 41A further illustrates the managing processing module 410 storing, in an ordered manner, a dynamic plurality of distributed computing functions, where a distributed computing function of the dynamic plurality of distributed computing functions is stored in multiple storage units of the plurality of storage units as a set of encoded computing function slices. The distributed computing function includes one or more of a partial task, a task, a computer operation, an algorithm, operational data, and a co-processing function. Each of the dynamic plurality of distributed computing functions is stored separately in the distributed memory (e.g., as separately named sets of encoded computing function slices in at least one of the set of DS units 1-n and other sets of DS units) as opposed to being stored in a list.

As a specific example of storing the distributed computing function, the DST client module 34 encodes a first distributed computing function associated with a queue X of a plurality of queues to produce a set of encoded computing function slices, generates a set of corresponding slice names, and issues write slice requests 414 (e.g., write slice requests 1-n) to the set of DS units 1-n, where the write slice requests 414 includes the set of encoded computing function slices and the set of corresponding slice names. The processing module 84 of each DS unit receives a corresponding write slice request, extracts a corresponding encoded computing function slice from the write slice request, and stores the encoded computing function slice in the memory 88. For instance, DS unit 1 stores computing slice X_1_1 in memory 88 of DS unit 1, DS unit 2 stores computing slice X_2_1 (e.g., slice name=queue X, slice index 2, first computing function) in memory 88 of DS unit 2, through DS unit n stores computing slice X_n_1 in memory 88 of DS unit n.

As another specific example of storing the distributed computing function, the DST client module 34 encodes a second distributed computing function associated with queue X to produce another set of encoded computing function slices, generates another set of corresponding slice names, and issues other write slice requests 414 (e.g., write slice requests 1-n) to the set of DS units 1-n, where the other write slice requests 414 includes the other set of encoded computing function slices and the other set of corresponding slice names. The processing module 84 of each DS unit receives a corresponding other write slice request, extracts a corresponding other encoded computing function slice from the other write slice request, and stores the other encoded computing function slice in the memory 88. For instance, DS unit 1 stores computing slice X_1_2 in memory 88 of DS unit 1, DS unit 2 stores computing slice X_2_2 (e.g., slice name=queue X, slice index 2, second computing function) in memory 88 of DS unit 2, through DS unit n stores computing slice X_n_2 in memory 88 of DS unit n.

In yet another example of operation, FIG. 41A further illustrates the managing processing module 410 updating the dynamic plurality of distributed computing functions by adding or deleting distributed computing functions to/from the dynamic plurality of distributed computing functions. As a specific example, the DST client module 34 encodes a third distributed computing function associated with queue X to produce yet another set of encoded computing function slices, generates yet another set of corresponding slice names, and issues yet other write slice requests 414 (e.g., write slice requests 1-n) to the set of DS units 1-n, where the yet other write slice requests 414 includes the yet another set of encoded computing function slices and the yet another set of corresponding slice names. The processing module 84 of each DS unit receives a corresponding other write slice request, extracts a corresponding yet other encoded computing function slice from the other write slice request, and stores the yet other encoded computing function slice in the memory 88. For instance, DS unit 1 stores computing slice X_1_3 in memory 88 of DS unit 1, DS unit 2 stores computing slice X_2_3 (e.g., slice name=queue X, slice index 2, third computing function) in memory 88 of DS unit 2, through DS unit n stores computing slice X_n_3 in memory 88 of DS unit n.

FIG. 41B illustrates an example of the distributed computing processing resource 412 (e.g., when implemented as an alternative to the managing processing module 410) updating the dynamic plurality of distributed computing functions by adding or deleting distributed computing functions to/from the dynamic plurality of distributed computing functions. As a specific example, the DT execution module 90 encodes a first distributed computing function associated with a queue Y of the plurality of queues to produce a set of encoded computing function slices, generates a set of corresponding slice names, and issues write slice requests 414 (e.g., write slice requests 1-n) to the set of DS units 1-n, where the write slice requests 414 includes the set of encoded computing function slices and the set of corresponding slice names. The processing module 84 of each DS unit receives a corresponding write slice request, extracts a corresponding encoded computing function slice from the write slice request, and stores the encoded computing function slice in the memory 88. For instance, DS unit 1 stores computing slice Y_1_1 in memory 88 of DS unit 1, DS unit 2 stores computing slice Y_2_1 (e.g., slice name=queue Y, slice index 2, first computing function) in memory 88 of DS unit 2, through DS unit n stores computing slice Y_n_1 in memory 88 of DS unit n.

FIG. 41C illustrates an example of the distributed computing processing resource 412 establishing the ordered manner based on one or more of a time stamp (e.g., order of arrival for storage and execution), a sequential operational dependency (e.g., results of processing a first distributed computing function are required for a second distributed computing function), co-processing function ordering (e.g., results of two distributed computing functions are required for a third distributed computing function), and a priority level (e.g., a fifth distributed computing function has a highest priority level among a first five distributed computing functions). As a specific example, the DT execution module 90 receives the first distributed computing function of queue Y at time t1 and encodes the first distributed computing function using a dispersed storage error coding function to produce computing slices 416 of the set of encoded computing function slices for the first distributed computing function. Next, the DT execution module 90 generates, in accordance with the ordered manner, corresponding slice names 418 of the set of slice names corresponding to the set of encoded computing function slices. For example, the DT execution module 90 generates a slice name 418 of the first computing function to include a first timestamp. As another example, the DT execution module 90 generates the slice name 418 to include a priority level corresponding to the first computing function. Next, the DT execution module 90 issues write slice requests 414 that includes write slice requests 1-n to the set of DS units 1-n, where each write slice request 414 includes an encoded computing function slice 416 and the corresponding slice name 418.

The slice name 418 may be produced in accordance with the ordered manner in a variety of ways. In a first example, the slice name 418 includes a slice index field 420 and a vault source name field 422. The slice index field 420 includes a slice index entry that corresponds to a pillar number of a set of pillar numbers 1-n associated with a pillar width dispersal parameter utilized in the dispersed storage error coding function. The vault source name field 422 includes a queue vault identifier (ID) field 424 and a queue entry ID field 426. The queue vault ID includes an identifier of a virtual storage vault associated with the queue. The DT execution module 90 generates a queue vault ID entry for the queue vault ID field 424 by one or more of a dispersed storage network registry lookup based on an identifier of a requesting entity associated with storing the computing function, receiving the queue vault ID, and generating a new queue vault ID when a new queue name is requested (e.g., not previously utilized).

The queue entry ID field 426 includes a queue name field 428, a DS processing module ID field 430, a client ID field 432, and a timestamp field 434. The DT execution module 90 generates a queue name entry (e.g., Y) for the queue name field 428 based on the queue name of a request to store the computing function. The DT execution module 90 generates a DS processing module ID entry for the DS processing module ID field 430 as an identifier associated with the DT execution module 90 or any processing module by at least one of a lookup, receiving, and generating when an ID has not been assigned so far. The DT execution module 90 generates a client ID entry for the client ID field 432 as an identifier associated with the requesting entity by at least one of a lookup, extracting from the store computing function request, initiating a query, and receiving. The DT execution module 90 generates a timestamp entry (e.g., 1-3 for time frames 1-3 or receiving computing functions 1-3) for the timestamp field 434 as at least one of a current timestamp, the entry number of the store computing function request (e.g., when provided), and a combination of the current timestamp and the entry number. In a specific implementation example, the slice name 418 includes 48 bytes, including the queue entry ID field of 24 bytes, the queue name field of 8 bytes, the DS processing module ID of 4 bytes, the client ID field of 4 bytes, and the timestamp field of 8 bytes.

FIG. 41D is a flowchart illustrating an example of updating a dynamic plurality of computing functions by adding or deleting distributed computing functions to/from the dynamic plurality of distributed computing functions. In an example of adding a distributed computing function, the method begins at step 438 where a processing module, when functioning as a managing processing module, receives a write queue entry request that includes the distributed computing function. The request includes one or more of a requesting entity identifier (ID), the distributed computing function as a queue entry, a queue name, and an entry number. The method continues at step 440 where the processing module identifies a queue vault ID. The identifying may be based on one or more of the requesting entity ID, the queue name, and a look up. For example, the processing module accesses a queue directory utilizing the queue name to identify the queue vault ID.

The method continues at step 442 where the processing module identifies a dispersed storage (DS) processing module ID associated with processing of the write queue entry request. The identifying may be based on one or more of generating a new ID, extracting from the request, a lookup, initiating a query, and receiving the identifier. The method continues at step 444 where the processing module identifies a client ID associated with the requesting entity. The identifying may be based on one or more of extracting from the request, a lookup, initiating a query, and receiving the identifier.

The method continues at step 446 where the processing module generates a timestamp. The generating includes at least one of obtaining a real-time time value and utilizing the entry number of the write queue entry request when provided. The method continues at step 448 where the processing module generates a set of slice names based on one or more of a dispersed queue slice name structure, queue vault ID, the DS processing module ID, the client ID, and the timestamp. For example, the processing module generates a slice name of the set of slice names to include a slice index corresponding to a slice to be associated with the slice name, the queue vault ID, the queue name of the write queue entry request, the DS processing module ID, the client ID, and the timestamp as depicted in FIG. 41C.

The method continues at 450 where the processing module encodes the queue entry of the write queue entry request using a dispersed storage error coding function to produce a set of queue entry slices (e.g., encoded computing function slices). The method continues at step 452 where the processing module generates a set of write requests that includes the set of queue entry slices and the set of slice names. The method continues at step 454 where the processing module outputs the set of write requests to a set of DS units to facilitate storage of the set of queue entry slices.

FIGS. 42A-E are schematic block diagrams of another embodiment of an example of operation of the distributed computing system that includes the distributed computing processing resources 412, the network 24, and the set of dispersed storage (DS) units 1-n of FIG. 41A. The set of DS units 1-n stores, in the ordered manner, the dynamic plurality of distributed computing functions, where each distributed computing function is stored as the set of encoded computing function slices. As a specific example, the set of DS units 1-n stores three distributed computing functions, where the first distributed computing function associated with the first timestamp is stored as the set of computing slices Y_1_1, Y_2_1, through Y_n_1; the second distributed computing function associated with the second timestamp is stored as the set of computing slices Y_1_2, Y_2_2, through Y_n_2; and the third distributed computing function associated with the third timestamp is stored as the set of computing slices Y_1_3, Y_2_3, through Y_n_3.

In an example of operation, FIG. 42A illustrates a first distributed computing processing resource 412 identifying, in accordance with the ordered manner, a next distributed computing function of the dynamic plurality of distributed computing functions. As a specific example, the first distributed computing processing resource 412 determines that the DT execution module 90 has sufficient processing capabilities to process the next distributed computing function and identifies the next distributed computing function. As another specific example, the first distributed computing function resource 412 receives a request to obtain the next distributed computing function (e.g., a retrieve queue entry request). As a specific example of identifying the next attribute computing function, the DT execution module 90 issues list requests 456 to the set of DS units 1-n as list requests 1-n to request a listing of encoded computing function slices. For instance, the DT execution module 90 generates list request 2 to include a slice name range associated with queue Y (e.g., a start slice name associated with a zero timestamp and an end slice name associated with a maximum timestamp value).

Having issued the list requests 456, the DT execution module 90 receives list responses 458 from the set of DS units 1-n, where each list response of list responses 1-n includes a list of available encoded computing function slices associated with slice names that fall within the corresponding slice name range. For instance, the DT execution module 90 receives list response 2 from DS unit 2, where the list response 2 includes a list of slice names Y_2_1, Y_2_2, and Y_2_3. Having received the list responses 458, the DT execution module 90 generates a list of the dynamic plurality of distributed computing functions currently stored by the multiple storage units from the listing. For instance, the DT execution module 90 generates the list of the dynamic plurality of distributed computing functions to indicate the distributed computing functions 1, 2, and 3 when list responses 1-n indicate that at least a decode threshold number of encoded computing function slices are available for each of the distributed computing functions 1, 2, and 3.

Having generated the list of the dynamic plurality of distributed computing functions currently stored, the DT execution module 90 determines a retrieval scheme for the list of the dynamic plurality of distributed computing functions. As a specific example, the DT execution module 90 determines the retrieval scheme based on the request to obtain the next distributed computing function. As another specific example, the DT execution module 90 determines the retrieval scheme based on a predetermination. The retrieval scheme includes at least one of a first in first out (FIFO) scheme (e.g., a queue function), a last in first out (LIFO) scheme (e.g., a stack function), a specifically requested distributed computing function, a distributed computing function associated with a type of function and/or data, a prioritized scheme based on a priority level of each of the distributed computing functions, or any other scheme to indicate a preference of the next distributed computing function.

Having determined the retrieval scheme, the DT execution module 90 identifies the next distributed computing function from the list of the dynamic plurality of distributed computing functions using with the retrieval scheme. As a specific example, the DT execution module 90 identifies the first distributed computing function as the next distributed computing function when the retrieval scheme includes the FIFO scheme (e.g., the first distributed computing function is associated with timestamp 1). As another specific example, the DT execution module 90 identifies the third distributed computing function as the next distributed computing function when the retrieval scheme includes the LIFO scheme (e.g., the third distributed computing function is associated with timestamp 3). As yet another specific example, the DT execution module 90 identifies the second distributed computing function as the next distributed computing function when the second distributed computing function was specifically requested to be obtained.

In the example of operation continued of FIGS. 42A-E, FIG. 42B illustrates the first distributed computing processing resource 412 determining whether ownership of the next distributed computing function can be established. As a specific example, the DT execution module 90 of the first distributed computing processing resource 412 sends, at a first timeframe, lock-read-delete requests to the set of DS units 1-n regarding a set of encoded computing function slices of the next distributed computing function. For instance, the DT execution module 90 sends a set of lock requests. As another instance, the DT execution module 90 sends a set of delete and read requests. As yet another instance, the DT execution module 90 sends a set of delete requests 460, that includes delete slice requests 1-n, to initiate a process to delete the set of encoded computing function slices. The delete slice requests 460 includes one or more of a transaction number associated with the delete slice requests 1-n and slice names Y_1_1, Y_2_1, through Y_n_1 when the first distributed computing function is the next distributed computing function.

Having sent the lock-read-delete requests to the set of DS units 1-n, the DT execution module 90 of the first distributed computing processing resource 412 receives favorable delete responses 462 from the set of DS units 1-n regarding the lock-read-delete requests. As a specific example, the DT execution module 90 receives at least a write threshold number of delete slice responses indicating no errors (e.g., one or more of: initiation of delete successful, no previous lock, and a DT execution module 90 owns a present lock on the set of encoded computing function slices). When the responses are favorable, the DT execution module 90 of the first distributed computing processing resource 412 indicates that the ownership of the next distributed computing function can be established.

The system may function to establish ownership to a maximum of one entity at a time. As a specific example, a second distributed computing processing resource 412 sends, at a second timeframe, the lock-read-delete requests (e.g., delete requests 464 at the second timeframe) to the set of DS units 1-n regarding the set of encoded computing function slices of the next distributed computing function. Having sent the lock-read-delete requests to the set of DS units 1-n, the DT execution module 90 of the second distributed computing processing resource 412 receives unfavorable delete responses 466 from the set of DS units 1-n regarding the lock-read-delete requests. As a specific example, the DT execution module 90 receives less than the write threshold number of delete slice responses indicating no errors (e.g., one or more of: initiation of delete unsuccessful, previous lock by the first distributed computing processing resource 412). When the responses are unfavorable, the DT execution module 90 of the second distributed computing processing resource 412 indicates that the ownership of the next distributed computing function cannot be established. Having indicated that the ownership of the next distributed computing function cannot be established, the second distributed computing processing resource 412 may request, in accordance with the ordered manner, another next distributed computing function of the dynamic plurality of distributed computing functions (e.g., re-initiate listing available distributed computing functions to identify the next distributed computing function).

When the ownership of the next distributed computing function can be established, the DT execution module 90 of the first distributed computing processing resource 412 secures the ownership of the next distributed computing function. As a specific example, the DT execution module 90 of the first distributed computing processing resource 412 receives an indication that the set of encoded computing function slices are locked as a separate message (e.g., a write slice response, a delete slice response, a lock slice response) or an interpretation of receiving the set of encoded computing function slices from the multiple storage units (e.g., receiving at least a decode threshold number of the encoded computing function slices).

In the example of operation continued of FIGS. 42A-E, FIG. 42C illustrates the first distributed computing processing resource 412 executing the next distributed computing function on one or more of the plurality of data objects stored in the set of DS units 1-n or any other DS unit of a distributed memory. As a specific example, the DT execution module 90 of the first distributed computing processing resource 412 issues read requests 468, where the read requests 468 includes read requests 1-n. The set of read requests 1-n includes the set of slice names of the set of encoded computing function slices associated with the next distributed computing function. For instance, the set of slice names includes slice names Y_1_3, Y_2_3, through Y_n_3 when the next distributed computing function includes the third distributed computing function.

Having issued the read requests 468, the DT execution module 90 receives read responses 470 that includes at least a decode threshold number of read responses 1-n from the set of DS units 1-n. Having received the read responses 470, the DT execution module 90 decodes at least a decode threshold number of the set of encoded computing function slices using a dispersed storage error coding function to reproduce the next distributed computing function. The DT execution module 90 executes the next distributed computing function to produce at least one of results and partial results. Having executed the next distributed computing function, the DT execution module 90 may send at least one of the results, the partial results and the next distributed computing function to another entity of the distributed computing system. As a specific example, the DT execution module 90 issues a read queue entry response to the other entity, where the read queue entry response includes the distributed computing function. Having received the read queue entry response, the other entity may execute the distributed computing function to produce the at least one of the results and the partial results.

In the example of operation continued of FIGS. 42A-E, FIG. 42D illustrates the first distributed computing processing resource 412, after executing the next distributed computing function, initiating a delete portion of the lock-read-delete requests. As a specific example, the DT execution module 90 of the first distributed computing processing resource 412 initiates the delete portion upon successful execution of the distributed computing function. As another specific example, the DT execution module 90 of the first distributed computing processing resource 412 initiates the delete portion when receiving a favorable response from the other entity having successfully executed the distributed computing function.

As a specific example of initiating the delete portion, the DT execution module 90 issues commit requests 472 including a set of commit requests 1-n to the set of DS units 1-n. For instance, each commit request includes the transaction number associated with the delete slice requests. Each DS unit deletes a corresponding encoded data slice associated with the transaction number of the delete slice request. For instance, DS unit 2 deletes encoded computing function slice Y_2_1 when the first distributed computing function is to be deleted.

In the example of operation continued of FIGS. 42A-E, FIG. 42E illustrates the first distributed computing processing resource 412, when failing to executing the next distributed computing function, rollbacks the delete portion of the lock-read-delete requests. As a specific example, the DT execution module 90 of the first distributed computing processing resource 412 rollback the delete portion upon unsuccessful execution of the distributed computing function. As another specific example, the DT execution module 90 of the first distributed computing processing resource 412 rollback the delete portion when receiving a unfavorable response from the other entity having unsuccessfully executed the distributed computing function.

As a specific example of rolling back the delete portion, the DT execution module 90 issues rollback requests 474 including a set of rollback requests 1-n to the set of DS units 1-n. For instance, each rollback request includes the transaction number associated with the delete slice requests. Each DS unit unlocks a corresponding encoded data slice associated with the transaction number of the delete slice request. For instance, DS unit 2 unlocks encoded computing function slice Y_2_1 when the first distributed computing function is to be unlocked.

FIG. 42F is a flowchart illustrating an example of processing a distributed computing function. The method begins at step 480 where a processing module, when functioning as a managing processing module, updates a dynamic plurality of distributed computing functions by adding or deleting distributed computing functions to/from the dynamic plurality of distributed computing functions. A distributed memory of a distributed computing system includes a plurality of storage units and stores a plurality of data objects. A data object of the plurality of data objects is stored in a set of storage units of the plurality of storage units as one or more sets of encoded data slices. In an ordered manner, each distributed computing function of the dynamic plurality of distributed computing functions is stored in multiple storage units of the plurality of storage units as a set of encoded computing function slices.

The method continues at step 482, where the processing module, when functioning as the managing processing module, establishes the ordered manner based on one or more of a time stamp, a sequential operational dependency, co-processing function ordering, and a priority level, wherein the distributed computing function includes one or more of a partial task, a task, a computer operation, an algorithm, operational data, and a co-processing function. Each of the dynamic plurality of distributed computing functions is stored separately in the distributed memory as opposed to being stored in a list.

The method continues at step 484 where the processing module, when functioning as a distributed computing processing resource, identifies, in accordance with the ordered manner, a next distributed computing function of the dynamic plurality of distributed computing functions. As a specific example, the processing module requests, from the multiple storage units, a listing of encoded computing function slices. Next, the processing module generates a list of the dynamic plurality of distributed computing functions currently stored by the multiple storage units from the listing. Having generated the list, the processing module determines a retrieval scheme for the list of the dynamic plurality of distributed computing functions (e.g., FIFO, LIFO, etc.). Next, the processing module identifies the next distributed computing function from the list of the dynamic plurality of distributed computing functions in accordance with the retrieval scheme.

The method continues at step 486 where the processing module determines whether ownership of the next distributed computing function can be established. As a specific example, the processing module sends lock-read-delete requests to the multiple storage units regarding a set of encoded computing function slices of the next distributed computing function. For instance, the processing module issues a set of delete slice requests to the multiple storage units, where the set of delete slice requests includes a transaction number and a set of slice names associated with the next distributed computing function. Having sent to the lock-read-delete requests, the processing module interprets responses from the multiple storage units regarding the lock-read-delete requests. When the responses are favorable (e.g., at least a write threshold number of favorable delete slice responses), the processing module indicates that the ownership of the next distributed computing function can be established. When the responses are unfavorable, the processing module indicates that the ownership of the next distributed computing function cannot be established.

The method branches to step 490 when the ownership of the next distributed computing function can be established. The method continues to step 488 when the ownership of the next distributed computing function cannot be established. When the ownership of the next distributed computing function cannot be established, the method continues at step 488 where the processing module requests, in accordance with the ordered manner, another next distributed computing function of the dynamic plurality of distributed computing functions. As a specific example, the processing module issues a set of rollback requests to the multiple storage units where each rollback requests includes the transaction number of the delete requests. The method loops back to step 486.

When the ownership of the next distributed computing function can be established, the method continues at step 490 where the processing module secures ownership of the next distributed computing function. As a specific example, when the ownership of the next distributed computing function can be established, the processing module receives an indication that the set of encoded computing function slices are locked as a separate message. As another specific example, the processing module interprets receiving the set of encoded computing function slices from the multiple storage units. The method continues at step 492 where the processing module executes the next distributed computing function on one or more of the plurality of data objects stored in the distributed memory (e.g., decodes a decode threshold number of the set of encoded computing function slices to reproduce the next distributed computing function, processes the next distributed computing function locally or sends the next distributed computing function to another entity for processing). Alternatively, the processing module executes the next distributed computing function on data contained within the distributed computing function. After executing the next distributed computing function, the method continues at step 494 where the processing module initiates a delete portion of the lock-read-delete requests (e.g., issues a set of commit requests that includes the transaction number associated with the delete slice requests).

FIG. 43A is a schematic block diagram of another embodiment of a dispersed storage system that includes a plurality of processing modules 500 and a dispersed storage (DS) unit set 502. The DS unit set 502 includes a set of DS units 504. Each processing module 500 may be implemented utilizing at least one of a user device, a distributed task (DT) execution module, a distributed storage and task (DST) client module, a DST processing unit, a DST execution unit, and a DS processing unit. The system is operable to facilitate execution of tasks associated with one or more queue entries of one or more queues stored in the DS unit set 502. The plurality of processing modules 500 are operable to facilitate execution of the tasks.

A plurality of queues are stored in the DS unit set 502, where each queue includes a plurality of queue entries. Each queue entry includes one or more tasks (e.g., computing jobs, data for processing by a computing job). A task may include instructions to redistribute the task to further processing modules. A first queue includes an unassigned queue of queue entries that have not been assigned to a particular processing module 500. One or more other queues of the plurality of queues includes assigned queues of queue entries that have been assigned to at least one processing module 500.

Tasks for execution are stored in one or more queue entries of the unassigned queue. A processing module 500 with available task execution capacity obtains a queue entry from the unassigned queue by issuing a queue entry request 506 to retrieve the queue entry and receiving a queue entry response 508 that includes the queue entry. Next, the processing module 500 deletes the queue entry from the unassigned queue by issuing a queue entry request 506 to delete the queue entry. Next, the processing module 500 stores the queue entry in a corresponding assigned queue by issuing a queue entry request 506 to store the queue entry. The processing module 500 initiates execution of one or more tasks of the queue entry. Upon completion of the one or more tasks of the queue entry, the processing module 500 deletes the queue entry from the assigned queue by issuing a queue entry request 506 to delete the queue entry. The method is discussed in greater detail with reference to FIG. 43B.

FIG. 43B is a flowchart illustrating an example of acquiring a task. The method begins at step 510 where a processing module (e.g., of a dispersed storage (DS) processing module) obtains a queue entry from an unassigned task queue. The obtaining includes a series of steps. A first step includes generating a set of list requests. A second step includes outputting the set of list requests to a set of DS units. A third step includes identifying a queue entry based on received list responses. A fourth step includes retrieving the identified queue entry from the set of DS units (e.g., generating a set of slice names corresponding to the identified queue entry, outputting a set of read requests, that includes the set of slice names, to the set of DS units; receiving a set of queue entry slices, decoding the set of queue entry slices to reproduce the identified queue entry). A fifth step includes the initiating deletion of the identified queue entry from the set of DS units (e.g., outputting a set of delete requests to the set of DS units, but not commit requests yet).

The method continues at step 512 where the processing module stores the queue entry in an assigned task queue. The storing includes obtaining the set of queue entry slices of the identified queue entry (e.g., from the previous retrieval, re-encode the identified queue entry), generating a second set of slice names, generating a set of write slice requests that includes the second set of slice names and the set of queue entry slices, and outputting the set of write slice requests to the set of DS units.

The method continues at step 514 where the processing module facilitates completion of deletion of the queue entry from the unassigned task queue. The facilitating includes generating a set of commit requests associated with the set of delete requests (e.g., including a common transaction number of the set of delete requests) and outputting the set of commit requests to the set of DS units. The method continues at step 518 where the processing module extracts one or more tasks from the queue entry. The method continues at step 520 where the processing module facilitates execution of the one or more tasks. The facilitating includes one or more of executing a task of the one or more tasks locally, generating a plurality of subtasks for the task, and outputting at least some of the plurality of subtasks to another processing module. The facilitating may further include selecting a task on the one or more tasks that aligns with a task execution capability of the processing module. Upon completion of execution of the one or more tasks, the method continues at step 522 where the processing module deletes the queue entry from the assigned task queue. For example, the processing module generates a set of delete slice requests that includes the second set of slice names and outputs the set of delete slice requests to the set of DS units. Next the processing module generates and outputs a set of commit delete slice requests to the set of DS units when receiving at least a write threshold number of favorable write responses from the set of DS units.

Alternatively, the processing module may facilitate direct execution of the one or more tasks from the queue entry starting with step 516 where the processing module obtains the queue entry from the assigned task queue. For example, the processing module retrieves the queue entry from the assigned task queue utilizing a first in first out (FIFO) approach. The method branches to step 518 where the processing module extracts one or more tasks from the queue entry.

FIG. 44A is a schematic block diagram of another embodiment of a dispersed storage system that includes one or more dispersed storage (DS) unit sets 520, 502, a scanning module 522, and a rebuilding module 524. Each DS unit set of the one or more DS unit sets 520, 502 includes a set of DS units 504. In a first embodiment, as illustrated, the one or more DS unit sets are implemented as two DS unit sets 520, 502. Alternatively, in another embodiment, the one or more DS unit sets are implemented as a common DS unit set. The scanning module 522 and the rebuilding module 524 may be implemented utilizing one or more of a user device, a server, a processing module, a computer, a DS processing unit, a DS processing module, a DS unit, a distributed storage and task (DST) processing unit, a DST processing module, a DST client module, and a DST execution unit. For example, the scanning module 522 is implemented in a first DST execution unit and the rebuilding module 524 is implemented in a second DST execution unit. As another example, the scanning module 522 and the rebuilding module 524 are implemented utilizing a common DST execution unit.

The system functions to detect one or more stored slices in error (e.g., missing and/or corrupted slices that should be stored in one or more DS units 504 of a first DS unit set 520) and to remedy (e.g., rebuild) the one or more stored slices in error. The scanning module 522 functions to detect the one or more stored slices in error and the rebuilding module 524 functions to remedy the one or more stored slices in error. The scanning module 522 communicates identities of the one or more stored slices in error to the rebuilding module 524 by utilizing entries of a dispersed queue. A second DS unit set 502 of the one or more DS unit sets is utilized to provide the dispersed queue.

The scanning module 522 functions to detect the one or more stored slices in error and to update the dispersed queue with an entry pertaining to at least one stored slice in error. The scanning module 522 functions to detect the one or more stored slices in error through a series of steps. A first step includes generating a set of list requests 526 that include a range of slice names to be scanned associated with the first DS unit set. A second step includes outputting the set of list requests 526 to the first DS unit set 520. A third step includes comparing list slice responses 528 from the first DS unit set 520 to identify one or more slice names associated with the one or more stored slices in error. For example, the scanning module 522 identifies a slice name that is not listed in a list response when slice names of a set of slice names that are associated with the slice name are received via other list responses.

The scanning module 522 functions to update the dispersed queue through a series of steps. A first step includes assigning a rebuilding priority level for the slice in error. A second step includes generating a queue entry that includes one or more of the slice name, the rebuilding priority level, a rebuilding task indicator, and identity of the set of slice names that are associated with the slice name (e.g., a source name). A third step includes identifying the dispersed queue based on one or more of the source name, the rebuilding priority level, a rebuilding module availability level indicator, and a queue availability level indicator. A fourth step includes storing the queue entry in the identified dispersed queue associated with the second DS unit set. The storing includes encoding the queue entry to produce a set of entry slices, identifying a rebuilding dispersed queue, generating a set of entry slice names for the queue entry, generating a set of write queue entry requests 530 that includes the set of entry slices and the set of entry slice names, and outputting the set of write queue entry requests 530 to the second DS unit set 502.

The rebuilding module 524 functions to remedy the one or more stored slices in error through a series of steps. A first step includes retrieving a queue entry from a highest priority dispersed queue from the second DS unit set 502. The retrieving includes outputting a set of queue entry requests 532 that includes a set of list requests associated with a slice name range of the highest priority dispersed queue, receiving a set of queue entry responses 534 that includes a set of list responses, identifying a set of slice names associated with the queue entry (e.g., lowest slice names of a range of slice names associated with a first in first out (FIFO) approach), generating and outputting a set of delete read slice requests that includes the set of slice names to the second DS unit set 502, receiving at least a decode threshold number of entry slices from another set of queue entry responses 534, and decoding the at least a decode threshold number of entry slices to produce the queue entry.

A second step to remedy the one or more stored slices in error includes extracting the slice name of the slice in error from the queue entry (e.g., the queue entry including a distributed computing function to rebuild and the slice name). A third step includes facilitating rebuilding of the slice in error (e.g., directly rebuilding, issuing a rebuilding request to another rebuilding module). When directly rebuilding, the rebuilding module 524 outputs, to the first DS unit set 520, at least a decode threshold number of read slice requests 536 that includes slice names associated with the slice in error, receives at least a decode threshold number of read slice responses 538 that includes slices associated with the slice in error, decodes the slices associated with the slice in error to produce a recovered data segment, and encodes the recovered data segment to produce a rebuilt slice. A fourth step includes generating and outputting, to the first DS unit set 520, a write slice request 540 that includes the slice name of the slice in error and the rebuilt slice. A fifth step includes receiving a write slice response 542 that includes status of writing the rebuilt slice.

When the status of writing the rebuilt slice is favorable (e.g., succeeded), the rebuilding module 524 generates and outputs, to the second DS unit set 502, a set of queue entry requests 532 that includes a set of commit requests associated with the delete read requests previously output to the second DS unit set 502 with regards to retrieving the queue entry. Such a set of requests 532 completes deletion of the queue entry to remove the queue entry from the dispersed queue since the slice in error has been successfully rebuilt.

FIG. 44B is a flowchart illustrating an example of queuing a rebuilding task. The method begins at step 544 where a processing module (e.g., of scanning module) identifies a slice name of a slice in error of a set of slices stored in a set of dispersed storage (DS) units. The identifying includes generating and outputting, to the set of DS units, a set of list slice requests to include a slice name range to be scanned for errors, receiving list slice responses, and identifying the slice name of the slice in error based on a comparison of list slice responses. The method continues at step 546 where the processing module determines a rebuilding priority level. The priority level may be based on one or more of a number of slice errors associated with a common set of slices, a vault identifier, a data type indicator, a source name of the common set of slices, and a data priority level. For example, a higher rebuilding priority level may be assigned when the number of slice errors associated with a common set of slices is greater than a slice threshold level.

The method continues at step 548 where the processing module generates a queue entry that includes the slice name of the slice in error, a rebuilding task indicator (e.g., a rebuilding opcode), identity of the set of slices (e.g., the source name of the common set of slices), and the rebuilding priority indicator. The method continues at step 550 where the processing module identifies a rebuilding queue based on the rebuilding priority indicator. The identifying may include one or more of a lookup (e.g., a queue list by rebuilding priority level), a query, and receiving. The method continues at step 552 where the processing module facilitates storing the queue entry in the identified rebuilding queue in another set of DS units. Alternatively, the processing module facilitates storage of the queue entry in the identified rebuilding queue in the set of DS units.

The facilitating storage of the queue entry in the identified rebuilding queue includes a series of steps. A first step includes generating a set of queue entry slice names based on one or more of a queue vault identifier, a queue name associated with the identified rebuilding queue, a DS processing module identifier associated with the processing module, a client identifier based on a vault lookup, and a current timestamp. A second step includes encoding the queue entry using a dispersed storage error coding function to produce a set of queue entry slices. A third step includes generating a set of write slice requests that includes the set of queue entry slices and the set of queue entry slice names. A fourth step includes outputting the set of write slice requests to the other set of DS units when utilizing the other set of DS units for storage of the queue entry.

FIG. 45A is a schematic block diagram of another embodiment of a dispersed storage system that includes one or more dispersed storage (DS) unit sets 520, 502, a storage module 554, and a verification module 556. Each DS unit set of the one or more DS unit sets 520, 502 includes a set of DS units 504. In a first embodiment, as illustrated, the one or more DS unit sets are implemented as two DS unit sets. Alternatively, in another embodiment, the one or more DS unit sets are implemented as a common DS unit set. The storage module 554 and verification module 556 may be implemented utilizing one or more of a user device, a server, a processing module, a computer, a DS processing unit, a DS processing module, a DS unit, a distributed storage and task (DST) processing unit, a DST processing module, a DST client module, and a DST execution unit. For example, the storage module 554 is implemented in a first DST processing unit and the verification module 556 is implemented in a second DST processing unit. As another example, the storage module 554 and the verification module 556 are implemented utilizing a common DST processing unit.

The system functions to store a data object 558 and a companion data object 560 in a first DS unit set 520 of the one or more DS unit sets. The companion data object 560 may include any number of companion data objects 560 associated with the data object 558. The companion data object 560 includes at least one of metadata of the data object 558, storage information pertaining to storage of the data object 558, and index information for the data object 558. The storage module 554 functions to store the data object 558 and the companion data object 560 in the first DS unit set 520 and to enable verification of storage of the companion data object 560 by the verification module 556. The verification module 556 functions to verify storage of the companion data object 560 in the first DS unit set 520. The storage module 554 and the verification module 556 further function to utilize a dispersed storage verification queue associated with a second DS unit set 502 of the one or more DS unit sets to communicate instructions to regenerate the companion data object 560.

The storage module 554 functions to store the data object 558 and the companion data 560 object by a series of steps. A first step includes encoding the data object 558 to produce a plurality of sets of encoded data slices. A second step includes generating a plurality of sets of data slice names associated with the plurality of sets of encoded data slices. A third step includes generating at least one set of write slice requests 540 that includes the plurality of sets of data slice names and the plurality of sets of encoded data slices. A fourth step includes outputting the at least one set of write slice requests 540 to the first DS unit set 520. A fifth step includes receiving write slice responses 542 from the first DS unit set 520 to facilitate confirmation of storage of the data object 558. A sixth step includes encoding the companion data object 560 to produce at least one set of encoded companion slices. The encoding may include obtaining the companion data object 560 by at least one of receiving and generating based on the data object 558 and/or storage of the data object 558 (e.g., generating metadata). A seventh step includes generating at least one set of companion slice names associated with the at least one set of encoded companion slices. An eight step includes generating at least one other set of write slice requests 540 that includes the at least one set of companion slice names and the at least one set of encoded companion slices. A ninth step includes outputting the other at least one set of write slice requests 540 to the first DS unit set 520. A tenth step includes receiving further write slice responses 542 from the first DS unit set 520 to facilitate confirmation of storage of the companion data object 560 as is further discussed below.

The storage module 554 functions to enable verification of storage of the companion data object by a series of steps. A first step includes generating a queue entry based on the companion data. The queue entry includes one or more of the companion data object 560, the at least one set of companion slice names, the at least one set of encoded companion slices, storage confirmation information with regards to storage of the companion data object 560 in the first DS unit set 520, and instructions to regenerate the companion data object 560. A second step includes storing the queue entry in the verification queue of the second DS unit set 502. The storing includes encoding the queue entry to produce a set of entry slices, identifying the dispersed verification queue, generating a set of entry slice names for the queue entry, generating a set of write queue entry requests 530 that includes a set of write slice requests including the set of entry slices and the set of entry slice names, outputting the set of write queue entry requests 530 to the second DS unit set 502, and receiving write queue entry responses 531 from the second DS unit set 502.

When the write slice responses 542 from the first DS unit set 520 are favorable, the storage module 554 deletes the queue entry from the verification queue as is further discussed below. In addition, the storage module 554 may generate and output, to the first DS unit set 520, sets of write slice requests 540 that includes commit slice requests with regards to storage of the data object 558 and the companion data object 560. The storage module 554 detects that the write slice responses 542 from the first DS unit set 520 are favorable when at least a write threshold number of write slice responses 542 of each set of encoded data slices indicate that writing succeeded and at least a write threshold number of write slice responses 542 of the at least one set of encoded companion slices indicate that writing succeeded. The storage module 554 deletes the queue entry from the verification queue by a series of steps. A first step includes generating a set of write queue entry requests 530 that includes a set of delete slice requests including the set of entry slice names. A second step includes outputting the set of write queue entry requests 530 to the second DS unit set 502. A third step includes receiving write queue entry responses 531 with regards to the set of delete slice requests. A fourth step includes determining whether a write threshold number of favorable write queue entry responses 531 have been received. When the write threshold number of favorable write queue responses 531 have been received, a fifth step includes generating a set of write queue entry requests 530 that includes a set of commit slice requests associated with the set of delete slice requests including at least one of the set of entry slice names and a transaction number associated with the set of delete slice requests. A sixth step includes outputting the set of write queue entry requests 530 to the second DS unit set 502. A seventh step includes receiving write queue entry responses 531 with regards to the set of commit slice requests.

The verification module 556 functions to verify storage of the companion data object 560 by a series of steps. A first step includes retrieving a queue entry from the verification queue from the second DS unit set 502. The retrieving includes outputting a set of queue entry requests 532 that includes a set of list requests associated with a slice name range of the verification queue, receiving a set of queue entry responses 534 that includes a set of list responses, identifying a set of slice names associated with the queue entry (e.g., lowest slice names of a range of slice names associated with a first in first out (FIFO) approach), generating and outputting a set of delete read slice requests 532 that includes the set of slice names to the second DS unit set 502, receiving at least a decode threshold number of entry slices 534, and decoding the at least a decode threshold number of entry slices 534 to produce the queue entry.

A second step to verify storage of the companion data object 560 includes determining whether the companion data object 560 associated with the queue entry has been successfully written to the first DS unit set 520. The determining includes one or more of a query (e.g., output read slice requests 536 to the first DS unit set 520 and interpret received read slice responses 538), detecting a write status that indicates that commit requests have not been sent with regards to the companion data object 560, and a predetermination. When the companion data object 560 has not been successfully written to the first DS unit set 520, a third step includes generating encoded companion slices of the companion data object 560 based on one or more of companion data extracted from the queue entry, at least one set of companion slice names extracted from the queue entry, at least one set of encoded companion slices extracted from the queue entry, and instructions to regenerate the companion data object 560 extracted from the queue entry. For example, the verification module 556 encodes the companion data object 560 extracted from the queue entry using a dispersed storage error coding function to produce at least one set of encoded companion slices.

A fourth step to verify storage of the companion data object 560 includes generating at least one set of write slice requests 540 that includes the at least one set of encoded companion slices and the at least one set of companion slice names. A fifth step includes outputting the at least one set of write slice requests 540 to the first DS unit set 520. A sixth step includes receiving write slice responses 542 from the first DS unit set 520 with regards to the at least one set of write slice requests 540. A seventh step includes determining whether the write slice responses 542 are favorable. The verification module 556 determines that the write slice responses 542 from the first DS unit set 520 are favorable when at least a write threshold number of write slice responses 542 of the at least one set of encoded companion slices indicate that writing succeeded. When the write slice responses 542 from the first DS unit set 520 are favorable, an eighth step includes completing deletion of the queue entry from the verification queue. In addition, the verification module may generate and output, to the first DS unit set 520, at least one set of write slice requests 540 that includes at least one set of commit slice requests with regards to storage of the companion data object 560.

FIG. 45B is a flowchart illustrating another example of storing data. The method begins at step 562 where a processing module (e.g., of a storage module) facilitates storing data as data slices in a data storage set of dispersed storage (DS) units. The facilitating includes encoding the data using a dispersed storage error coding function to produce the data slices, generating write slice requests that includes the data slices, outputting the write slice requests to the data storage set of DS units, and issuing commit write slice requests to the data storage set of DS units when receiving a favorable number of write slice responses from the data storage set of DS units. The method continues at step 564 where the processing module encodes at least one companion data object associated with the data to produce companion slices. For example, the processing module encodes the at least one companion data object using the dispersed storage error coding function to produce a set of companion slices.

The method continues at step 566 where the processing module initiates writing of the companion slices to the data storage set of DS units. The initiating includes generating a set of companion slice names, generating a set of write slice requests that includes the set of companion slice names and the set of companion slices, and outputting the set of write slice requests to the data storage set of DS units. The method continues at step 568 where the processing module generates a queue entry based on the at least one companion data object. The queue entry includes one or more of the at least one companion data object, the set of companion slice names, the set of companion slices, and instructions to regenerate the at least one companion data object.

The method continues at step 570 where the processing module stores the queue entry in a queue set of DS units. The storing includes encoding the queue entry using a dispersed storage error coding function to produce a set of entry slices, generating a set of entry slice names (e.g., to include a queue vault identifier, a queue name, a DS processing module identifier, a client module identifier, and a timestamp), generating a set of write slice requests that includes the set of entry slices and the set of entry slice names, and outputting the set of write slice requests to the queue set of DS units. The storing further includes issuing a set of commit write slice requests to the queue set of DS units when receiving a favorable number (e.g., a write threshold number) of write slice responses from the queue set of DS units with regards to the set of write slice requests.

When writing of the companion slices is favorable, the method continues at step 572 where the processing module outputs a set of commit companion slice requests to the data storage set of DS units. The processing module determines when writing of the companion slices is favorable based on receiving a favorable number (e.g., a write threshold number) of write slice responses with regards to the set of write slice requests that includes the set of companion slices. The outputting of the commit companion slice requests includes generating the set of commit companion slice requests that includes at least one of the set of companion slice names and a transaction number utilized in the set of write slice requests that includes the set of companion slices, and outputting the set of commit companion slice requests to the data storage set of DS units.

Subsequent to outputting the commit companion slice requests, the method continues at step 574 where the processing module facilitates deletion of the queue entry in the queue set of DS units. The processing module facilitates deletion of the queue entry from the queue set of DS units by a series of steps. A first step includes generating a set of write queue entry requests that includes a set of delete slice requests including the set of entry slice names. A second step includes outputting the set of write queue entry requests to the queue set of DS units. A third step includes receiving write queue entry responses with regards to the set of delete slice requests. A fourth step includes determining whether a write threshold number of favorable write queue entry responses have been received. When the write threshold number of favorable write queue responses have been received, a fifth step includes generating a set of write queue entry responses that includes a set of commit slice requests associated with the set of delete slice requests including at least one of the set of entry slice names and the transaction number associated with the set of delete slice requests. A sixth step includes outputting the set of write queue entry requests to the queue set of DS units. A seventh step includes receiving write queue entry responses with regards to the set of commit slice requests.

FIG. 45C is a flowchart illustrating another example of storing data. The method begins at step 576 where a processing module (e.g., of a verification module) accesses a queue entry from a queue set of DS units. The accessing includes outputting a set of queue entry requests that includes a set of list requests associated with a slice name range of the queue, receiving a set of queue entry responses that includes a set of list responses, identifying a set of slice names associated with the queue entry (e.g., lowest slice names of a range of slice names associated with a first in first out (FIFO) approach), generating and outputting a set of delete read slice requests that includes the set of slice names to the queue set of DS units, receiving at least a decode threshold number of entry slices, and decoding the at least a decode threshold number of entry slices to produce the queue entry.

The method continues at step 578 where the processing module identifies at least one companion data object associated with data based on the queue entry. The identifying includes at least one of extracting a companion data object identifier from the queue entry, extracting the at least one companion data object from the queue entry, and extracting a set of companion slice names from the queue entry.

The method continues at step 580 where the processing module determines whether a companion data object of the at least one companion data object has been successfully written to a data storage set of DS units. The determining includes one or more of a query (e.g., output read slice requests to the data storage set of DS units, interpret received read slice responses), detecting a write status that indicates that commit requests have not been sent with regards to the companion data object, and a predetermination. When writing of the companion data object has not been successful, the method continues at step 582 where the processing module regenerates companion slices of the companion data object. The regenerating may be based on one or more of companion data object extracted from the queue entry, the set of companion slice names extracted from the queue entry, the set of encoded companion slices extracted from the queue entry, and instructions to regenerate the companion data object extracted from the queue entry. For example, the processing module encodes the companion data object extracted from the queue entry using a dispersed storage error coding function to produce a set of companion slices.

The method continues at step 584 where the processing module writes the regenerated companion slices to the data storage set of DS units. The writing includes generating a set of write slice requests that includes the set of companion slices and the set of companion slice names, outputting the set of write requests to the data storage set of DS units, and receiving write slice responses from the data storage set of DS units with regards to the set of write requests. When writing of the companion slices is favorable, the method continues at step 586 where the processing module outputs a commit regenerated companion slice requests to the data storage set of DS units. The processing module determines that the write slice responses are favorable when at least a write threshold number of write slice responses indicate that writing succeeded. The outputting of the commit regenerated companion slice requests includes generating a set of commit regenerated companion slice requests that includes at least one of the set of companion slice names and a transaction number associated with the set of write slice requests and outputting the set of commit regenerated companion slice requests to the data storage set of DS units. Subsequent to outputting the commit regenerated companion slice requests, the method continues at step 588 where the processing module facilitates deletion of the queue entry in the queue set of DS units.

FIG. 46A is a schematic block diagram of another embodiment of a dispersed storage system that includes one or more dispersed storage (DS) unit sets 520, 502 and two or more client modules 590. Each DS unit set of the one or more DS unit sets 520, 502 includes a set of DS units 504. In a first embodiment, as illustrated, the one or more DS unit sets 520, 502 are implemented as two DS unit sets where a first DS unit set 520 includes a data storage set of DS units 504 and a second DS unit set 502 includes a lock set of DS units 504. Alternatively, in another embodiment, the one or more DS unit sets 520, 502 are implemented as a common DS unit set utilized as a data storage set of DS units and a lock set of DS units. Each client module 590 may be implemented utilizing one or more of a user device, a server, a processing module, a computer, a DS processing unit, a DS processing module, a DS unit, a distributed storage and task (DST) processing unit, a DST processing module, a DST client module, and a DST execution unit. For example, a first client module 590 is implemented in a first DST processing unit and a second client module 590 is implemented in a second DST processing unit.

The system functions to provide synchronized access by the two or more client modules 590 to the data storage set of DS units 520 by utilizing a locking approach such that only one client module 590 at a time is able to exclusively access an element of the data storage set of DS units 520. The element may include a data object, one or more data segments, and one or more sets of encoded data slices. The element may be specified utilizing a data object identifier (ID), a data segment ID, a vault source name, a set of slice names, and a slice name. The locking approach includes enabling the first client module 590 to obtain a lock associated with the element when the first client module desires access to the element and the element is not currently associated with another lock.

An active lock is indicated when a corresponding set of lock slices are associated with an open write transaction in the lock set of DS units 502. At least one of direct generation, utilizing an index, and utilizing a directory may provide an association between the element and lock slice names of the set of lock slices. For example, an index includes an association between source name A457 affiliated with the data storage set of DS units 520 and a vault source name of 648C utilized to access lock slices in the lock set of DS units 502 associated with a lock corresponding to data of the data storage set of DS units 520 utilizing the source name A457. As such, a lock on source name A457 is active when an open write transaction exists with regards to a set of lock slices of the lock set of DS units 502 associated with the vault source name of 648C. As another example, a direct generation algorithm may be performed on source name A457 to generate a set of lock slice names associated with vault source name 648C.

When the client module 590 desires to exclusively access an element of the data storage set of DS units 520, the client module 590 identifies a lock name based on at least one of a function of accessing the element, a vault identifier (ID) associated with the accessing, a source name associated with the element, initiating a query, and receiving the lock name. The client module generates a set of lock slices. The generating may be based on one or more of a random number, a predetermined pattern, the lock name, and a requesting entity ID. For example, the client module 590 generates a data segment to include the requesting entity ID and encodes the data segment using a dispersed storage error coding function to produce the set of lock slices.

Next, the client module 590 generates a set of lock slice names based on one or more of identity of the element, the lock name, the source name associated with the element, a source name associated with a locked name, accessing an index, and accessing a directory. The client module generates a set of lock entry requests 596 that includes a set of write slice requests including the set of lock slices and the set of lock slice names. Next, the client module outputs the set of lock entry requests 596 to a lock set of DS units 502. The client module 590 determines whether obtaining a lock is favorable based on received lock entry responses 598 from the lock set of DS units. The client module determines that obtaining the lock is favorable when at least a write threshold number of the lock entry responses 598 include a favorable lock entry response (e.g., write succeeded with no transaction conflict). When obtaining the lock is unfavorable, the client module 590 generates and outputs a set of lock entry requests that includes a set of rollback requests to the lock set of DS units 502. The set of rollback requests includes a transaction number utilized with regards to the set of write slice requests. The client module may attempt obtaining the lock in a later time.

When obtaining the lock is favorable, the client module exclusively accesses the element of the data storage set of DS units 520. The accessing includes generating one or more sets of access requests 592 and outputting the one or more sets of access requests 592 to the data storage set of DS units 520. The one or more sets of access request 592 may include one or more of a read request, write request, a list request, a rebuilding request, etc. The client module 590 determines whether accessing the element has been completed based on received access responses 594 from the data storage set of DS units 520. The accessing may include one or more sequences of generating and outputting access requests 592 followed by receiving and processing access responses 594. When the accessing of the element has been completed, the client module 590 outputs the set of lock entry requests 596 that includes the set of rollback requests to the lock set of DS units 502 to release the lock on the element. The method of operation of the system is discussed in greater detail with reference to FIG. 46B.

FIG. 46B is a flowchart illustrating an example of obtaining a dispersed lock. The method begins at step 600 where a processing module (e.g., of a client module) identifies a lock name when desiring to obtain a lock performing function on an element associated with a dispersed storage network (DSN). The identifying may be based on one or more of a function type of the function, a vault identifier (ID) associated with the element, a source name corresponding to the element, an index lookup, a directory lookup a query and receiving the lock name. The method continues at step 602 where the processing module identifies a vault source name corresponding to the lock name. The identifying may be based on one or more of accessing a directory using the lock name, accessing an index utilizing the lock name, initiating a query, and receiving the vault source name.

The method continues at step 604 where the processing module generates a set of lock slices. The generating includes a series of steps. A first step includes generating a data segment based on one or more of a random number, a random pattern, a predetermined pattern, the lock name, the vault source name corresponding to the like name, and a function identifier. A second step includes encoding the data segment using a dispersed storage error coding function to produce the set of lock slices.

The method continues at step 606 where the processing module generates a set of write slice requests that includes the set of lock slices and a set of slice names based on the vault source name. The generating includes generating the set of slice names using the vault source name. The method continues at step 608 where the processing module outputs a set of write slice requests to a lock set of dispersed storage (DS) units. The method continues at step 610 where the processing module determines whether a lock is obtained. The determining includes a series of steps. A first step includes receiving write slice responses from the lock set of DS units. A second step includes determining whether the received write slice responses includes a write threshold number of favorable (e.g., write succeeded with no transaction conflict) write slice responses. For example, the processing module indicates that the lock is obtained when at least the write threshold number of favorable write slice responses has been received. The method branches to step 616 when the lock is not obtained. The method continues to step 612 when the lock is obtained.

The method continues at step 612 where the processing module accesses the data storage set of DS units to perform the function on the element when the lock is obtained. When performing of the function on the element has been completed, the method continues at step 614 where the processing module outputs the set of rollback requests to the lock set of DS units since the lock is no longer required.

When the lock is not obtained, the method continues at step 616 where the processing module outputs a set of rollback requests to the lock set of DS units. As a specific example, the processing module generates the set of rollback requests to include at least one of the set of slice names and the transaction number associated with the set of write slice requests and sends the set of rollback requests to the lock set of DS units. The outputting may further include performing a backoff algorithm to determine when to retry an obtaining of the lock. When the processing module determines to retry, the method loops back to step 608

FIG. 47 is a flowchart illustrating an example of rebuilding a data slice, which includes similar steps to FIG. 46B. The method begins at step 618 where a processing module (e.g., of a client module) identifies a lock name for a slice to rebuild. The identifying may include detecting a slice error (e.g., corrupted, missing) associated with the slice to rebuild and obtaining a slice name of the slice to rebuild. The identifying may be based on one or more of the slice name of the slice to rebuild, a vault identifier (ID) associated with the slice to rebuild, a source name corresponding to the slice to rebuild, an index lookup, a directory lookup, a query and receiving the lock name from a rebuilding process.

The method continues with steps 602, 604, 606, 608, and 610 of FIG. 46B where the processing module identifies a vault source name corresponding to the lock name, generates a set of lock slices, generates a set of write slice requests that includes the set of lock slices and a set of slice names based on the vault source name, outputs a set of write slice requests to a lock set of dispersed storage (DS) units, and determines whether lock is obtained. The method branches step 620 when the lock is obtained. The method continues to step 616 of FIG. 46B when the lock is not obtained. The method continues at step 616 of FIG. 46B where the processing module outputs a set of rollback requests to the lock set of DS units when the lock is not obtained. The outputting may further include determining whether to facilitate rebuilding of another slice to rebuild. When the processing module determines to facilitate the rebuilding of another slice to rebuild, the method loops back to step 618.

The method continues at step 620 where the processing module accesses a data storage set of DS units to rebuild the slice to rebuild when the lock is obtained. Subsequent to storing of the slice to rebuild, the method continues at step 622 where the processing module outputs the set of rollback requests to the lock set of DS units since the slice to rebuild has been rebuilt and no other processing modules need to rebuild the slice to rebuild.

FIG. 48A is a schematic block diagram of another embodiment of a dispersed storage system that includes a plurality of distributed storage and task (DST) execution units 36. The plurality of DST execution units 36 includes a set of DST execution units 36 associated with storing encoded data slices 628 of one or more sets of encoded data slices. Each DST execution unit 36 of the plurality of DST execution units 36 includes the interface 169, the controller 86, and the plurality of memories 88 of FIG. 11. The system functions to facilitate rebuilding of one or more slices to rebuild when detecting a slice error of a set of encoded data slices.

A controller 86 of a first DST execution unit 36 detects a slice error to identify a slice to rebuild. The controller 86 functions to select a rebuilding entity to facilitate remedying of the slice error. The selecting includes a series of steps. A first step includes determining a network loading level at interface 169 (e.g., measure an average input/output rate). A second step includes determining a number of slice errors requiring rebuilding where the slice errors are associated with slices stored in at least one memory 88 of the plurality of memories 88. A third step includes selecting one of the controller 86 or another DST execution unit 36 as a selected rebuilding entity to facilitate the remedying of the slice error based on the network loading level and the number of slice errors requiring rebuilding. A fourth step includes facilitating rebuilding of the slice error utilizing the selected rebuilding entity.

In a specific example of operation, the controller 86 selects the controller 86 as the rebuilding entity when the number of slices to rebuild is less than a rebuild threshold level. As another specific example, the controller 86 selects another DST execution unit 36 as the rebuilding entity when the number of slices to rebuild is greater than the rebuild threshold level and the network loading level is greater than a network loading threshold. The other DST execution unit 36 generates one or more slice access requests 624 and outputs the one or more slice access requests 624 to still other DST execution units 36 to facilitate rebuilding the slice to be rebuilt. As yet another specific example, the controller 86 selects the controller 86 as the rebuilding entity when the number of slices to rebuild is greater than the rebuild threshold level and the network loading level is less than the network loading threshold. The controller 86 generates one or more slice access requests 624 and outputs the one or more slice access requests 624 to other DST execution units 36. The controller 86 receives one or more slice access responses 626 with regards to the one or more slice access requests 624 to facilitate producing a rebuilt slice to remedy the slice error. The method of operation is discussed in greater detail with reference to FIG. 48B.

FIG. 48B is a flowchart illustrating an example of selecting a rebuilding entity. The method begins at step 630 where a processing module (e.g., of a distributed storage and task (DST) execution unit controller) determines a network loading level of the DST execution unit when obtaining slice error information. The slice error information includes at least one of a slice name of a slice to rebuild, a source name associated with the slice name, identity of a DST execution unit associated with the slice to rebuild, and a slice error type indicator. The obtaining the slice error information includes at least one of detecting the slice error and receiving the slice error information (e.g., a rebuilding request includes the slice error information). The determining of the network loading level includes at least one of performing a test, initiating a query, performing a lookup of network traffic historical records, receiving the network loading level, interpreting one or more error messages, and monitoring network traffic.

The method continues at step 632 where the processing module determines a number of slice errors requiring rebuilding within the DST execution unit. The determining may be based on one or more of scanning for slice errors, initiating a query, receiving a response, a lookup, one or more error messages, and receiving a request. The method continues at step 634 where the processing module identifies a plurality of candidate rebuilding entities. The identifying includes one or more of initiating a query, receiving a response, performing a lookup, referencing one or more error messages, and referencing a predetermination.

The method continues at step 636 where the processing module selects a rebuilding entity of the plurality of candidate rebuilding entities based on the network loading level and the number of slice errors requiring rebuilding. The determining may include one or more of performing a selecting algorithm, performing a lookup, comparing one or more of the network loading level and the number of slice errors requiring rebuilding to corresponding thresholds, and accessing a historical record with regards to performance of one or more of the plurality of candidate rebuilding entities. The method continues at step 638 where the processing module facilitates remedying of the slice error utilizing the selected rebuilding entity. The facilitating includes at least one of initiating rebuilding by a local controller and generating and outputting a rebuilding request to another DST execution unit.

FIG. 49 is a flowchart illustrating another example of rebuilding a data slice. The method begins at step 640 where a processing module (e.g., of a distributed storage and task (DST) execution unit) identifies a number of slices to be rebuilt associated with a memory. The identifying includes at least one of counting a number of slices associated with at least one of a slice error list, initiating a request, receiving a response, detecting a slice error, and receiving a rebuilding request. When the number of slices to be rebuilt is greater than a slice threshold level, the method continues at step 642 where the processing module identifies another memory. The identifying may include comparing the number of slices to be rebuilt with the slice threshold level. The identifying may further include selecting one or more other memories to offload memory input/output loading for the rebuilding process based on one or more of a memory capacity level, a memory utilization level, a memory access rate, one or more performance threshold levels, and a memory access reliability level.

The method continues at step 644 where the processing module facilitates associating slice names of at least some of the slices to be rebuilt with the other memory and disassociating the slice names from the memory. For example, the processing module updates a local slice name to physical location table. The method continues at step 646 where the processing module facilitates rebuilding slices to be rebuilt such that at least some rebuilt slices are stored in the other memory. The facilitating includes at least one of initiating the rebuilding and generating and outputting a rebuilding request to another rebuilding entity. When the rebuilding is substantially finished, the method continues at step 648 where the processing module facilitates transfer of at least some rebuilt slices that are stored in the other memory to the memory. The facilitating includes directly transferring the slices and generating and outputting a transfer request to a transferring entity. The processing module retrieves the at least some rebuilt slices from the other memory and stores the at least some rebuilt slices in the memory when directly transferring slices. The method continues at step 650 where the processing module facilitates associating slice names of the at least some of the slices to be rebuilt with the memory and disassociates the slice names from the other memory. For example, the processing module updates the local slice name to physical location table.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A distributed computing system comprises:
a distributed memory that includes a plurality of storage units, wherein the distributed memory stores:
a plurality of data objects, wherein a data object of the plurality of data objects is stored in a set of storage units of the plurality of storage units as one or more sets of encoded data slices; and
in an ordered manner, a dynamic plurality of distributed computing functions, wherein a distributed computing function of the dynamic plurality of distributed computing functions is stored in multiple storage units of the plurality of storage units as a set of encoded computing function slices, wherein at least one of the dynamic plurality of distributed computing functions executes on at least one of the plurality of data objects stored in the distributed memory; and
a plurality of distributed computing processing resources, wherein at least some of the plurality of distributed computing processing resources individually function to:
identify, in accordance with the ordered manner, a next distributed computing function of the dynamic plurality of distributed computing functions;
determine whether ownership of the next distributed computing function compares favorably to establishment including:
sending lock-read-delete requests to the multiple storage units regarding a set of encoded computing function slices of the next distributed computing function;
interpreting responses from the multiple storage units regarding the lock-read-delete requests;
when the responses are favorable, indicating that the ownership of the next distributed computing function compares favorably to establishment; and
when the responses are unfavorable, indicating that the ownership of the next distributed computing function fails to be established; and
when the ownership of the next distributed computing function compares favorably to establishment, secure the ownership of the next distributed computing function, wherein when the ownership of the next distributed computing function compares favorably to establishment, receiving an indication that the set of encoded computing function slices are locked as a separate message or an interpretation of receiving the set of encoded computing function slices from the multiple storage units; and
when the ownership of the next distributed computing function compares unfavorably to establishment, request, in accordance with the ordered manner, another next distributed computing function of the dynamic plurality of distributed computing functions.

2. The distributed computing system of claim 1 further comprises:
a managing processing module operable to update the dynamic plurality of distributed computing functions by adding or deleting distributed computing functions to/from the dynamic plurality of distributed computing functions, wherein the managing processing module is a processing module of a computing device of the distributed computing system or one or more of the plurality of distributed computing processing resources.

3. The distributed computing system of claim 1 further comprises:
a managing processing module operable to establish the ordered manner based on one or more of a time stamp, a sequential operational dependency, co-processing function ordering, and a priority level, wherein the distributed computing function includes one or more of a partial task, a task, a computer operation, an algorithm, operational data, and a co-processing function, and wherein each of the dynamic plurality of distributed computing functions is stored separately in the distributed memory as opposed to being stored in a list.

4. The distributed computing system of claim 1, wherein the function to identify the next distributed computing function comprises:
requesting, from the multiple storage units, a listing of encoded computing function slices stored therein;
generate a list of the dynamic plurality of distributed computing functions currently stored by the multiple storage units from the listing;
determining a retrieval scheme for the list of the dynamic plurality of distributed computing functions; and
identifying the next distributed computing function from the list of the dynamic plurality of distributed computing functions in accordance with the retrieval scheme.

5. The distributed computing system of claim 1 further comprises:
executing the next distributed computing function on one or more of the plurality of data objects stored in the distributed memory; and
after executing the next distributed computing function, initiating a delete portion of the lock-read-delete requests.

6. A method for execution by a distributed computing processing resource of a plurality of distributed computing processing resources within a distributed computing system, the method comprises:
identifying, in accordance with an ordered manner, a next distributed computing function of a dynamic plurality of distributed computing functions, wherein a distributed memory of the distributed computing system includes a plurality of storage units and stores:
a plurality of data objects, wherein a data object of the plurality of data objects is stored in a set of storage units of the plurality of storage units as one or more sets of encoded data slices, wherein at least one of the dynamic plurality of distributed computing functions executes on at least one of the plurality of data objects stored in the distributed memory; and
in the ordered manner, the dynamic plurality of distributed computing functions, wherein a distributed computing function of the dynamic plurality of distributed computing functions is stored in multiple storage units of the plurality of storage units as a set of encoded computing function slices; and
determining whether ownership of the next distributed computing function
compares favorably to establishment including:
sending lock-read-delete requests to the multiple storage units regarding a set of encoded computing function slices of the next distributed computing function;
interpreting responses from the multiple storage units regarding the lock-read-delete requests;
when the responses are favorable, indicating that the ownership of the next distributed computing function compares favorably to establishment; and when the responses are unfavorable, indicating that the ownership of the next distributed computing function compares unfavorably to establishment; and when the ownership of the next distributed computing function compares favorably to establishment, securing the ownership of the next distributed computing function, wherein when the ownership of the next distributed computing function compares favorably to establishment, receiving an indication that the set of encoded computing function slices are locked as a separate message or an interpretation of receiving the set of encoded computing function slices from the multiple storage units; and when the ownership of the next distributed computing function compares unfavorably to establishment, requesting, in accordance with the ordered manner, another next distributed computing function of the dynamic plurality of distributed computing functions.

7. The method of claim 6 further comprises:
when functioning as a managing processing module, updating the dynamic plurality of distributed computing functions by adding or deleting distributed computing functions to/from the dynamic plurality of distributed computing functions.

8. The method of claim 6 further comprises:
when functioning as a managing processing module, establishing the ordered manner based on one or more of a time stamp, a sequential operational dependency, co-processing function ordering, and a priority level, wherein the distributed computing function includes one or more of a partial task, a task, a computer operation, an algorithm, operational data, and a co-processing function, and wherein each of the dynamic plurality of distributed computing functions is stored separately in the distributed memory as opposed to being stored in a list.

9. The method of claim 6, wherein the identifying the next distributed computing function comprises:
requesting, from the multiple storage units, a listing of encoded computing function slices stored therein;
generate a list of the dynamic plurality of distributed computing functions currently stored by the multiple storage units from the listing;
determining a retrieval scheme for the list of the dynamic plurality of distributed computing functions; and
identifying the next distributed computing function from the list of the dynamic plurality of distributed computing functions in accordance with the retrieval scheme.

10. The method of claim 6 further comprises:
executing the next distributed computing function on one or more of the plurality of data objects stored in the distributed memory; and
after executing the next distributed computing function, initiating a delete portion of the lock-read-delete requests.

* * * * *